United States Patent
Kim et al.

(10) Patent No.: US 12,238,713 B2
(45) Date of Patent: Feb. 25, 2025

(54) METHOD AND APPARATUS FOR TRANSMITTING OR RECEIVING DOWNLINK CHANNEL FROM MULTIPLE TRANSMISSION/RECEPTION POINTS IN WIRELESS COMMUNICATION SYSTEM

(71) Applicant: LG ELECTRONICS INC., Seoul (KR)

(72) Inventors: Hyungtae Kim, Seoul (KR); Jiwon Kang, Seoul (KR); Hyunho Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 379 days.

(21) Appl. No.: 17/799,365

(22) PCT Filed: Feb. 10, 2021

(86) PCT No.: PCT/KR2021/001841
§ 371 (c)(1),
(2) Date: Aug. 12, 2022

(87) PCT Pub. No.: WO2021/162483
PCT Pub. Date: Aug. 19, 2021

(65) Prior Publication Data
US 2023/0073095 A1    Mar. 9, 2023

(30) Foreign Application Priority Data

Feb. 14, 2020   (KR) .................. 10-2020-0018536
Jul. 15, 2020   (KR) .................. 10-2020-0087818
Dec. 30, 2020   (KR) .................. 10-2020-0188391

(51) Int. Cl.
*H04L 1/08*       (2006.01)
*H04L 5/00*       (2006.01)
(Continued)

(52) U.S. Cl.
CPC ............ *H04W 72/1273* (2013.01); *H04L 1/08* (2013.01); *H04L 5/0035* (2013.01); *H04W 72/23* (2023.01);
(Continued)

(58) Field of Classification Search
CPC ........ H04B 7/02–12; H04L 1/08–1896; H04L 5/00–0098; H04W 36/0005–385;
(Continued)

(56) References Cited

U.S. PATENT DOCUMENTS

2019/0281587 A1    9/2019   Zhang et al.
2020/0015200 A1*   1/2020   Vilaipornsawai ..... H04W 72/23
2021/0352636 A1*  11/2021   Shao ..................... H04W 72/23

OTHER PUBLICATIONS

Ericsson, "Finalizing issues for mTRP" R1-1912656, 3GPP TSG-RAN WG1 Meeting #99, Nov. 8, 2019, pp. 4-5, 7-9 and 11 and Fig. 3. (Year: 2019).*

(Continued)

*Primary Examiner* — Timothy J Weidner
(74) *Attorney, Agent, or Firm* — BRYAN CAVE LEIGHTON PAISNER LLP

(57) ABSTRACT

Disclosed are a method and apparatus for transmitting or receiving a downlink channel from multiple transmission/reception points in a wireless communication system. A method for receiving a downlink channel by a terminal in a wireless communication system, according to one embodiment of the present disclosure, comprises the steps of: receiving configuration information associated with repetitive transmission of a downlink channel; repetitively receiving a downlink control channel including the same downlink control information (DCI) from one or more transmission/reception points (TRPs), wherein the DCI indicates at least one from among the number of code division multiplexing (CDM) groups and the number of repetitions for a downlink data channel; and receiving, on the basis of the DCI not
(Continued)

including transmission configuration indicator (TCI) information, a downlink data channel from a single TRP (STRP) or multiple TRP (MTRP) from among the one or more TRPs on the basis of one or more from among the configuration information, the number of CDM groups, and the number of repetitions for the downlink data channel.

15 Claims, 21 Drawing Sheets

(51) Int. Cl.
*H04W 72/1273* (2023.01)
*H04W 72/23* (2023.01)
*H04W 72/231* (2023.01)
*H04W 72/232* (2023.01)
*H04W 84/02* (2009.01)
*H04W 88/02* (2009.01)
*H04W 88/08* (2009.01)
*H04W 92/02* (2009.01)
*H04W 92/10* (2009.01)

(52) U.S. Cl.
CPC ....... *H04W 72/231* (2023.01); *H04W 72/232* (2023.01); *H04W 84/02* (2013.01); *H04W 88/02* (2013.01); *H04W 88/08* (2013.01); *H04W 88/085* (2013.01); *H04W 92/02* (2013.01); *H04W 92/10* (2013.01)

(58) Field of Classification Search
CPC ... H04W 72/02–569; H04W 84/02–16; H04W 88/02–12; H04W 92/02–04; H04W 92/10
See application file for complete search history.

(56) References Cited

OTHER PUBLICATIONS

Ericsson, "Finalizing issues for mTRP" R1-1912656, 3GPP TSG-RAN WG1 Meeting #99, Nov. 8, 2019, pp. 4-5, 7-9 and 11 and Fig. 3.
AT&T, "Enhancements on Multi TRP Transmission" R1-1912844, 3GPP TSG-RAN WG1 Meeting #99, Nov. 8, 2019, pp. 5-6.
LG Electronics, "Enhancements on multi-TRP/panel transmission" R1-1912269, 3GPP TSG-RAN WG1 Meeting #99, Nov. 9, 2019, pp. 4-9.

* cited by examiner

METHOD AND APPARATUS FOR TRANSMITTING OR RECEIVING DOWNLINK CHANNEL FROM MULTIPLE TRANSMISSION/RECEPTION POINTS IN WIRELESS COMMUNICATION SYSTEM

CROSS-REFERENCE TO RELATED APPLICATIONS

This application is a National Stage of PCT/KR2021/001841, filed on Feb. 10, 2021 and published on Aug. 19, 2021 as WO 2021/162483 A1 and claims the benefit of earlier filing date and right of priority to Korean Application No. 10-2020-0018536, filed on Feb. 14, 2020, Korean Application No. 10-2020-0087818, filed on Jul. 15, 2020, and Korean Application No. 10-2020-0188391, filed on Dec. 30, 2020, the contents of which are all hereby incorporated by reference herein in their entirety.

TECHNICAL FIELD

The present disclosure relates to a wireless communication system, and in more detail, relates to a method and a device of transmitting or receiving a downlink channel from multiple transmission and reception points in a wireless communication system.

BACKGROUND ART

A mobile communication system has been developed to provide a voice service while guaranteeing mobility of users. However, a mobile communication system has extended even to a data service as well as a voice service, and currently, an explosive traffic increase has caused shortage of resources and users have demanded a faster service, so a more advanced mobile communication system has been required.

The requirements of a next-generation mobile communication system at large should be able to support accommodation of explosive data traffic, a remarkable increase in a transmission rate per user, accommodation of the significantly increased number of connected devices, very low End-to-End latency and high energy efficiency. To this end, a variety of technologies such as Dual Connectivity, Massive Multiple Input Multiple Output (Massive MIMO), In-band Full Duplex, Non-Orthogonal Multiple Access (NOMA), Super wideband Support, Device Networking, etc. have been researched.

DISCLOSURE

Technical Problem

A technical object of the present disclosure is to provide a method and a device of transmitting or receiving a downlink channel from multiple TRPs (MTRPs).

An additional technical object of the present disclosure is to provide a method and a device of transmitting or receiving a downlink signal based on a downlink control channel transmitted from MTRPs.

An additional technical object of the present disclosure is to provide a method and a device of transmitting or receiving a downlink data channel from MTRPs or a single TRP (STRP) based on a downlink control channel transmitted from MTRP.

An additional technical object of the present disclosure is to provide a method and a device of transmitting or receiving a downlink data channel by applying or determining a transmission configuration indicator (TCI) for a downlink data channel transmitted from MTRPs or a STRP based on a downlink control channel transmitted from MTRPs.

The technical objects to be achieved by the present disclosure are not limited to the above-described technical objects, and other technical objects which are not described herein will be clearly understood by those skilled in the pertinent art from the following description.

Technical Solution

A method of receiving a downlink channel by a terminal in a wireless communication system according to an aspect of the present disclosure may include receiving configuration information associated with downlink channel repeat transmission; repetitively receiving a downlink control channel including the same downlink control information (DCI) from one or more TRPs (transmission reception point), wherein the DCI indicates one or more of the number of CDM groups or the number of repetitions for a downlink data channel; and based on the DCI not including TCI (Transmission Configuration Indicator) information, based on one or more of the configuration information, the number of CDM groups, or the number of repetitions for the downlink data channel, receiving a downlink data channel from a single TRP (STRP) or multiple TRPs (MTRPs) of the one or more TRPs.

A terminal receiving a downlink channel in a wireless communication system according to an additional aspect of the present disclosure includes one or more transceivers; and one or more processors connected with the one or more transceivers and the one or more processors are configured to receive configuration information associated with downlink channel repeat transmission, repetitively receive a downlink control channel including the same downlink control information (DCI) from one or more TRPs (transmission reception point), wherein the DCI indicates one or more of the number of CDM groups or the number of repetitions for a downlink data channel; and based on the DCI not including TCI (Transmission Configuration Indicator) information, based on one or more of the configuration information, the number of CDM groups, or the number of repetitions for the downlink data channel, receive a downlink data channel from a single TRP (STRP) or multiple TRPs (MTRPs) of the one or more TRPs.

Technical Effects

According to an embodiment of the present disclosure, a method and a device of transmitting or receiving a downlink channel from multiple TRPs (MTRPs) may be provided.

According to an embodiment of the present disclosure, a method and a device of transmitting or receiving a downlink signal based on a downlink control channel transmitted from MTRPs may be provided.

According to an embodiment of the present disclosure, a method and a device of transmitting or receiving a downlink data channel from MTRPs or a single TRP (STRP) based on a downlink control channel transmitted from MTRPs may be provided.

According to an embodiment of the present disclosure, a method and a device of transmitting or receiving a downlink signal by applying or determining a transmission configuration indicator (TCI) for a downlink data channel transmitted from MTRPs or a STRP based on a downlink control channel transmitted from MTRPs.

According to an embodiment of the present disclosure, based on a downlink control channel transmitted from MTRPs, even when TCI information is not included in a downlink control channel, a TCI associated with a downlink signal transmitted from MTRPs or a STRP may be clearly configured or determined.

Effects achievable by the present disclosure are not limited to the above-described effects, and other effects which are not described herein may be clearly understood by those skilled in the pertinent art from the following description.

DESCRIPTION OF DIAGRAMS

Accompanying drawings included as part of detailed description for understanding the present disclosure provide embodiments of the present disclosure and describe technical features of the present disclosure with detailed description.

BEST MODE

Figure 1:
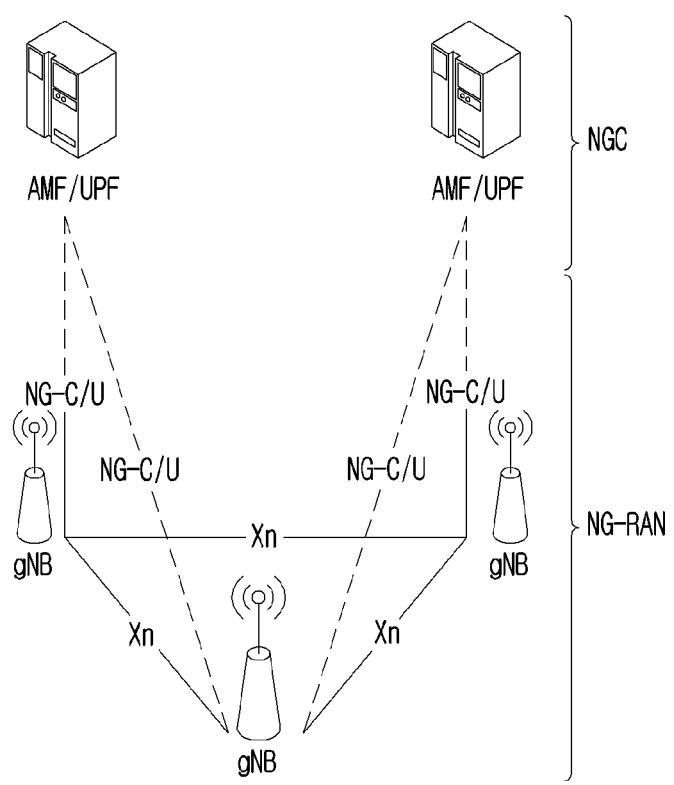
FIG. 1 illustrates a structure of a wireless communication system to which the present disclosure may be applied.

Hereinafter, embodiments according to the present disclosure will be described in detail by referring to accompanying drawings. Detailed description to be disclosed with accompanying drawings is to describe exemplary embodiments of the present disclosure and is not to represent the only embodiment that the present disclosure may be implemented. The following detailed description includes specific details to provide complete understanding of the present disclosure. However, those skilled in the pertinent art knows that the present disclosure may be implemented without such specific details.

In some cases, known structures and devices may be omitted or may be shown in a form of a block diagram based on a core function of each structure and device in order to prevent a concept of the present disclosure from being ambiguous.

In the present disclosure, when an element is referred to as being "connected", "combined" or "linked" to another element, it may include an indirect connection relation that yet another element presents therebetween as well as a direct connection relation. In addition, in the present disclosure, a term, "include" or "have", specifies the presence of a mentioned feature, step, operation, component and/or element, but it does not exclude the presence or addition of one or more other features, stages, operations, components, elements and/or their groups.

In the present disclosure, a term such as "first", "second", etc. is used only to distinguish one element from other element and is not used to limit elements, and unless otherwise specified, it does not limit an order or importance, etc. between elements. Accordingly, within a scope of the present disclosure, a first element in an embodiment may be referred to as a second element in another embodiment and likewise, a second element in an embodiment may be referred to as a first element in another embodiment.

A term used in the present disclosure is to describe a specific embodiment, and is not to limit a claim. As used in a described and attached claim of an embodiment, a singular form is intended to include a plural form, unless the context clearly indicates otherwise. A term used in the present disclosure, "and/or", may refer to one of related enumerated items or it means that it refers to and includes any and all possible combinations of two or more of them. In addition, "/" between words in the present disclosure has the same meaning as "and/or", unless otherwise described.

The present disclosure describes a wireless communication network or a wireless communication system, and an operation performed in a wireless communication network may be performed in a process in which a device (e.g., a base station) controlling a corresponding wireless communication network controls a network and transmits or receives a signal, or may be performed in a process in which a terminal associated to a corresponding wireless network transmits or receives a signal with a network or between terminals.

In the present disclosure, transmitting or receiving a channel includes a meaning of transmitting or receiving information or a signal through a corresponding channel. For example, transmitting a control channel means that control information or a control signal is transmitted through a control channel. Similarly, transmitting a data channel means that data information or a data signal is transmitted through a data channel.

Hereinafter, a downlink (DL) means a communication from a base station to a terminal and an uplink (UL) means a communication from a terminal to a base station. In a downlink, a transmitter may be part of a base station and a receiver may be part of a terminal. In an uplink, a transmitter may be part of a terminal and a receiver may be part of a base station. A base station may be expressed as a first communication device and a terminal may be expressed as a second communication device. A base station (BS) may be substituted with a term such as a fixed station, a Node B, an eNB (evolved-NodeB), a gNB (Next Generation NodeB), a BTS (base transceiver system), an Access Point (AP), a Network (5G network), an AI (Artificial Intelligence) system/module, an RSU (road side unit), a robot, a drone (UAV: Unmanned Aerial Vehicle), an AR (Augmented Reality) device, a VR (Virtual Reality) device, etc. In addition, a terminal may be fixed or mobile, and may be substituted with a term such as a UE (User Equipment), an MS (Mobile Station), a UT (user terminal), an MSS (Mobile Subscriber Station), an SS (Subscriber Station), an AMS (Advanced Mobile Station), a WT (Wireless terminal), an MTC (Machine-Type Communication) device, an M2M (Machine-to-Machine) device, a D2D (Device-to-Device) device, a vehicle, an RSU (road side unit), a robot, an AI (Artificial Intelligence) module, a drone (UAV: Unmanned Aerial Vehicle), an AR (Augmented Reality) device, a VR (Virtual Reality) device, etc.

The following description may be used for a variety of radio access systems such as CDMA, FDMA, TDMA, OFDMA, SC-FDMA, etc. CDMA may be implemented by a wireless technology such as UTRA (Universal Terrestrial Radio Access) or CDMA2000. TDMA may be implemented by a radio technology such as GSM (Global System for Mobile communications)/GPRS (General Packet Radio Service)/EDGE (Enhanced Data Rates for GSM Evolution). OFDMA may be implemented by a radio technology such as IEEE 802.11(Wi-Fi), IEEE 802.16(WiMAX), IEEE 802-20, E-UTRA (Evolved UTRA), etc. UTRA is a part of a UMTS (Universal Mobile Telecommunications System). 3GPP (3rd Generation Partnership Project) LTE (Long Term Evolution) is a part of an E-UMTS (Evolved UMTS) using E-UTRA and LTE-A (Advanced)/LTE-A pro is an advanced version of 3GPP LTE. 3GPP NR (New Radio or New Radio Access Technology) is an advanced version of 3GPP LTE/LTE-A/LTE-A pro.

To clarify description, it is described based on a 3GPP communication system (e.g., LTE-A, NR), but a technical idea of the present disclosure is not limited thereto. LTE means a technology after 3GPP TS (Technical Specification) 36.xxx Release 8. In detail, an LTE technology in or after 3GPP TS 36.xxx Release 10 is referred to as LTE-A and an LTE technology in or after 3GPP TS 36.xxx Release 13 is referred to as LTE-A pro. 3GPP NR means a technology in or after TS 38.xxx Release 15. LTE/NR may be referred to as a 3GPP system. "xxx" means a detailed number for a standard document. LTE/NR may be commonly referred to as a 3GPP system. For a background art, a term, an abbreviation, etc. used to describe the present disclosure, matters described in a standard document disclosed before the present disclosure may be referred to. For example, the following document may be referred to.

For 3GPP LTE, TS 36.211 (physical channels and modulation), TS 36.212 (multiplexing and channel coding), TS 36.213 (physical layer procedures), TS 36.300 (overall description), TS 36.331 (radio resource control) may be referred to.

For 3GPP NR, TS 38.211 (physical channels and modulation), TS 38.212 (multiplexing and channel coding), TS 38.213 (physical layer procedures for control), TS 38.214 (physical layer procedures for data), TS 38.300 (NR and NG-RAN (New Generation-Radio Access Network) overall description), TS 38.331 (radio resource control protocol specification) may be referred to.

Abbreviations of terms which may be used in the present disclosure is defined as follows.

BM: beam management
CQI: Channel Quality Indicator
CRI: channel state information-reference signal resource indicator
CSI: channel state information
CSI-IM: channel state information-interference measurement
CSI-RS: channel state information-reference signal
DMRS: demodulation reference signal
FDM: frequency division multiplexing
FFT: fast Fourier transform
IFDMA: interleaved frequency division multiple access
IFFT: inverse fast Fourier transform
L1-RSRP: Layer 1 reference signal received power
L1-RSRQ: Layer 1 reference signal received quality
MAC: medium access control
NZP: non-zero power
OFDM: orthogonal frequency division multiplexing
PDCCH: physical downlink control channel
PDSCH: physical downlink shared channel
PMI: precoding matrix indicator
RE: resource element
RI: Rank indicator
RRC: radio resource control
RSSI: received signal strength indicator
Rx: Reception
QCL: quasi co-location
SINR: signal to interference and noise ratio
SSB (or SS/PBCH block): Synchronization signal block (including PSS (primary synchronization signal), SSS (secondary synchronization signal) and PBCH (physical broadcast channel))
TDM: time division multiplexing
TRP: transmission and reception point
TRS: tracking reference signal
Tx: transmission
UE: user equipment
ZP: zero power Overall System As more communication devices have required a higher capacity, a need for an improved mobile broadband communication compared to the existing radio access technology (RAT) has emerged. In addition, massive MTC (Machine Type Communications) providing a variety of services anytime and anywhere by connecting a plurality of devices and things is also one of main issues which will be considered in a next-generation communication. Furthermore, a communication system design considering a service/a terminal sensitive to reliability and latency is also discussed. As such, introduction of a next-generation RAT considering eMBB (enhanced mobile broadband communication), mMTC (massive MTC), URLLC (Ultra-Reliable and Low Latency Communication), etc. is discussed and, for convenience, a corresponding technology is referred to as NR in the present disclosure. NR is an expression which represents an example of a 5G RAT.

A new RAT system including NR uses an OFDM transmission method or a transmission method similar to it. A new RAT system may follow OFDM parameters different from OFDM parameters of LTE. Alternatively, a new RAT system follows a numerology of the existing LTE/LTE-A as it is, but may support a wider system bandwidth (e.g., 100 MHz). Alternatively, one cell may support a plurality of numerologies. In other words, terminals which operate in accordance with different numerologies may coexist in one cell.

A numerology corresponds to one subcarrier spacing in a frequency domain. As a reference subcarrier spacing is scaled by an integer N, a different numerology may be defined.

FIG. 1 illustrates a structure of a wireless communication system to which the present disclosure may be applied.

In reference to FIG. 1, NG-RAN is configured with gNBs which provide a control plane (RRC) protocol end for a NG-RA (NG-Radio Access) user plane (i.e., a new AS (access stratum) sublayer/PDCP (Packet Data Convergence Protocol)/RLC (Radio Link Control)/MAC/PHY) and UE. The gNBs are interconnected through a Xn interface. The gNB, in addition, is connected to an NGC (New Generation Core) through an NG interface. In more detail, the gNB is connected to an AMF (Access and Mobility Management Function) through an N2 interface, and is connected to a UPF (User Plane Function) through an N3 interface.

Figure 2:
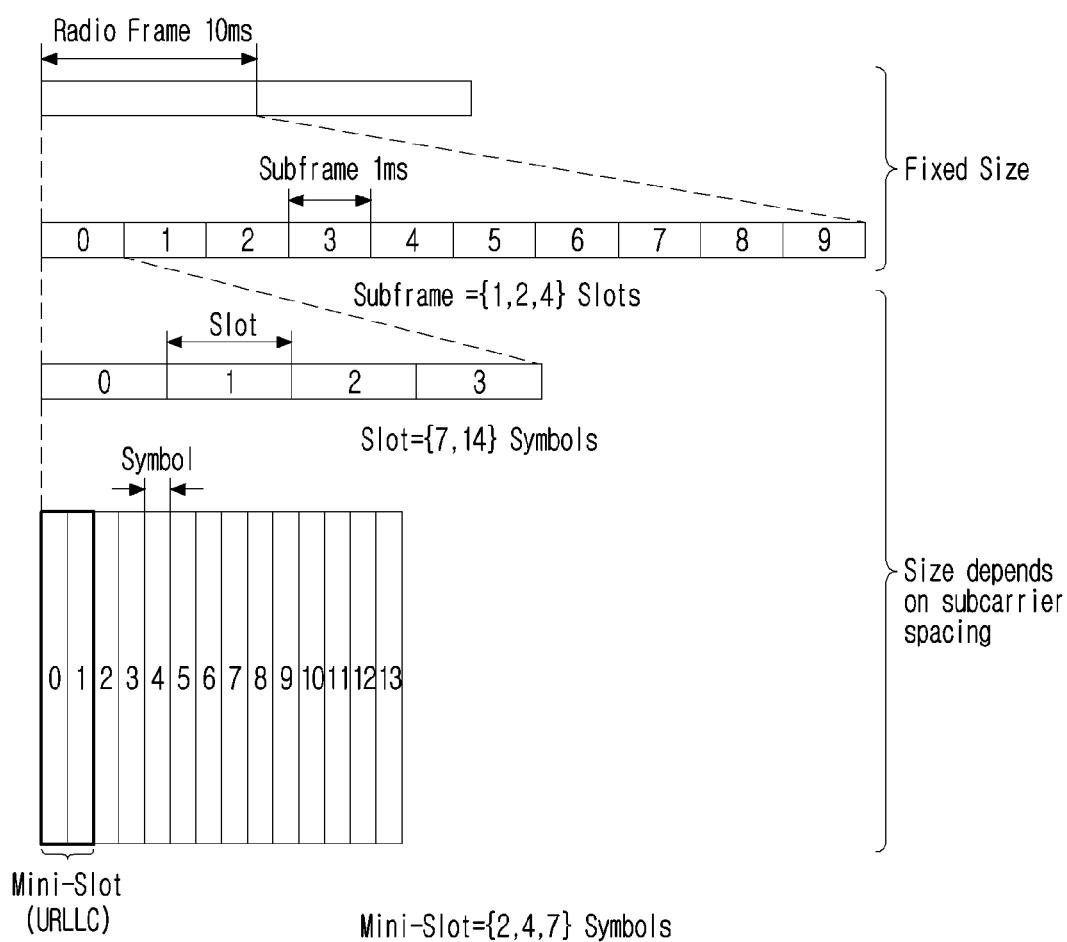
FIG. 2 illustrates a frame structure in a wireless communication system to which the present disclosure may be applied.

FIG. 2 illustrates a frame structure in a wireless communication system to which the present disclosure may be applied.

A NR system may support a plurality of numerologies. Here, a numerology may be defined by a subcarrier spacing and a cyclic prefix (CP) overhead. Here, a plurality of subcarrier spacings may be derived by scaling a basic (reference) subcarrier spacing by an integer N (or, μ). In addition, although it is assumed that a very low subcarrier spacing is not used in a very high carrier frequency, a used numerology may be selected independently from a frequency band. In addition, a variety of frame structures according to a plurality of numerologies may be supported in a NR system.

Hereinafter, an OFDM numerology and frame structure which may be considered in a NR system will be described. A plurality of OFDM numerologies supported in a NR system may be defined as in the following Table 1.

TABLE 1

| μ | Δf = $2^\mu \cdot 15$ [kHz] | CP |
|---|---|---|
| 0 | 15 | Normal |
| 1 | 30 | Normal |
| 2 | 60 | Normal, Extended |
| 3 | 120 | Normal |
| 4 | 240 | Normal |

NR supports a plurality of numerologies (or subcarrier spacings (SCS)) for supporting a variety of 5G services. For example, when a SCS is 15 kHz, a wide area in traditional cellular bands is supported, and when a SCS is 30 kHz/60 kHz, dense-urban, lower latency and a wider carrier bandwidth are supported, and when a SCS is 60 kHz or higher, a bandwidth wider than 24.25 GHz is supported to overcome a phase noise.

An NR frequency band is defined as a frequency range in two types (FR1, FR2). FR1, FR2 may be configured as in the following Table 2. In addition, FR2 may mean a millimeter wave (mmW).

TABLE 2

| Frequency Range designation | Corresponding frequency range | Subcarrier Spacing |
|---|---|---|
| FR1 | 410 MHz-7125 MHz | 15, 30, 60 kHz |
| FR2 | 24250 MHz-52600 MHz | 60, 120, 240 kHz |

Regarding a frame structure in an NR system, a size of a variety of fields in a time domain is expresses as a multiple of a time unit of $T_c = 1/(\Delta f_{max} \cdot N_f)$. Here, $\Delta f_{max}$ is $480 \cdot 10^3$ Hz and $N_f$ is 4096. Downlink and uplink transmission is configured (organized) with a radio frame having a duration of $T_f = 1/(\Delta f_{max} N_f/100) \cdot T_c = 10$ ms. Here, a radio frame is configured with 10 subframes having a duration of $T_{sf} = (\Delta f_{max} N_f/1000) \cdot T_c = 1$ ms, respectively. In this case, there may be one set of frames for an uplink and one set of frames for a downlink. In addition, transmission in an uplink frame No. i from a terminal should start earlier by $T_{TA} = (N_{TA} + N_{TA,offset})T_c$ than a corresponding downlink frame in a corresponding terminal starts. For a subcarrier spacing configuration μ, slots are numbered in an increasing order of $n_s^\mu \in \{0, \ldots, N_{slot}^{subframe,\mu}-1\}$ in a subframe and are numbered in an increasing order of $n_{s,f}^\mu \in \{0, \ldots, N_{slot}^{frame,\mu}-1\}$ in a radio frame. One slot is configured with $N_{symb}^{slot}$ consecutive OFDM symbols and $N_{symb}^{slot}$ is determined according to CP. A start of a slot $n_s^\mu$ in a subframe is temporally arranged with a start of an OFDM symbol $n_s^\mu N_{symb}^{slot}$ in the same subframe. All terminals may not perform transmission and reception at the same time, which means that all OFDM symbols of a downlink slot or an uplink slot may not be used.

Table 3 represents the number of OFDM symbols per slot ($N_{symb}^{slot}$), the number of slots per radio frame ($N_{slot}^{frame,\mu}$) and the number of slots per subframe ($N_{slot}^{subframe,\mu}$) in a normal CP and Table 4 represents the number of OFDM symbols per slot, the number of slots per radio frame and the number of slots per subframe in an extended CP.

TABLE 3

| μ | $N_{symb}^{slot}$ | $N_{slot}^{frame, \mu}$ | $N_{slot}^{subframe, \mu}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |

TABLE 4

| μ | $N_{symb}^{slot}$ | $N_{slot}^{frame, \mu}$ | $N_{slot}^{subframe, \mu}$ |
|---|---|---|---|
| 2 | 12 | 40 | 4 |

FIG. 2 is an example on μ=2 (SCS is 60 kHz), 1 subframe may include 4 slots referring to Table 3. 1 subframe={1,2,4} slot shown in FIG. 2 is an example, the number of slots which may be included in 1 subframe is defined as in Table 3 or Table 4. In addition, a mini-slot may include 2, 4 or 7 symbols or more or less symbols.

Regarding a physical resource in a NR system, an antenna port, a resource grid, a resource element, a resource block, a carrier part, etc. may be considered. Hereinafter, the physical resources which may be considered in an NR system will be described in detail.

First, in relation to an antenna port, an antenna port is defined so that a channel where a symbol in an antenna port is carried can be inferred from a channel where other symbol in the same antenna port is carried. When a large-scale property of a channel where a symbol in one antenna port is carried may be inferred from a channel where a symbol in other antenna port is carried, it may be said that 2 antenna ports are in a QC/QCL (quasi co-located or quasi co-location) relationship. In this case, the large-scale property includes at least one of delay spread, doppler spread, frequency shift, average received power, received timing.

Figure 3:
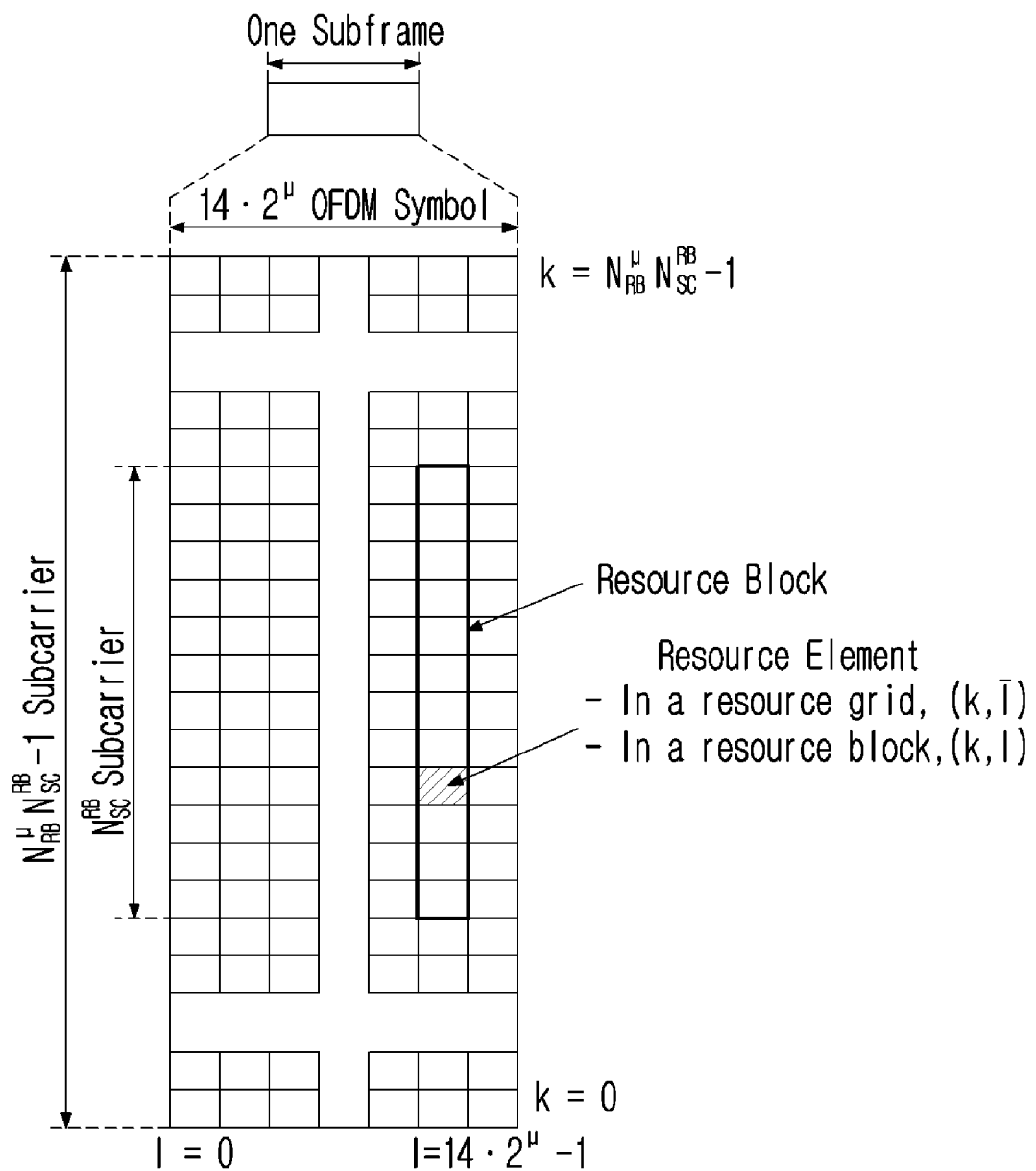
FIG. 3 illustrates a resource grid in a wireless communication system to which the present disclosure may be applied.

FIG. 3 illustrates a resource grid in a wireless communication system to which the present disclosure may be applied.

In reference to FIG. 3, it is illustratively described that a resource grid is configured with $N_{RB}^{\mu} N_{sc}^{RB}$ subcarriers in a frequency domain and one subframe is configured with $14 \cdot 2^{\mu}$ OFDM symbols, but it is not limited thereto. In an NR system, a transmitted signal is described by OFDM symbols of $2^{\mu} N_{symb}^{(\mu)}$ and one or more resource grids configured with $N_{RB}^{\mu} N_{sc}^{RB}$ subcarriers. Here, $N_{RB}^{\mu} \leq N_{RB}^{max,\mu}$. The $N_{RB}^{max,\mu}$ represents a maximum transmission bandwidth, which may be different between an uplink and a downlink as well as between numerologies. In this case, one resource grid may be configured per μ and antenna port p. Each element of a resource grid for μ and an antenna port p is referred to as a resource element and is uniquely identified by an index pair (k,l'). Here, k=0, . . . , $N_{RB}^{\mu} N_{sc}^{RB}-1$ is an index in a frequency domain and l'=0, . . . , $2^{\mu} N_{symb}^{(\mu)}-1$ refers to a position of a symbol in a subframe. When referring to a resource element in a slot, an index pair (k,l) is used. Here, l=0, . . . , $N_{symb}^{\mu}-1$. A resource element (k,l') for μ and an antenna port p corresponds to a complex value, $a_{k,l'}^{(p,\mu)}$. When there is no risk of confusion or when a specific antenna port or numerology is not specified, indexes p and μ may be dropped, whereupon a complex value may be $a_{k,l'}^{(p)}$ or $a_{k,l'}$. In addition, a resource block (RB) is defined as $N_{sc}^{RB}=12$ consecutive subcarriers in a frequency domain.

Point A plays a role as a common reference point of a resource block grid and is obtained as follows.

offsetToPointA for a primary cell (PCell) downlink represents a frequency offset between point A and the lowest subcarrier of the lowest resource block overlapped with a SS/PBCH block which is used by a terminal for an initial cell selection. It is expressed in resource block units assuming a 15 kHz subcarrier spacing for FR1 and a 60 kHz subcarrier spacing for FR2.

absoluteFrequencyPointA represents a frequency-position of point A expressed as in ARFCN (absolute radio-frequency channel number).

Common resource blocks are numbered from 0 to the top in a frequency domain for a subcarrier spacing configuration μ. The center of subcarrier 0 of common resource block 0 for a subcarrier spacing configuration μ is identical to 'point A'. A relationship between a common resource block number $n_{CRB}^{\mu}$ and a resource element (k,l) for a subcarrier spacing configuration μ in a frequency domain is given as in the following Equation 1.

$$n_{CRB}^{\mu} = \left\lfloor \frac{k}{N_{sc}^{RB}} \right\rfloor \quad \text{[Equation 1]}$$

In Equation 1, k is defined relatively to point A so that k=0 corresponds to a subcarrier centering in point A. Physical resource blocks are numbered from 0 to $N_{BWP,i}^{size,\mu}-1$ in a bandwidth part (BWP) and i is a number of a BWP. A relationship between a physical resource block $n_{PRB}$ and a common resource block $n_{CRB}$ in BWP i is given by the following Equation 2.

$$n_{CRB}^{\mu} = n_{PRB}^{\mu} + N_{BWP,i}^{start,\mu} \quad \text{[Equation 2]}$$

$N_{BWP,i}^{start,\mu}$ is a common resource block that a BWP starts relatively to common resource block 0.

Figure 4:
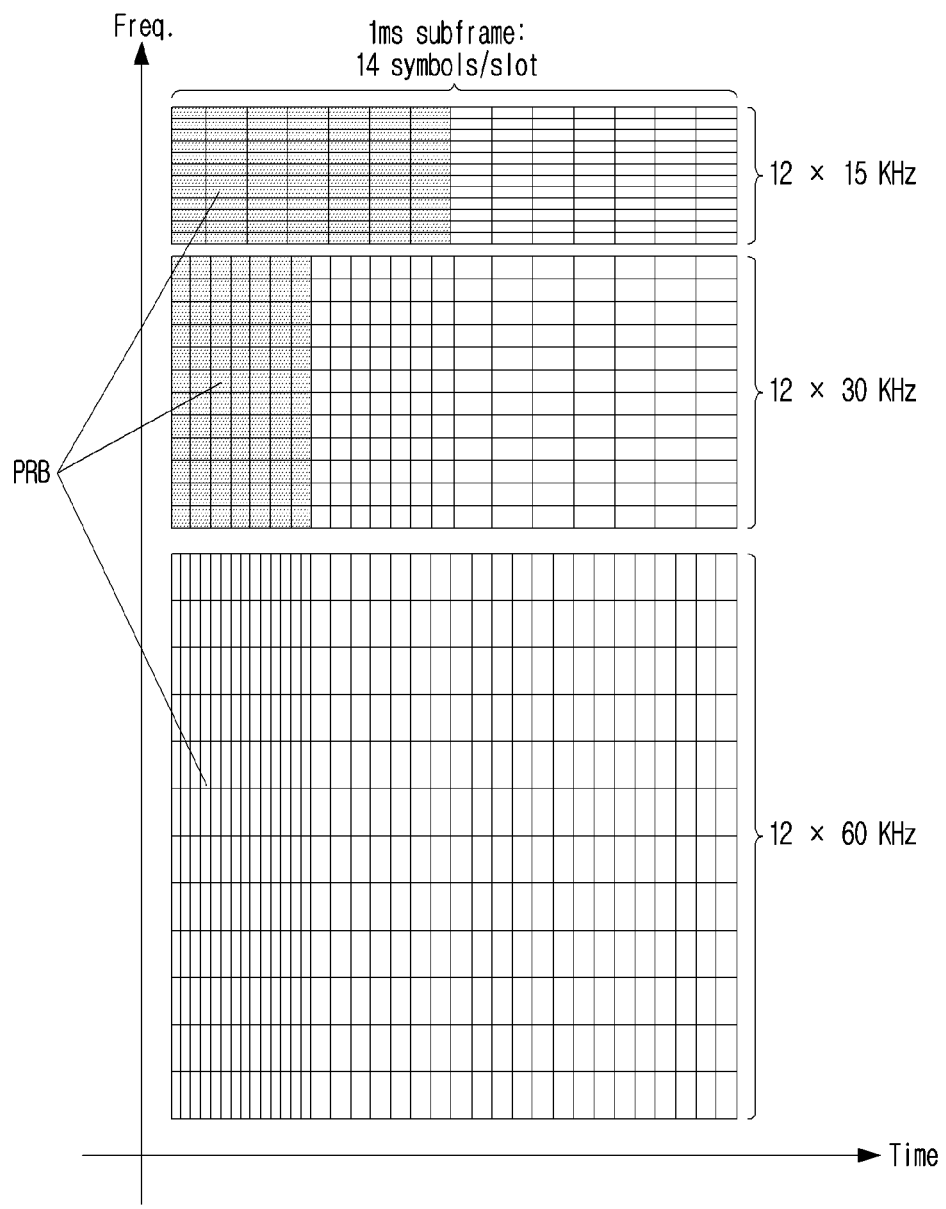
FIG. 4 illustrates a physical resource block in a wireless communication system to which the present disclosure may be applied.

FIG. 4 illustrates a physical resource block in a wireless communication system to which the present disclosure may be applied. And, FIG. 5 illustrates a slot structure in a wireless communication system to which the present disclosure may be applied.

Figure 5:
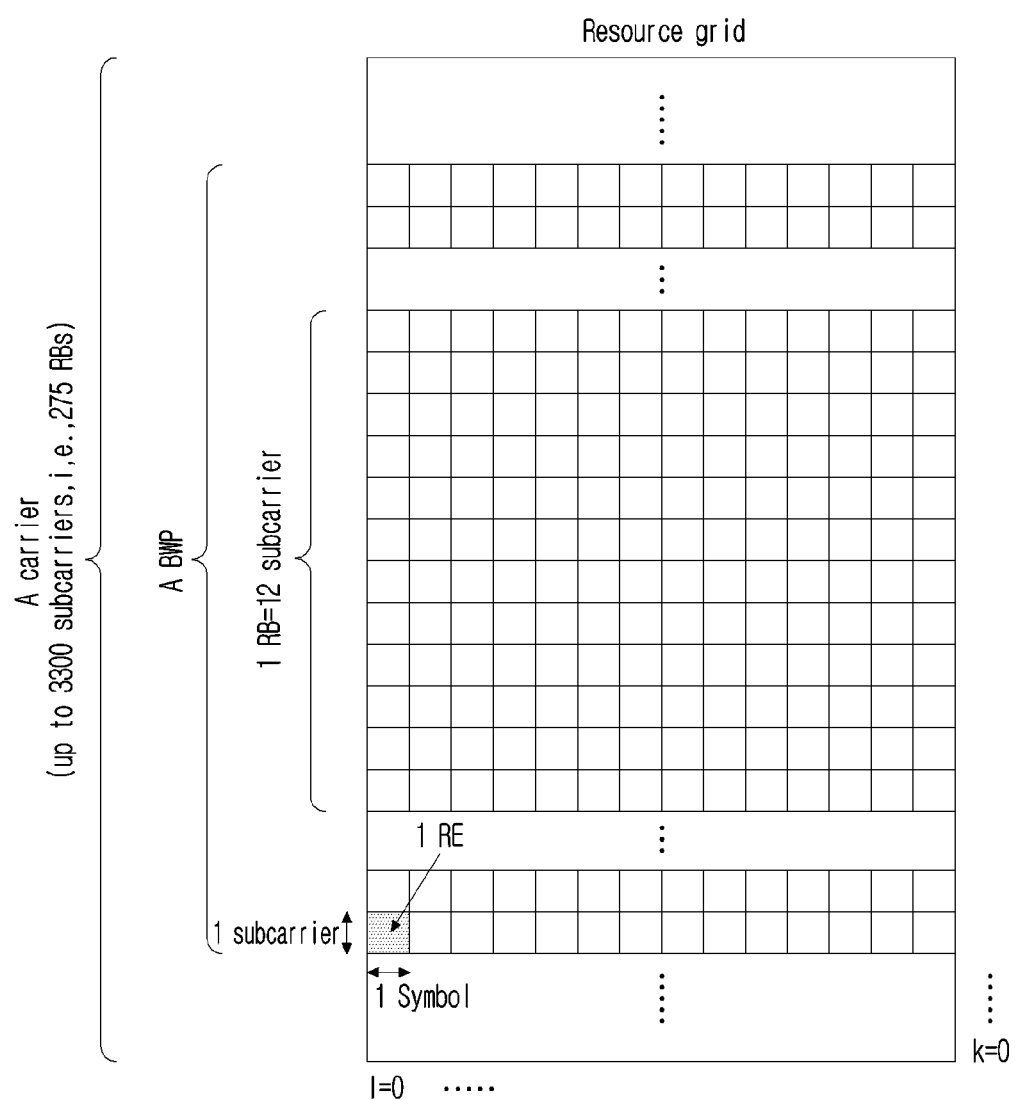
FIG. 5 illustrates a slot structure in a wireless communication system to which the present disclosure may be applied.

In reference to FIG. 4 and FIG. 5, a slot includes a plurality of symbols in a time domain. For example, for a normal CP, one slot includes 7 symbols, but for an extended CP, one slot includes 6 symbols.

A carrier includes a plurality of subcarriers in a frequency domain. An RB (Resource Block) is defined as a plurality of (e.g., 12) consecutive subcarriers in a frequency domain. A BWP (Bandwidth Part) is defined as a plurality of consecutive (physical) resource blocks in a frequency domain and may correspond to one numerology (e.g., an SCS, a CP length, etc.). A carrier may include a maximum N (e.g., 5) BWPs. A data communication may be performed through an activated BWP and only one BWP may be activated for one terminal. In a resource grid, each element is referred to as a resource element (RE) and one complex symbol may be mapped.

In an NR system, up to 400 MHz may be supported per component carrier (CC). If a terminal operating in such a wideband CC always operates turning on a radio frequency (FR) chip for the whole CC, terminal battery consumption may increase. Alternatively, when several application cases operating in one wideband CC (e.g., eMBB, URLLC, Mmtc, V2X, etc.) are considered, a different numerology (e.g., a subcarrier spacing, etc.) may be supported per frequency band in a corresponding CC. Alternatively, each terminal may have a different capability for the maximum bandwidth. By considering it, a base station may indicate a terminal to operate only in a partial bandwidth, not in a full bandwidth of a wideband CC, and a corresponding partial bandwidth is defined as a bandwidth part (BWP) for convenience. A BWP may be configured with consecutive RBs on a frequency axis and may correspond to one numerology (e.g., a subcarrier spacing, a CP length, a slot/a mini-slot duration).

Meanwhile, a base station may configure a plurality of BWPs even in one CC configured to a terminal. For example, a BWP occupying a relatively small frequency domain may be configured in a PDCCH monitoring slot, and a PDSCH indicated by a PDCCH may be scheduled in a greater BWP. Alternatively, when UEs are congested in a specific BWP, some terminals may be configured with other BWP for load balancing. Alternatively, considering frequency domain inter-cell interference cancellation between neighboring cells, etc., some middle spectrums of a full bandwidth may be excluded and BWPs on both edges may be configured in the same slot. In other words, a base station may configure at least one DL/UL BWP to a terminal associated with a wideband CC. A base station may activate at least one DL/UL BWP of configured DL/UL BWP(s) at a specific time (by L1 signaling or MAC CE (Control Element) or RRC signaling, etc.). In addition, a base station may indicate switching to other configured DL/UL BWP (by L1 signaling or MAC CE or RRC signaling, etc.). Alternatively, based on a timer, when a timer value is expired, it may be switched to a determined DL/UL BWP. Here, an activated DL/UL BWP is defined as an active DL/UL BWP. But, a configuration on a DL/UL BWP may not be received when a terminal performs an initial access procedure or before a RRC connection is set up, so a DL/UL BWP which is assumed by a terminal under these situations is defined as an initial active DL/UL BWP.

Figure 6:
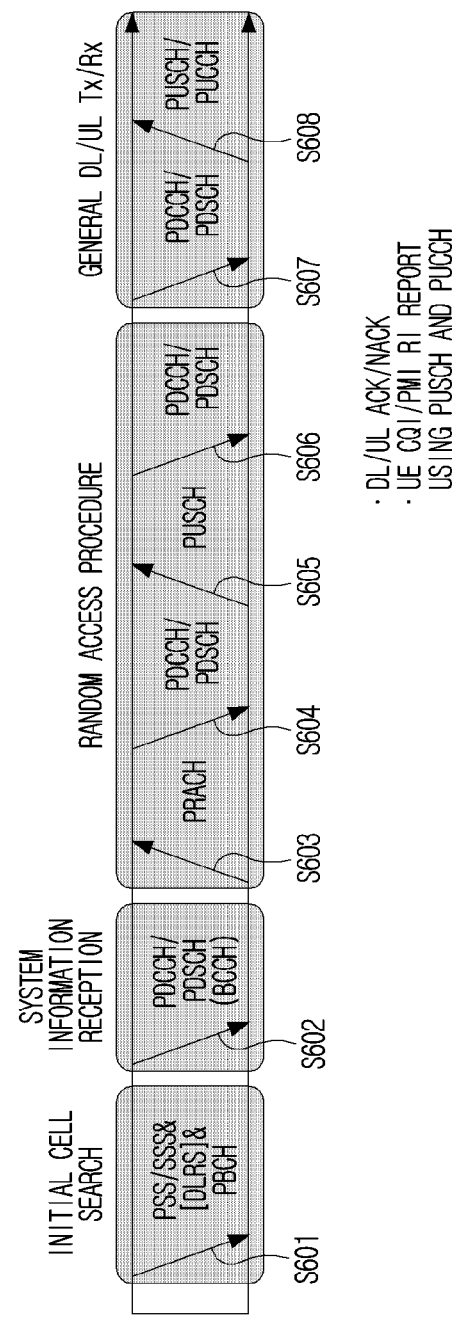
FIG. 6 illustrates physical channels used in a wireless communication system to which the present disclosure may be applied and a general signal transmission and reception method using them.

FIG. 6 illustrates physical channels used in a wireless communication system to which the present disclosure may be applied and a general signal transmission and reception method using them.

In a wireless communication system, a terminal receives information through a downlink from a base station and transmits information through an uplink to a base station. Information transmitted and received by a base station and a terminal includes data and a variety of control information and a variety of physical channels exist according to a type/a usage of information transmitted and received by them.

When a terminal is turned on or newly enters a cell, it performs an initial cell search including synchronization with a base station or the like (S601). For the initial cell search, a terminal may synchronize with a base station by receiving a primary synchronization signal (PSS) and a secondary synchronization signal (SSS) from a base station and obtain information such as a cell identifier (ID), etc. After that, a terminal may obtain broadcasting information in a cell by receiving a physical broadcast channel (PBCH) from a base station. Meanwhile, a terminal may check out a downlink channel state by receiving a downlink reference signal (DL RS) at an initial cell search stage.

A terminal which completed an initial cell search may obtain more detailed system information by receiving a physical downlink control channel (PDCCH) and a physical downlink shared channel (PDSCH) according to information carried in the PDCCH (S602).

Meanwhile, when a terminal accesses to a base station for the first time or does not have a radio resource for signal transmission, it may perform a random access (RACH) procedure to a base station (S603 to S606). For the random access procedure, a terminal may transmit a specific sequence as a preamble through a physical random access channel (PRACH) (S603 and S605) and may receive a response message for a preamble through a PDCCH and a corresponding PDSCH (S604 and S606). A contention based RACH may additionally perform a contention resolution procedure.

A terminal which performed the above-described procedure subsequently may perform PDCCH/PDSCH reception (S607) and PUSCH (Physical Uplink Shared Channel)/PUCCH (physical uplink control channel) transmission (S608) as a general uplink/downlink signal transmission procedure. In particular, a terminal receives downlink control information (DCI) through a PDCCH. Here, DCI includes control information such as resource allocation information for a terminal and a format varies depending on its purpose of use.

Meanwhile, control information which is transmitted by a terminal to a base station through an uplink or is received by a terminal from a base station includes a downlink/uplink ACK/NACK (Acknowledgement/Non-Acknowledgement) signal, a CQI (Channel Quality Indicator), a PMI (Precoding Matrix Indicator), a RI (Rank Indicator), etc. For a 3GPP LTE system, a terminal may transmit control information of the above-described CQI/PMI/RI, etc. through a PUSCH and/or a PUCCH.

Table 5 represents an example of a DCI format in an NR system.

TABLE 5

| DCI Format | Use |
| --- | --- |
| 0_0 | Scheduling of a PUSCH in one cell |
| 0_1 | Scheduling of one or multiple PUSCHs in one cell, or indication of cell group downlink feedback information to a UE |
| 0_2 | Scheduling of a PUSCH in one cell |
| 1_0 | Scheduling of a PDSCH in one DL cell |
| 1_1 | Scheduling of a PDSCH in one cell |
| 1_2 | Scheduling of a PDSCH in one cell |

In reference to Table 5, DCI formats 0_0, 0_1 and 0_2 may include resource information (e.g., UL/SUL (Supplementary UL), frequency resource allocation, time resource allocation, frequency hopping, etc.), information related to a transport block (TB) (e.g., MCS (Modulation Coding and Scheme), a NDI (New Data Indicator), a RV (Redundancy Version), etc.), information related to a HARQ (Hybrid-Automatic Repeat and request) (e.g., a process number, a DAI (Downlink Assignment Index), PDSCH-HARQ feedback timing, etc.), information related to multiple antennas (e.g., DMRS sequence initialization information, an antenna port, a CSI request, etc.), power control information (e.g., PUSCH power control, etc.) related to scheduling of a PUSCH and control information included in each DCI format may be pre-defined.

DCI format 0_0 is used for scheduling of a PUSCH in one cell. Information included in DCI format 0_0 is CRC (cyclic redundancy check) scrambled by a C-RNTI (Cell Radio Network Temporary Identifier) or a CS-RNTI (Configured Scheduling RNTI) or a MCS-C-RNTI (Modulation Coding Scheme Cell RNTI) and transmitted.

DCI format 0_1 is used to indicate scheduling of one or more PUSCHs or configure grant (CG) downlink feedback information to a terminal in one cell. Information included in DCI format 0_1 is CRC scrambled by a C-RNTI or a CS-RNTI or a SP-CSI-RNTI (Semi-Persistent CSI RNTI) or a MCS-C-RNTI and transmitted.

DCI format 0_2 is used for scheduling of a PUSCH in one cell. Information included in DCI format 0_2 is CRC scrambled by a C-RNTI or a CS-RNTI or a SP-CSI-RNTI or a MCS-C-RNTI and transmitted.

Next, DCI formats 1_0, 1_1 and 1_2 may include resource information (e.g., frequency resource allocation, time resource allocation, VRB (virtual resource block)-PRB (physical resource block) mapping, etc.), information related to a transport block (TB) (e.g., MCS, NDI, RV, etc.), information related to a HARQ (e.g., a process number, DAI, PDSCH-HARQ feedback timing, etc.), information related to multiple antennas (e.g., an antenna port, a TCI (transmission configuration indicator), a SRS (sounding reference signal) request, etc.), information related to a PUCCH (e.g., PUCCH power control, a PUCCH resource indicator, etc.) related to scheduling of a PDSCH and control information included in each DCI format may be pre-defined.

DCI format 1_0 is used for scheduling of a PDSCH in one DL cell. Information included in DCI format 1_0 is CRC scrambled by a C-RNTI or a CS-RNTI or a MCS-C-RNTI and transmitted.

DCI format 1_1 is used for scheduling of a PDSCH in one cell. Information included in DCI format 1_1 is CRC scrambled by a C-RNTI or a CS-RNTI or a MCS-C-RNTI and transmitted.

DCI format 1_2 is used for scheduling of a PDSCH in one cell. Information included in DCI format 1_2 is CRC scrambled by a C-RNTI or a CS-RNTI or a MCS-C-RNTI and transmitted.

Operation Related to Multi-TRPs

A coordinated multi point (CoMP) scheme refers to a scheme in which a plurality of base stations effectively control interference by exchanging (e.g., using an X2 interface) or utilizing channel information (e.g., RI/CQI/PMI/LI (layer indicator), etc.) fed back by a terminal and cooperatively transmitting to a terminal. According to a scheme used, a CoMP may be classified into joint transmission (JT), coordinated Scheduling (CS), coordinated Beamforming (CB), dynamic Point Selection (DPS), dynamic Point Blocking (DPB), etc.

M-TRP transmission schemes that M TRPs transmit data to one terminal may be largely classified into i) eMBB M-TRP transmission, a scheme for improving a transfer rate, and ii) URLLC M-TRP transmission, a scheme for increasing a reception success rate and reducing latency.

In addition, with regard to DCI transmission, M-TRP transmission schemes may be classified into i) M-TRP transmission based on M-DCI (multiple DCI) that each TRP transmits different DCIs and ii) M-TRP transmission based on S-DCI (single DCI) that one TRP transmits DCI. For example, for S-DCI based M-TRP transmission, all scheduling information on data transmitted by M TRPs should be delivered to a terminal through one DCI, it may be used in an environment of an ideal BackHaul (ideal BH) where dynamic cooperation between two TRPs is possible.

For TDM based URLLC M-TRP transmission, scheme 3/4 is under discussion for standardization. Specifically, scheme 4 means a scheme in which one TRP transmits a transport block (TB) in one slot and it has an effect to improve a probability of data reception through the same TB received from multiple TRPs in multiple slots. Meanwhile, scheme 3 means a scheme in which one TRP transmits a TB through consecutive number of OFDM symbols (i.e., a symbol group) and TRPs may be configured to transmit the same TB through a different symbol group in one slot.

In addition, UE may recognize PUSCH (or PUCCH) scheduled by DCI received in different control resource sets (CORESETs) (or CORESETs belonging to different CORESET groups) as PUSCH (or PUCCH) transmitted to different TRPs or may recognize PDSCH (or PDCCH) from different TRPs. In addition, the below-described method for UL transmission (e.g., PUSCH/PUCCH) transmitted to different TRPs may be applied equivalently to UL transmission (e.g., PUSCH/PUCCH)transmitted to different panels belonging to the same TRP.

Hereinafter, multiple DCI based non-coherent joint transmission (NCJT)/single DCI based NCJT will be described.

NCJT (Non-coherent joint transmission) is a scheme in which a plurality of transmission points (TP) transmit data to one terminal by using the same time frequency resource, TPs transmit data by using a different DMRS (Demodulation Multiplexing Reference Signal) between TPs through a different layer (i.e., through a different DMRS port).

A TP delivers data scheduling information through DCI to a terminal receiving NCJT. Here, a scheme in which each TP participating in NCJT delivers scheduling information on data transmitted by itself through DCI is referred to as 'multi DCI based NCJT'. As each of N TPs participating in NCJT transmission transmits DL grant DCI and a PDSCH to UE, UE receives N DCI and N PDSCHs from N TPs. Meanwhile, a scheme in which one representative TP delivers scheduling information on data transmitted by itself and data transmitted by a different TP (i.e., a TP participating in NCJT) through one DCI is referred to as 'single DCI based NCJT'. Here, N TPs transmit one PDSCH, but each TP transmits only some layers of multiple layers included in one PDSCH. For example, when 4-layer data is transmitted, TP 1 may transmit 2 layers and TP 2 may transmit 2 remaining layers to UE.

Multiple TRPs (MTRPs) performing NCJT transmission may transmit DL data to a terminal by using any one scheme of the following two schemes.

First, 'a single DCI based MTRP scheme' is described. MTRPs cooperatively transmit one common PDSCH and each TRP participating in cooperative transmission spatially partitions and transmits a corresponding PDSCH into different layers (i.e., different DMRS ports) by using the same time frequency resource. Here, scheduling information on the PDSCH is indicated to UE through one DCI and which DMRS (group) port uses which QCL RS and QCL type information is indicated by the corresponding DCI (which is different from DCI indicating a QCL RS and a type which will be commonly applied to all DMRS ports indicated as in the existing scheme). In other words, M TCI states may be indicated through a TCI (Transmission Configuration Indicator) field in DCI (e.g., for 2 TRP cooperative transmission, M=2) and a QCL RS and a type may be indicated by using M different TCI states for M DMRS port group. In addition, DMRS port information may be indicated by using a new DMRS table.

Next, 'a multiple DCI based MTRP scheme' is described. Each of MTRPs transmits different DCI and PDSCH and (part or all of) the corresponding PDSCHs are overlapped each other and transmitted in a frequency time resource. Corresponding PDSCHs may be scrambled through a different scrambling ID (identifier) and the DCI may be transmitted through a CORESET belonging to a different CORESET group. (Here, a CORESET group may be identified by an index defined in a CORESET configuration of each CORESET. For example, when index=0 is configured for CORESETs 1 and 2 and index=1 is configured for CORESETs 3 and 4, CORESETs 1 and 2 are CORESET group 0 and CORESET 3 and 4 belong to a CORESET group 1. In addition, when an index is not defined in a CORESET, it may be construed as index=0) When a plurality of scrambling IDs are configured or two or more CORESET groups are configured in one serving cell, a UE may notice that it receives data according to a multiple DCI based MTRP operation.

Alternatively, whether of a single DCI based MTRP scheme or a multiple DCI based MTRP scheme may be indicated to UE through separate signaling. In an example, for one serving cell, a plurality of CRS (cell reference signal) patterns may be indicated to UE for a MTRP operation. In this case, PDSCH rate matching for a CRS may be different depending on a single DCI based MTRP scheme or a multiple DCI based MTRP scheme (because a CRS pattern is different).

Hereinafter, a CORESET group ID described/mentioned in the present disclosure may mean an index/identification information (e.g., an ID, etc.) for distinguishing a CORESET for each TRP/panel. In addition, a CORESET group may be a group/union of CORESET distinguished by an index/identification information (e.g., an ID)/the CORESET group ID, etc. for distinguishing a CORESET for each TRP/panel. In an example, a CORESET group ID may be specific index information defined in a CORESET configuration. In this case, a CORESET group may be configured/indicated/defined by an index defined in a CORESET configuration for each CORESET. Additionally/alternatively, a CORESET group ID may mean an index/identification information/an indicator, etc. for distinguishment/identification between CORESETs configured/associated with each TRP/panel. Hereinafter, a CORESET group ID described/mentioned in the present disclosure may be expressed by being substituted with a specific index/specific identification information/a specific indicator for distinguishment/identification between CORESETs configured/associated with each TRP/panel. The CORESET group ID, i.e., a specific index/specific identification information/a specific indicator for distinguishment/identification between CORESETs configured/associated with each TRP/panel may be configured/indicated to a terminal through higher layer signaling (e.g., RRC signaling)/L2 signaling (e.g., MAC-CE)/L1 signaling (e.g., DCI), etc. In an example, it may be configured/indicated so that PDCCH detection will be performed per each TRP/panel in a unit of a corresponding CORESET group (i.e., per TRP/panel belonging to the same CORESET group). Additionally/alternatively, it may be configured/indicated so that uplink control information (e.g., CSI, HARQ-A/N (ACK/NACK), SR (scheduling request)) and/or uplink physical channel resources (e.g., PUCCH/PRACH/SRS resources) are separated and managed/controlled per each TRP/panel in a unit of a corresponding CORESET group (i.e., per TRP/panel belonging to the same CORESET group). Additionally/alternatively, HARQ A/N (process/retransmission) for PDSCH/PUSCH, etc. scheduled per each TRP/panel may be managed per corresponding CORESET group (i.e., per TRP/panel belonging to the same CORESET group).

Hereinafter, partially overlapped NCJT will be described.

In addition, NCJT may be classified into fully overlapped NCJT that time frequency resources transmitted by each TP are fully overlapped and partially overlapped NCJT that only some time frequency resources are overlapped. In other words, for partially overlapped NCJT, data of both of TP 1 and TP 2 are transmitted in some time frequency resources and data of only one TP of TP 1 or TP 2 is transmitted in remaining time frequency resources.

Hereinafter, a method for improving reliability in Multi-TRP will be described.

As a transmission and reception method for improving reliability using transmission in a plurality of TRPs, the following two methods may be considered.

Figure 7:
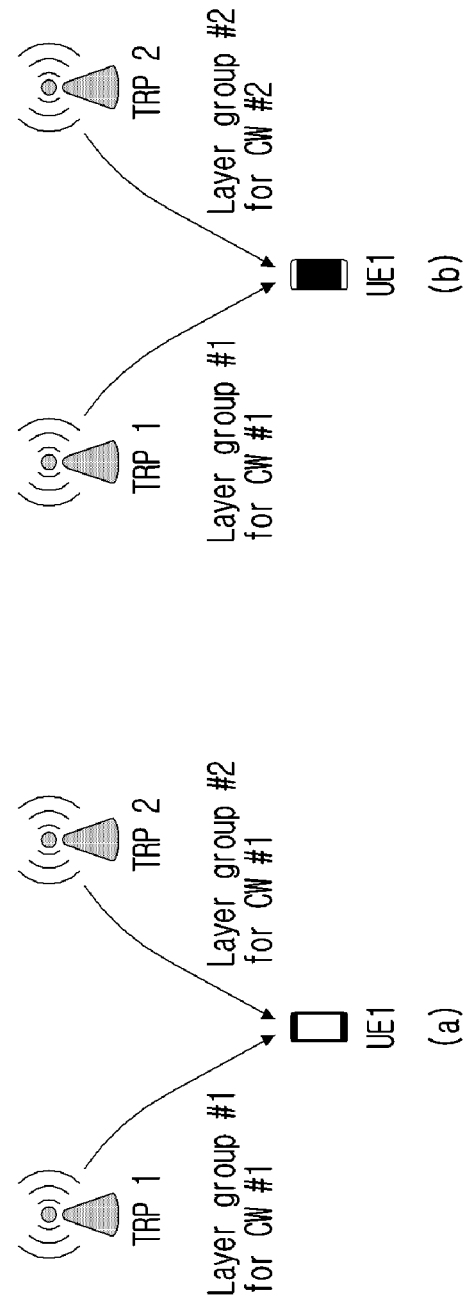
FIG. 7 illustrates a method of transmitting multiple TRPs in a wireless communication system to which the present disclosure may be applied.

FIG. 7 illustrates a method of multiple TRPs transmission in a wireless communication system to which the present disclosure may be applied.

In reference to FIG. 7(*a*), it is shown a case in which layer groups transmitting the same codeword (CW)/transport block (TB) correspond to different TRPs. Here, a layer group may mean a predetermined layer set including one or more layers. In this case, there is an advantage that the amount of transmitted resources increases due to the number of a plurality of layers and thereby a robust channel coding with a low coding rate may be used for a TB, and additionally, because a plurality of TRPs have different channels, it may be expected to improve reliability of a received signal based on a diversity gain.

In reference to FIG. 7(*b*), an example that different CWs are transmitted through layer groups corresponding to different TRPs is shown. Here, it may be assumed that a TB corresponding to CW #1 and CW #2 in the drawing is identical to each other. In other words, CW #1 and CW #2 mean that the same TB is respectively transformed through channel coding, etc. into different CWs by different TRPs. Accordingly, it may be considered as an example that the same TB is repetitively transmitted. In case of FIG. 7(*b*), it may have a disadvantage that a code rate corresponding to a TB is higher compared to FIG. 7(*a*). However, it has an advantage that it may adjust a code rate by indicating a different RV (redundancy version) value or may adjust a modulation order of each CW for encoded bits generated from the same TB according to a channel environment.

According to methods illustrated in FIG. 7(*a*) and FIG. 7(*b*) above, probability of data reception of a terminal may be improved as the same TB is repetitively transmitted through a different layer group and each layer group is transmitted by a different TRP/panel. It is referred to as a SDM (Spatial Division Multiplexing) based M-TRP URLLC transmission method. Layers belonging to different layer groups are respectively transmitted through DMRS ports belonging to different DMRS CDM groups.

In addition, the above-described contents related to multiple TRPs are described based on an SDM (spatial division multiplexing) method using different layers, but it may be naturally extended and applied to a FDM (frequency division multiplexing) method based on a different frequency domain resource (e.g., RB/PRB (set), etc.) and/or a TDM (time division multiplexing) method based on a different time domain resource (e.g., a slot, a symbol, a sub-symbol, etc.).

Regarding a method for multiple TRPs based URLLC scheduled by single DCI, the following method is discussed.

1) Method 1 (SDM): Time and Frequency Resource Allocation is Overlapped and n (n<=Ns) TCI States in a Single Slot 1-a) Method 1a The same TB is transmitted in one layer or layer set at each transmission time (occasion) and each layer or each layer set is associated with one TCI and one set of DMRS port(s).

A single codeword having one RV is used in all spatial layers or all layer sets. With regard to UE, different coded bits are mapped to a different layer or layer set by using the same mapping rule.

1-b) Method 1b

The same TB is transmitted in one layer or layer set at each transmission time (occasion) and each layer or each layer set is associated with one TCI and one set of DMRS port(s).

A single codeword having one RV is used in each spatial layer or each layer set. RV(s) corresponding to each spatial layer or each layer set may be the same or different.

1-c) Method 1c

At one transmission time (occasion), the same TB having one DMRS port associated with multiple TCI state indexes is transmitted in one layer or the same TB having multiple DMRS ports one-to-one associated with multiple TCI state indexes is transmitted in one layer.

In case of the method 1a and 1c, the same MCS is applied to all layers or all layer sets.

2) Method 2 (FDM): Frequency Resource Allocation is not Overlapped and n (n<=Nf) TCI States in a Single Slot Each non-overlapping frequency resource allocation is associated with one TCI state.

The same single/multiple DMRS port(s) are associated with all non-overlapping frequency resource allocation.

2-a) Method 2a
   A single codeword having one RV is used for all resource allocation. With regard to UE, common RB matching (mapping of a codeword to a layer) is applied to all resource allocation.
2-b) Method 2b
   A single codeword having one RV is used for each non-overlapping frequency resource allocation. A RV corresponding to each non-overlapping frequency resource allocation may be the same or different.
   For the method 2a, the same MCS is applied to all non-overlapping frequency resource allocation.
3) Method 3 (TDM): Time Resource Allocation is not Overlapped and n (n<=Nt1) TCI States in a Single Slot
   Each transmission time (occasion) of a TB has time granularity of a mini-slot and has one TCI and one RV.
   A common MCS is used with a single or multiple DMRS port(s) at every transmission time (occasion) in a slot.
   A RV/TCI may be the same or different at a different transmission time (occasion).
4) Method 4 (TDM): n (n<=Nt2) TCI States in K (n<=K) Different Slots
   Each transmission time (occasion) of a TB has one TCI and one RV.
   Every transmission time (occasion) across K slots uses a common MCS with a single or multiple DMRS port(s).
   A RV/TCI may be the same or different at a different transmission time (occasion).
   Hereinafter, MTRP URLLC is described.
   In the present disclosure, DL MTRP URLLC means that multiple TRPs transmit the same data (e.g., the same TB)/DCI by using a different layer/time/frequency resource. For example, TRP 1 transmits the same data/DCI in resource 1 and TRP 2 transmits the same data/DCI in resource 2. UE configured with a DL MTRP-URLLC transmission method receives the same data/DCI by using a different layer/time/frequency resource. Here, UE is configured from a base station for which QCL RS/type (i.e., a DL TCI state) should be used in a layer/time/frequency resource receiving the same data/DCI. For example, when the same data/DCI is received in resource 1 and resource 2, a DL TCI state used in resource 1 and a DL TCI state used in resource 2 may be configured. UE may achieve high reliability because it receives the same data/DCI through resource 1 and resource 2. Such DL MTRP URLLC may be applied to a PDSCH/a PDCCH.
   And, in the present disclosure, UL MTRP-URLLC means that multiple TRPs receive the same data/UCI (uplink control information) from any UE by using a different layer/time/frequency resource. For example, TRP 1 receives the same data/DCI from UE in resource 1 and TRP 2 receives the same data/DCI from UE in resource 2 to share received data/DCI through a backhaul link connected between TRPs. UE configured with a UL MTRP-URLLC transmission method transmits the same data/UCI by using a different layer/time/frequency resource. In this case, UE is configured from a base station for which Tx beam and which Tx power (i.e., a UL TCI state) should be used in a layer/time/frequency resource transmitting the same data/DCI. For example, when the same data/UCI is transmitted in resource 1 and resource 2, a UL TCI state used in resource 1 and a UL TCI state used in resource 2 may be configured. Such UL MTRP URLLC may be applied to a PUSCH/a PUCCH.
   In addition, in the present disclosure, when a specific TCI state (or TCI) is used (or mapped) in receiving data/DCI/UCI for any frequency/time/space resource (layer), it means as follows. For a DL, it may mean that a channel is estimated from a DMRS by using a QCL type and a QCL RS indicated by a corresponding TCI state in that frequency/time/space resource (layer) and data/DCI is received/demodulated based on an estimated channel. In addition, for a UL, it may mean that a DMRS and data/UCI are transmitted/modulated by using a Tx beam and power indicated by a corresponding TCI state in that frequency/time/space resource.
   Here, an UL TCI state has Tx beam and/or Tx power information of UE and may configure spatial relation information, etc. to UE through other parameter, instead of a TCI state. An UL TCI state may be directly indicated by UL grant DCI or may mean spatial relation information of a SRS resource indicated by a SRI (sounding resource indicator) field of UL grant DCI. Alternatively, it may mean an open loop (OL) Tx power control parameter connected to a value indicated by a SRI field of UL grant DCI (e.g., j: an index for open loop parameter Po and alpha (up to 32 parameter value sets per cell), q_d: an index of a DL RS resource for PL (pathloss) measurement (up to 4 measurements per cell), l: a closed loop power control process index (up to 2 processes per cell)).
   Hereinafter, MTRP eMBB is described.
   In the present disclosure, MTRP-eMBB means that multiple TRPs transmit different data (e.g., a different TB) by using a different layer/time/frequency. UE configured with a MTRP-eMBB transmission method receives an indication on multiple TCI states through DCI and assumes that data received by using a QCL RS of each TCI state is different data.
   On the other hand, UE may figure out whether of MTRP URLLC transmission/reception or MTRP eMBB transmission/reception by separately dividing a RNTI for MTRP-URLLC and a RNTI for MTRP-eMBB and using them. In other words, when CRC masking of DCI is performed by using a RNTI for URLLC, UE considers it as URLLC transmission and when CRC masking of DCI is performed by using a RNTI for eMBB, UE considers it as eMBB transmission. Alternatively, a base station may configure MTRP URLLC transmission/reception or TRP eMBB transmission/reception to UE through other new signaling.
   In a description of the present disclosure, it is described by assuming cooperative transmission/reception between 2 TRPs for convenience of a description, but a method proposed in the present disclosure may be also extended and applied in 3 or more multiple TRP environments and in addition, it may be also extended and applied in multiple panel environments (i.e., by matching a TRP to a panel). In addition, a different TRP may be recognized as a different TCI state to UE. Accordingly, when UE receives/transmits data/DCI/UCI by using TCI state 1, it means that data/DCI/UCI is received/transmitted from/to a TRP 1.
   Hereinafter, methods proposed in the present disclosure may be utilized in a situation that MTRPs cooperatively transmit a PDCCH (repetitively transmit or partitively transmit the same PDCCH). In addition, methods proposed in the present disclosure may be also utilized in a situation that MTRPs cooperatively transmit a PDSCH or cooperatively receive a PUSCH/a PUCCH.
   In addition, in the present disclosure, when a plurality of base stations (i.e., MTRPs) repetitively transmit the same PDCCH, it may mean the same DCI is transmitted through multiple PDCCH candidates and it may also mean that a plurality of base stations repetitively transmit the same DCI. Here, the same DCI may mean two DCI with the same DCI format/size/payload. Alternatively, although two DCI has a different payload, it may be considered the same DCI when a scheduling result is the same. For example, a time domain resource assignment (TDRA) field of DCI relatively determines a slot/symbol position of data and a slot/symbol position of A/N (ACK/NACK) based on a reception occasion of DCI, so if DCI received at n occasions and DCI received at n+1 occasions inform UE of the same scheduling result, a TDRA field of two DCI is different and consequentially, a DCI payload is different. R, the number of repetitions, may be directly indicated or mutually promised by a base station to UE. Alternatively, although a payload of two DCI is different and a scheduling result is not the same, it may be considered the same DCI when a scheduling result of one DCI is a subset of a scheduling result of the other DCI. For example, when the same data is repetitively transmitted N times through TDM, DCI 1 received before first data indicates N data repetitions and DCI 2 received after first data and before second data indicates N−1 data repetitions. Scheduling data of DCI 2 becomes a subset of scheduling data of DCI 1 and two DCI is scheduling for the same data, so in this case, it may be considered the same DCI.

In addition, in the present disclosure, when a plurality of base stations (i.e., MTRPs) partitively transmit the same PDCCH, it means that one DCI is transmitted through one PDCCH candidate, but TRP 1 transmits some resources that such a PDCCH candidate is defined and TRP 2 transmits the remaining resources. One PDCCH candidate partitively transmitted by a plurality of base stations (i.e., MTRPs) may be indicated to a terminal (UE) through a configuration described below or may be recognized or determined by a terminal.

In addition, in the present disclosure, when UE repetitively transmits the same PUSCH so that a plurality of base stations (i.e., MTRPs) can receive it, it may mean that UE transmitted the same data through multiple PUSCHs. In this case, each PUSCH may be optimized and transmitted to an UL channel of a different TRP. For example, when UE repetitively transmits the same data through PUSCH 1 and 2, PUSCH 1 is transmitted by using UL TCI state 1 for TRP 1 and in this case, link adaptation such as a precoder/MCS, etc. may be also scheduled/applied to a value optimized for a channel of TRP 1. PUSCH 2 is transmitted by using UL TCI state 2 for TRP 2 and link adaptation such as a precoder/MCS, etc. may be also scheduled/applied to a value optimized for a channel of TRP 2. In this case, PUSCH 1 and 2 which are repetitively transmitted may be transmitted at a different time to be TDM, FDM or SDM.

In addition, in the present disclosure, when UE partitively transmits the same PUSCH so that a plurality of base stations (i.e., MTRPs) can receive it, it may mean that UE transmits one data through one PUSCH, but it divides resources allocated to that PUSCH, optimizes them for an UL channel of a different TRP and transmits them. For example, when UE transmits the same data through 10 symbol PUSCHs, data is transmitted by using UL TCI state 1 for TRP 1 in 5 previous symbols and in this case, link adaptation such as a precoder/MCS, etc. may be also scheduled/applied to a value optimized for a channel of TRP 1. The remaining data is transmitted by using UL TCI state 2 for TRP 2 in the remaining 5 symbols and in this case, link adaptation such as a precoder/MCS, etc. may be also scheduled/applied to a value optimized for a channel of TRP 2. In the example, transmission for TRP 1 and transmission for TRP 2 are TDM-ed by dividing one PUSCH into time resources, but it may be transmitted by a FDM/SDM method.

In addition, similarly to the above-described PUSCH transmission, also for a PUCCH, UE may repetitively transmit the same PUCCH or may partitively transmit the same PUCCH so that a plurality of base stations (i.e., MTRPs) receive it.

Hereinafter, a proposal of the present disclosure may be extended and applied to a variety of channels such as a PUSCH/a PUCCH/a PDSCH/a PDCCH, etc.

MTRP (Multi-TRP)-URLLC is a method that multiple TRP (MTRP: Multiple TRP) transmit the same data by using a different layer/time/frequency resource. Here, data transmitted from each TRP is transmitted by using a different TCI state per each TRP.

If it is extended into a method that MTRPs transmit the same DCI by using a different PDCCH candidate, a PDCCH candidate that the same DCI is transmitted from each TRP may be transmitted by using a different TCI state. Here, in this case, a specific definition on a CORESET on each PDCCH candidate, a search space (SS) set configuration method, etc. is needed.

Embodiment 1

Embodiment 1 describes a method that a plurality of base stations (i.e., MTRPs) repetitively transmit a PDCCH.

Embodiment 1 describes a method that a plurality of base stations (i.e., MTRPs) repetitively transmit a PDCCH.

When a plurality of base stations (i.e., MTRPs) repetitively transmit a PDCCH, R, the number of repeat transmission, may be directly indicated by a base station to UE or may be mutually promised. Here, R, the number of repeat transmission, is mutually promised, R, the number of repeat transmission, may be determined based on the number of TCI (Transmission Configuration Indication) states configured to repetitively transmit the same PDCCH. For example, if a base station configures r TCI states to repetitively transmit the same PDCCH to UE, R=r may be promised. Here, for example, R=M*r may be configured and a base station may indicate M to UE.

When a plurality of base stations (i.e., MTRPs) repetitively transmit the same PDCCH, TRP 1 may transmit DCI through PDCCH candidate 1 and TRP 2 may transmit DCI through PDCCH candidate 2. The mapping order of a TRP and a PDCCH candidate is just for convenience of a description and does not limit a technical scope of the present disclosure. Each PDCCH candidate is transmitted by a different TRP, so each PDCCH candidate is received by using a different TCI state. Here, for PDCCH candidates transmitting the same DCI, part or all of a scrambling/aggregation level, a CORESET, a search space (SS) set of a PDCCH may be different.

2 (or 2 or more) PDCCH candidates repetitively transmitted by a plurality of base stations (i.e., MTRPs) may be recognized/indicated to UE through the following configuration.

Hereinafter, for convenience of a description, when the same DCI is transmitted/received through two PDCCH candidates, it is described as an example, but a proposal of the present disclosure may be extended and applied even when the same DCI is transmitted/received through 3 or more PDCCH candidates. In this case, reliability may be improved. For example, TRP 1 may transmit the same DCI through PDCCH candidate 1 and 2 and TRP 2 may transmit the same DCI through PDCCH candidate 3 and 4.

In addition, for SS set(s) that a plurality of base stations (i.e., MTRPs) repetitively transmit the same PDCCH, the same PDCCH may be repetitively transmitted only for some DCI formats/SSs/RNTI types defined in a SS set and may not be repetitively transmitted for the rest, which may be indicated by a base station to UE. For example, a base station may indicate to UE that repeat transmission is performed only for format 1-0 (or 1-1) for a SS set that both DCI format 1-0 and 1-1 are defined. Alternatively, a base station may indicate to UE that repeat transmission is performed only for a common SS (or an UE specific SS) among an UE specific SS and a common SS. Alternatively, a base station may indicate to UE that the same PDCCH is repetitively transmitted only for DCI CRC masked with a specific RNTI (e.g., RNTIs, MCS-C-RNTIs, CS-RNTIs excluding C-RNTIs).

Figure 8:
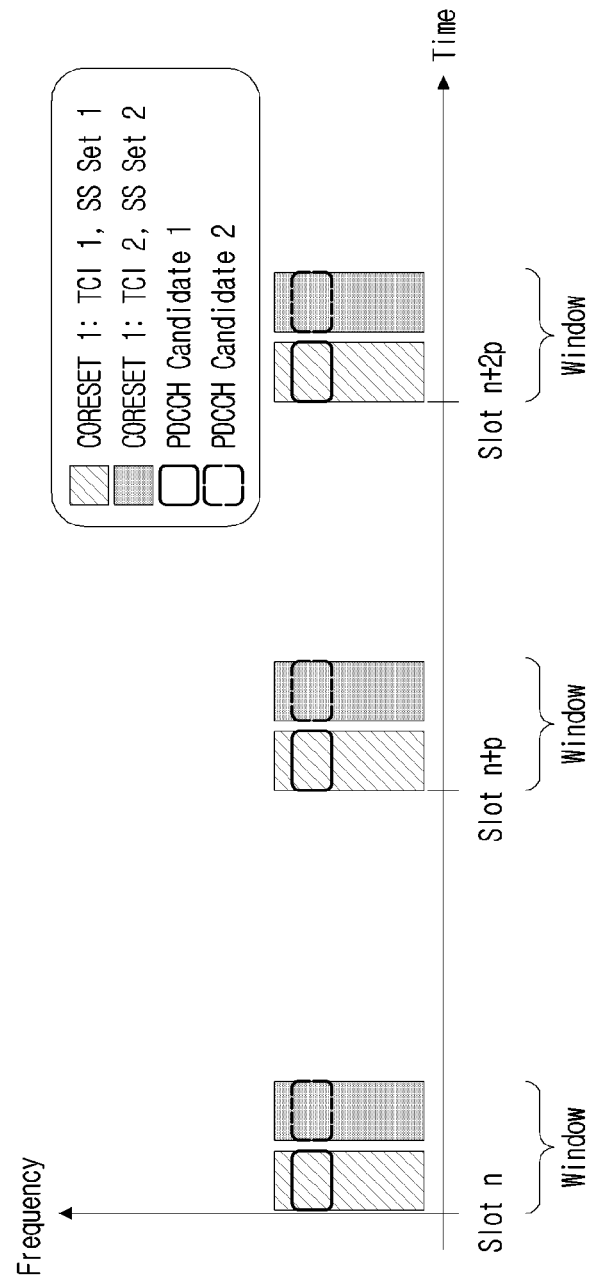
FIG. 8 is a diagram which illustrates a method of transmitting and receiving downlink control information according to an embodiment of the present disclosure.

Embodiment 1-1) Two PDCCH Candidates Transmitting the Same DCI Share One (the Same) CORESET, but May be Defined/Configured in a Different SS Set FIG. 8 is a diagram which illustrates a method of transmitting and receiving downlink control information according to an embodiment of the present disclosure.

In reference to FIG. 8, PDCCH candidate 1 may be transmitted by using TCI state 1 and PDCCH candidate 2 may be transmitted by using TCI state 2. In addition, the same DCI may be transmitted through PDCCH candidate 1 and PDCCH candidate 2, respectively. In addition, both PDCCH candidate 1 and PDCCH candidate 2 may be (repetitively) transmitted at a specific period interval in a time domain.

Each PDCCH candidate shares the same CORESET, but may be defined/configured in a different SS set. And, TCI state 1 of two TCI states configured for the same CORESET may be used in SS Set 1 that PDCCH candidate 1 exists and TCI state 2 may be used in SS Set 2 that PDCCH candidate 2 exists.

In a current standard, a CORESET ID is configured in a SS set and a corresponding SS set and a CORESET are connected. According to an embodiment of the present disclosure, one CORESET may be connected (mapped) to a plurality of TCI states (e.g., two TCI states). In this case, information on whether which TCI of two TCIs of a corresponding CORESET should be used to decode a PDCCH may be defined/configured together as well as a CORESET ID in a configuration for a SS set.

In addition, a base station may inform UE of at which occasion (TO: Transmission occasion) a PDCCH candidate of SS set 1 corresponding to the same DCI and a PDCCH candidate of SS set 2 are transmitted/received. It may be defined/referred to as a window that the same DCI is transmitted. For example, it may be indicated by a base station to UE that SS set 1 and SS set 2 defined in one slot identical to UE (i.e., window=1 slot) are a SS set that the same DCI is transmitted or may be mutually promised between a base station and UE.

More generally, a window that the same DCI is transmitted (e.g., 1 slot) may be indicated by a base station to UE or may be mutually promised between a base station and UE.

For example, such a window (e.g., n time) may be mutually promised between a base station and UE or may be configured by a base station to UE to start at every TO (occasion when a PDCCH candidate is transmitted) of a standard set (e.g., a lowest ID (Identifier) SS set) among SS sets defined to transmit the same DCI. Here, when a TO of a lowest ID SS set appears several times in one window, windows may be overlapped, so in order to prevent it, the following (n+1) window may be defined/configured based on a TO of a lowest ID SS set not included in a specific (n) window. In addition, desirably, N windows may be defined per period of a standard set (e.g., a lowest ID SS set). Here, N may be indicated by a base station to UE. For example, when a period is 10 slots, a SS set is defined in a first, second and third slot of 10 slots, a window is 1 slot and N is 2, each window may be defined in a first and second slot during a period of every lowest ID SS set.

Hereinafter, a PDCCH TO and TCI mapping method in one window is described.

Figure 9:
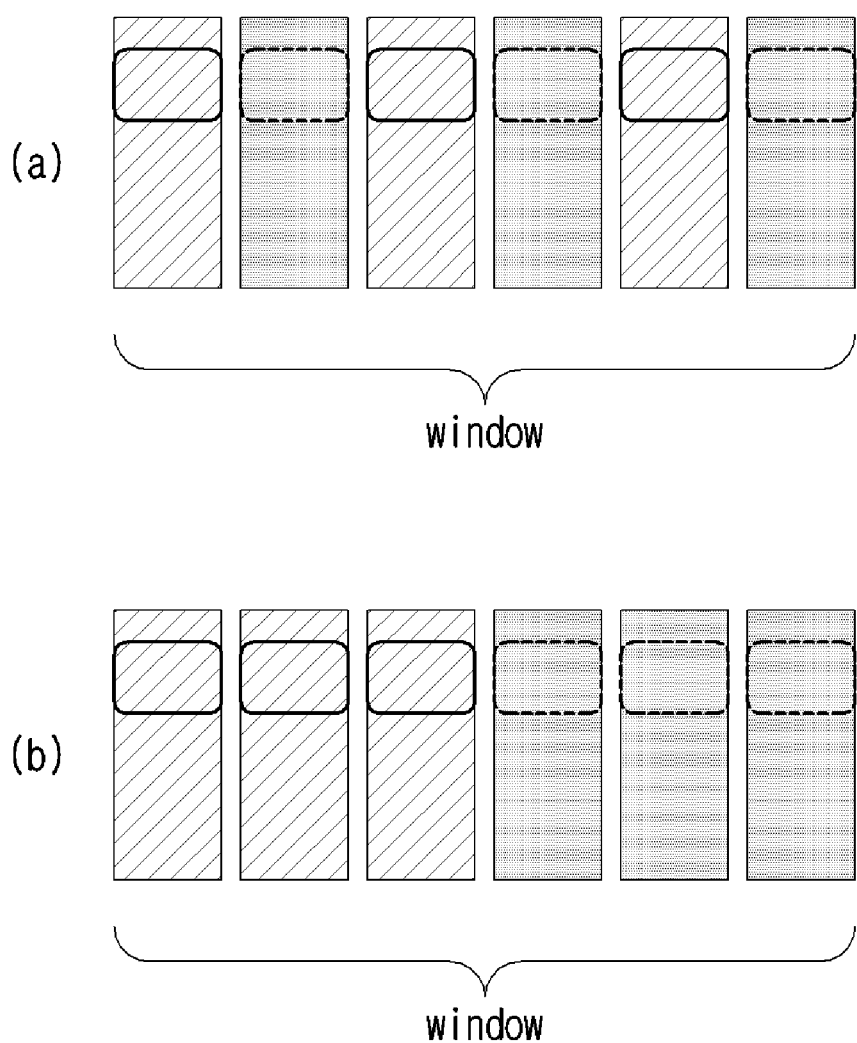
FIG. 9 is a diagram which illustrates a mapping method between a PDCCH transmission occasion and a TCI state according to an embodiment of the present disclosure.

FIG. 9 is a diagram which illustrates a mapping method between a PDCCH transmission occasion and a TCI state according to an embodiment of the present disclosure.

There are multiple PDCCH TOs in one window and a different TCI state may be mapped per each TO. Here, the following two methods may be considered by a mapping method of a TO and a TCI.

First, as a TO increases in a window (in ascending order), a TCI state may be sequentially mapped in a circular way. For example, when N TOs and M TCI states are indicated in a window, a i-th TO may be mapped to a i-th TCI and for N>M, a first TCI and a second TCI may be sequentially mapped to a M+1-th TO and a M+2-th TO, respectively. For example, as in FIG. 9(*a*), a case is assumed in which 6 PDCCH TOs are configured and 2 TCI states are configured in one window. In this case, in one window, a first PDCCH TO may be mapped to a first TCI state, a second PDCCH TO may be mapped to a second TCI state, a third PDCCH TO may be mapped to a first TCI state, a fourth PDCCH TO may be mapped to a second TCI state, a fifth PDCCH TO may be mapped to a first TCI state and a sixth PDCCH TO may be mapped to a second TCI state.

Alternatively, second, a group and a TCI state may be sequentially mapped in a circular way by grouping floor(N/M) (floor(x) is the largest integer not larger than x) or ceil(N/M) (ceil(x) is the smallest integer not smaller than x) TOs adjacent in a window. In other words, group i may be mapped to CORESET i. As a result, adjacent TOs included in the same group may be mapped to the same TCI. For example, as in FIG. 9(*b*), a case is assumed in which 6 PDCCH TOs are configured and 2 TCI states are configured in one window. And, it is assumed that a first to third PDCCH TO are grouped into a first group and a fourth to sixth PDCCH TO are grouped into a second group. In this case, in one window, a first TCI state may be mapped to a first PDCCH TO to a third PDCCH TO (i.e., a first group) and a second TCI state may be mapped to a fourth PDCCH TO to a sixth PDCCH TO (i.e., a second group).

Such a mapping method between a TO and a TCI may be applied to mapping between a TO and a TCI in the same window for a general case in which a PDCCH is repetitively transmitted at a different time (e.g., embodiment 1-3) or is partitively transmitted at a different time as well as for a case in the above-described embodiment 1-1. In other words, the above-described same mapping method between a TO and a TCI may be applied to all cases in which a different PDCCH candidate (to which a different TCI state is applied) is transmitted at a different TO in the same window.

The above-described embodiment 1-1 may be configured as a special case in embodiment 1-3 described later. In other words, for a method of configuring CORESET 1 and 2 and SS set 1 and 2 as in embodiment 1-3, a case in which CORESET 1 and 2 are configured to be the same (but, a CORESET ID and a TCI state defined in a CORESET are different) is not different from embodiment 1-1 that 1 CORESET, 2 SS sets and 2 TCIs are configured. Accordingly, as such, when CORESET 1 and 2 are configured to be the same in embodiment 1-3, the same PDCCH may be repetitively transmitted by the same method as a method of embodiment 1-1.

Figure 10:
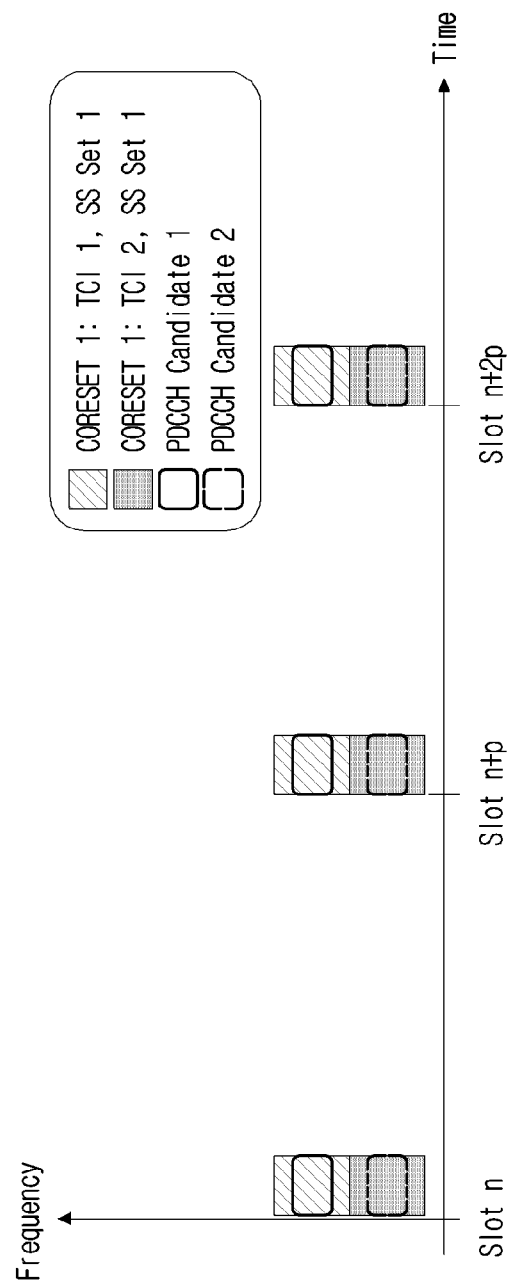
FIG. 10 is a diagram which illustrates a method of transmitting and receiving downlink control information according to an embodiment of the present disclosure.

Embodiment 1-2) Two PDCCH Candidates Transmitting the Same DCI May be Defined/Configured in One (the Same) CORESET and One (the Same) SS Set FIG. 10 is a diagram which illustrates a method of transmitting and receiving downlink control information according to an embodiment of the present disclosure.

In reference to FIG. 10, PDCCH candidate 1 may be transmitted by using TCI state 1 and PDCCH candidate 2 may be transmitted by using TCI state 2. In addition, the same DCI may be transmitted through PDCCH candidate 1 and PDCCH candidate 2, respectively. In addition, both PDCCH candidate 1 and PDCCH candidate 2 may be (repetitively) transmitted at a specific period interval in a time domain.

In reference to FIG. 10, each PDCCH candidate may share the same CORESET and the same SS set and PDCCH candidate 1 and 2 may be FDM-ed. Both PDCCH candidate 1 and 2 may be defined/configured in one SS set and one CORESET mapped to that SS set. In this case, one of two TCI states defined/configured in a CORESET may be used in some PDCCH candidates and the remaining TCI states may be used in the remaining PDCCH candidates. For it, the PDCCH candidate to TCI mapping method may be referred to.

For example, when there are 4 PDCCH candidates of aggregation level=4, a first and third candidate are mapped to TCI state 1 and a second and fourth candidate are mapped to TCI state 2, so TCI states may be alternately mapped. Here, PDCCH candidate 1 may exist among a first and third candidate and PDCCH candidate 2 may exist among a second and fourth candidate. Alternatively, a first and second candidate are mapped to TCI state 1 and a third and fourth candidate are mapped to TCI state 2, so a front half candidate and a back half candidate may be mapped to a different TCI state. Here, PDCCH candidate 1 may exist among a first and second candidate and PDCCH candidate 2 may exist among a third and fourth candidate.

By expanding the above example, also similarly for N TCI states, N TCI states may be circularly mapped one by one as a candidate index increases. Alternatively, all candidates may be grouped by being divided into N adjacent candidates (adjacent candidate indexes) and N candidate groups and N TCI states may be mapped one-to-one.

In addition, in this method, a window that the same PDCCH is repetitively transmitted may be determined as every TO (transmission occasion) that a PDCCH is transmitted/received. In other words, PDCCH candidate 1 and 2 may be FDM-ed and repetitively transmitted at every PDCCH TO represented in slot n, n+P, n+2P, etc. FIG. 10 illustrates a case in which a SS set period is configured as P slot and one SS set is configured during one SS set period. In addition, a SS set may be configured in (contiguous) multiple slots within one SS set period or multiple SS sets may be also configured in one slot.

For example, a SS set may be configured in N (contiguous) slots during every period through a duration field (=N) defined in a SS set. A base station and UE may promise N slots configured in this way as one window. In this case, a TCI state may be mapped to each PDCCH TO through the above-described 'PDCCH TO and TCI mapping method in a window'. For example, for N=2, a SS set may be configured in the same form as in FIG. 9.

In another example, multiple SS sets may be configured in one slot through a higher layer field defined in a SS set configuration (e.g., a monitoringSymbolsWithinSlot field). For example, a SS set may be defined/configured per P slot and L SS sets may exist at a different time in a slot that a SS set is configured. In this case, a base station and UE may promise a window as 1 slot and a TCI state may be mapped to each PDCCH TO through the above-described 'PDCCH TO and TCI mapping method in a window'.

In addition, the above-described embodiment 1-2 may be configured as a special case in embodiment 1-3 described later. In other words, for a method of configuring CORESET 1 and 2 and SS set 1 and 2 as in embodiment 1-3, a case in which CORESET 1 and 2 are configured to be the same (but, a TCI state defined in a CORESET is different) and SS set 1 and 2 may be configured to be the same is not different from embodiment 1-2 that 1 CORESET, 1 SS set and 2 TCI states are configured. Accordingly, in this case, the same PDCCH may be repetitively transmitted by the same method as a method of embodiment 1-2.

In addition, similarly, embodiment 1-2 may be configured as a special case in embodiment 1-4. In other words, for a method of configuring CORESET 1 and 2 and SS set 1 as in embodiment 1-4, a case in which CORESET 1 and 2 are configured to be the same (but, a TCI state defined in a CORESET is different) is not different from embodiment 1-2.

In addition, embodiment 1-2 may be configured as a special case in embodiment 1-1. In other words, for a method of configuring CORESET 1 and SS set 1 and 2 as in embodiment 1-1, a case in which SS set 1 and 2 are configured to be the same (but, a CORESET ID and a TCI state of a CORESET used in each SS are different) is not different from embodiment 1-2 that 1 CORESET, 1 SS set and 2 TCIs are configured. Accordingly, in this case, the same PDCCH may be repetitively transmitted by the same method as a method of embodiment 1-2.

Figure 11:
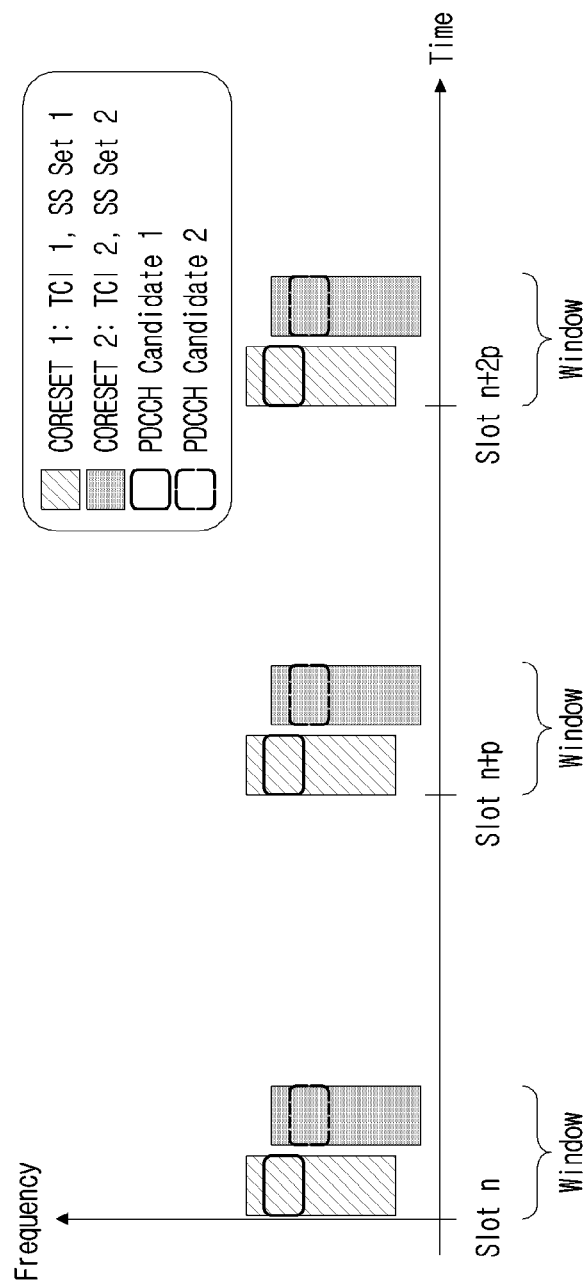
FIG. 11 is a diagram which illustrates a method of transmitting and receiving downlink control information according to an embodiment of the present disclosure.

Embodiment 1-3) Two PDCCH Candidates Transmitting the Same DCI May be Defined/Configured in a Different CORESET and May be Defined/Configured in a Different SS Set FIG. 11 is a diagram which illustrates a method of transmitting and receiving downlink control information according to an embodiment of the present disclosure.

In reference to FIG. 11, PDCCH candidate 1 may be transmitted by using TCI state 1 and PDCCH candidate 2 may be transmitted by using TCI state 2. In addition, the same DCI may be transmitted through PDCCH candidate 1 and PDCCH candidate 2, respectively. In addition, both PDCCH candidate 1 and PDCCH candidate 2 may be (repetitively) transmitted at a specific period (p) interval in a time domain.

In reference to FIG. 11, CORESET 1 is mapped to SS set 1, CORESET 2 is mapped to SS set 2, PDCCH candidate 1 is transmitted through CORESET 1 and SS set 1 and PDCCH candidate 2 is transmitted through CORESET 2 and SS set 2. For such a configuration, a base station should inform UE that a corresponding CORESET group or SS set group was configured to transmit the same DCI. For example, an ID of SS set 2 (and/or 1) used to transmit the same DCI may be additionally configured in SS set 1 (and/or 2). Alternatively, a base station may indicate to UE that multiple SS sets are the same group and UE may recognize/ assume that SS sets belonging to the same group were configured to transmit the same DCI.

As a window configuration method that the same DCI is transmitted is the same as a configuration method in the above-described embodiment 1-1, a configuration method in embodiment 1-1 may be used as it is.

Figure 12:
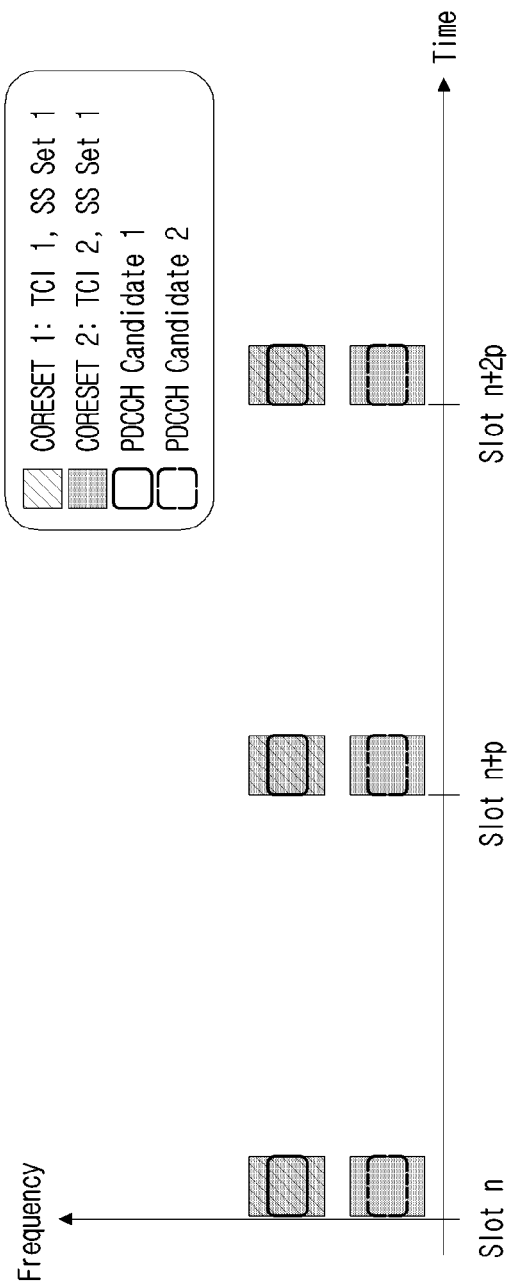
FIG. 12 is a diagram which illustrates a method of transmitting and receiving downlink control information according to an embodiment of the present disclosure.

Embodiment 1-4) Two PDCCH Candidates Transmitting the Same DCI are Defined/Configured in a Different CORESET, but May be Defined/Configured in One (the Same) SS Set FIG. 12 is a diagram which illustrates a method of transmitting and receiving downlink control information according to an embodiment of the present disclosure.

In reference to FIG. 12, PDCCH candidate 1 may be transmitted by using TCI state 1 and PDCCH candidate 2 may be transmitted by using TCI state 2. In addition, the same DCI may be transmitted through PDCCH candidate 1 and PDCCH candidate 2, respectively. In addition, both PDCCH candidate 1 and PDCCH candidate 2 may be (repetitively) transmitted at a specific period (p) interval in a time domain.

In reference to FIG. 12, two CORESETs having a different resource block (RB) may be mapped to one SS set and candidate 1 and 2 may be defined in CORESET 1 and CORESET 2, respectively.

In addition, in this method, a window that the same PDCCH is repetitively transmitted is determined as every TO (transmission occasion) that a PDCCH is transmitted/received. In other words, PDCCH candidate 1 and 2 may be FDM-ed and repetitively transmitted at every PDCCH TO shown in slot n, n+P, n+2P, etc.

FIG. 12 illustrates a case in which a SS set period is configured as P slot and one SS set is configured during one period. In addition, a SS set may be configured in (contiguous) multiple slots within one SS set period or multiple SS sets may be also configured in one slot.

For example, a SS set may be configured in N (contiguous) slots during every period through a duration field (=N) defined in a SS set. A base station and UE may promise N slots configured in this way as one window.

Hereinafter, a PDCCH TO and CORESET mapping method in a window is described.

There may be multiple PDCCH TOs in one window and a different CORESET may be mapped per each PDCCH TO. The following two methods may be considered by mapping of a PDCCH TO and a CORESET.

First, as a TO increases in a window, a CORESET may be sequentially mapped in a circular way. For example, when N TOs and M CORESETs defined in that SS set are indicated in a window, a i-th TO may be mapped to a i-th CORESET and for N>M, a first CORESET and a second CORESET may be sequentially mapped to a M+1-th TO and a M+2-th TO in a circular way. For example, as in FIG. 9(a), a case is assumed in which 6 PDCCH TOs are configured and 2 CORESETs are configured in one window. In this case, in one window, a first PDCCH TO may be mapped to a first CORESET, a second PDCCH TO may be mapped to a second CORESET, a third PDCCH TO may be mapped to a first CORESET, a fourth PDCCH TO may be mapped to a second CORESET, a fifth PDCCH TO may be mapped to a first CORESET and a sixth PDCCH TO may be mapped to a second CORESET.

Alternatively, second, a group and a CORESET may be sequentially mapped circularly by grouping adjacent floor (N/M) or ceil (N/M) TOs in a window. In other words, group i may be mapped to CORESET i. As a result, adjacent TOs included in the same group may be mapped to the same CORESET. For example, as in FIG. 9(b), a case is assumed in which 6 PDCCH TOs are configured and 2 CORESETs are configured in one window. And, it is assumed that a first to third PDCCH TO are grouped into a first group and a fourth to sixth PDCCH TO are grouped into a second group. In this case, in one window, a first PDCCH TO to a third PDCCH TO (i.e., a first group) may be mapped to a first CORESET and a fourth PDCCH TO to a sixth PDCCH TO (i.e., a second group) may be mapped to a second CORESET.

Such a mapping method between a TO and a CORESET may be applied to mapping between a TO and a CORESET in the same window for a general case in which a PDCCH is repetitively transmitted at a different time or is partitively transmitted at a different time as well as for a case in the above-described embodiment 1-4.

In another example, multiple SS sets may be configured in one slot through a higher layer field defined in a SS set (e.g., a monitoringSymbolsWithinSlot field). For example, a SS set may be defined in a period of P slots and L SS sets may exist at a different time in a slot that a SS set is configured. In this case, a base station and UE may promise a window as 1 slot. And, a CORESET may be mapped through the above-described 'PDCCH TO and CORESET mapping method in a window'.

In addition, embodiment 1-4 may be configured as a special case of embodiment 1-3. In other words, for a method of configuring CORESET 1 and 2 and SS set 1 and 2 as in embodiment 1-3, a case in which SS set 1 and 2 are configured to be the same is not different from proposal 1-4 that 2 CORESETs, 1 SS set and 2 TCIs are configured. Accordingly, in this case, the same PDCCH may be repetitively transmitted by the same method as a method of proposal 1-4.

Embodiment 2

Embodiment 2 describes a method that a plurality of base stations (i.e., MTRPs) partitively transmit the same PDCCH.

In addition, in the present disclosure, when a plurality of base stations (i.e., MTRPs) partitively transmit the same PDCCH, it means that one DCI is transmitted through one PDCCH candidate, but TRP 1 performs transmission in some resources that such a PDCCH candidate is defined and TRP 2 performs transmission in remaining resources. In this case, it may be also interpreted that a plurality of base stations transmit the same DCI. One PDCCH candidate partitively transmitted by a plurality of base stations (i.e., MTRPs) may be recognized/indicated to UE through the following configuration.

Hereinafter, for convenience of a description, it is assumed that two TRPs operate, but such an assumption does not limit a technical scope of the present disclosure.

Figure 13:
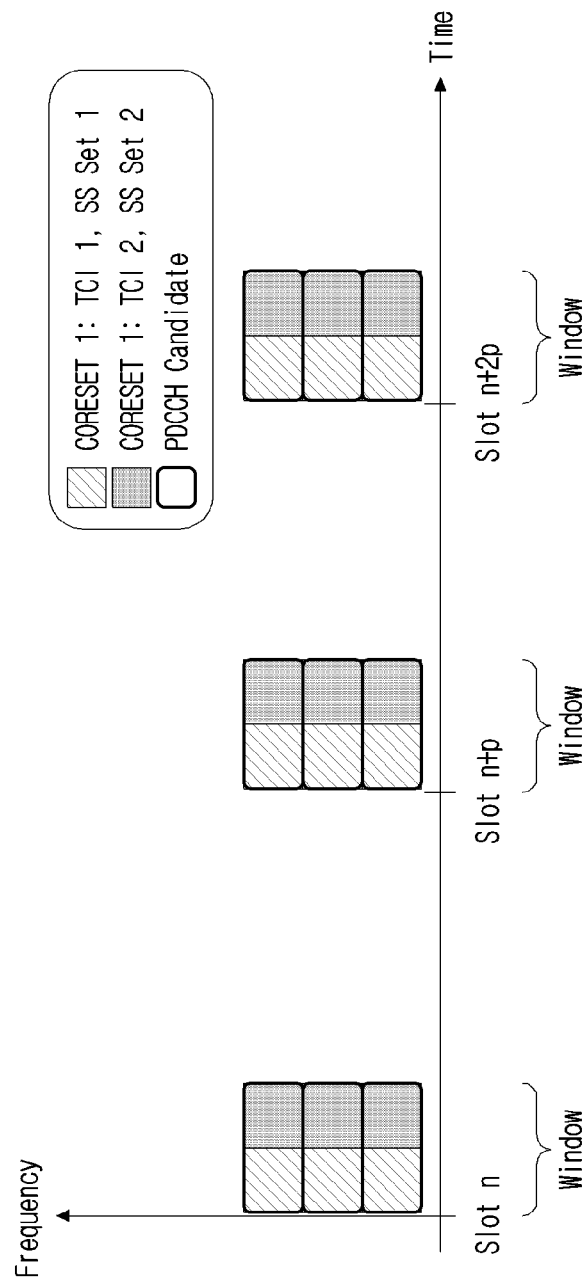
FIG. 13 is a diagram which illustrates a method of transmitting and receiving downlink control information according to an embodiment of the present disclosure.

Embodiment 2-1) One/the Same PDCCH Candidate Partitively Transmitted by a Plurality of Base Stations (i.e., MTRPs) are Defined/Configured in One (the Same) CORESET, but May be Defined/Configured in a Different SS Set FIG. 13 is a diagram which illustrates a method of transmitting and receiving downlink control information according to an embodiment of the present disclosure.

In reference to FIG. 13, PDCCH candidate 1 may be transmitted by using TCI state 1 and PDCCH candidate 2 may be transmitted by using TCI state 2. And, PDCCH candidate 1 and PDCCH candidate 2 may be combined to configure a single PDCCH candidate that one DCI is transmitted. In addition, all PDCCH candidates generated in this way may be (repetitively) transmitted at a specific period (p) interval in a time domain.

This method may be configured by a method similar to the above-described embodiment 1-1 and one PDCCH candidate may be transmitted/received through a different SS set existing in the same window. For example, UE may try decoding by assuming a PDCCH candidate of aggregation level=A1 of SS set 1 and a PDCCH candidate of aggregation level=A2 of SS set 2 in the same window as one PDCCH candidate of aggregation level=A1+A2 without treating them as a different PDCCH candidate. Through such a method, a variety of aggregation levels other than the existing aggregation level may be supported.

But, because there are various aggregation levels or PDCCH candidates in each SS set, a method of generating one candidate with a candidate of two SS sets without any constraints may increase terminal implementation complexity. To solve it, a candidate combination of two SS sets generating one PDCCH candidate may be limited. For example, a candidate of two SS sets generating one PDCCH candidate may be limited to the same aggregation level and/or may be limited to the same PDCCH candidate number (or index). Alternatively, for example, a standard set (e.g., set 1) of two SS sets may be configured and one PDCCH candidate may be generated by combining a PDCCH candidate of set 1 and a set 2 PDCCH candidate configured as an aggregation level or less of that PDCCH candidate.

Embodiment 2-1 may be configured as a special case of embodiment 2-3. In other words, for a method of configuring CORESET 1 and 2 and SS set 1 and 2 as in embodiment 2-3, a case in which CORESET 1 and 2 are configured to be the same (but, a CORESET ID and a TCI state defined in a CORESET are different) is not different from embodiment 2-1 that 1 CORESET, 2 SS sets and 2 TCIs are configured. Accordingly, in this case, the same PDCCH may be repetitively transmitted by the same method as a method of embodiment 2-1.

Embodiment 2-2) One PDCCH Candidate Partitively Transmitted by a Plurality of Base Stations (i.e., MTRPs) May be Defined/Configured in One (the Same) CORESET and One (the Same) SS Set A PDCCH candidate defined in one CORESET and one SS set may be partitively transmitted by a plurality of base stations. Here, some resources of frequency/time resources configuring one PDCCH candidate may be transmitted/received by using one of two TCI states configured in a CORESET and the remaining resources may be transmitted/received by using the other TCI state.

Figure 14:
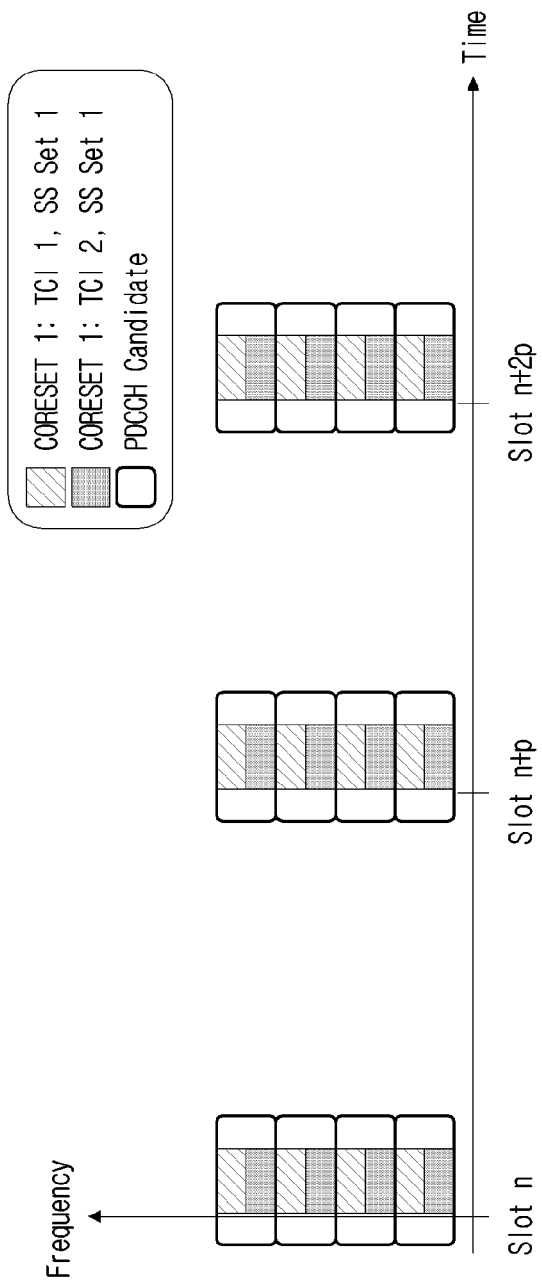
FIG. 14 is a diagram which illustrates a method of transmitting and receiving downlink control information according to an embodiment of the present disclosure.

FIG. 14 is a diagram which illustrates a method of transmitting and receiving downlink control information according to an embodiment of the present disclosure.

FIG. 14 shows an example that a frequency resource configuring one PDCCH candidate is divided and a different TCI state is mapped. All PDCCH candidates may be (repetitively) transmitted at a specific period (P) interval in a time domain.

For example, a frequency resource configuring a PDCCH candidate of aggregation level=4 may be divided in a unit of a control channel element (CCE). And, a first and third CCE are mapped to TCI state 1 and a second and fourth CCE are mapped to TCI state 2, so TCI states may be mapped alternately. Alternatively, a first and second CCE are mapped to TCI state 1 and a third and fourth CCE are mapped to TCI state 2, so a front half CCE and a back half CCE may be mapped to a different TCI state. By generalizing it, similarly for N TCI states, as a CCE index increases, N TCIs may be circularly mapped one by one. Alternatively, all CCEs may be divided and grouped into N adjacent CCEs (adjacent CCE indexes) and N CCE groups and N TCI states may be mapped one-to-one.

Because a PDCCH candidate of aggregation level=1 may not be divided in a unit of a CCE, a resource element group (REG) bundle size may be configured as less than 6 REGs and may be divided in a unit of a REG bundle. In addition, regardless of an aggregation level, a TCI state may be mapped by dividing a resource in a unit of a REG bundle. In this case, the TCI state and CCE mapping method may be equally applied to mapping between a TCI state and a REG bundle. For example, when a PDCCH candidate of aggregation level=1 is configured with 3 REG bundles (with bundle size=2), a first and third REG bundle are mapped to TCI state 1 and a second REG bundle is mapped to TCI state 2, so TCI states may be alternately mapped. Alternatively, a first and second REG bundle are mapped to TCI state 1 and a third REG bundle is mapped to TCI state 2, so a front half REG bundle and a back half REG bundle may be mapped to a different TCI state.

Alternatively, for a PDCCH candidate of Aggregation level=1, as one TRP transmits one PDCCH candidate, but a different TRP transmits different PDCCH candidates (of Aggregation level=1), diversity gain may be increased. For example, when there are 4 PDCCH candidates of Aggregation level=1, an even/odd candidate may be mapped to TCI state 1 as TRP 1 transmits an even/odd candidate and an odd/even candidate may be mapped to TCI state 2 as TRP 2 transmits an odd/even candidate conversely.

According to a current standard, when precoder granularity configured in a CORESET is configured by contiguous RBs (i.e., allContiguousRBs) and a wideband DMRS is configured, UE figures out a REG bundle configuring that PDCCH candidate when estimating a channel for one PDCCH candidate. And, UE assumes that a DMRS to which the same precoder is applied is transmitted to contiguous frequency resources including that REG bundle in that CORESET. As such, channel estimation accuracy is improved by using a REG bundle configuring a PDCCH candidate together with a DMRS of contiguous different REGs for that REG bundle.

But, if a frequency resource configuring one CORESET is mapped to a different TCI state as in the present embodiment, an wideband DMRS operation method is no longer valid. This is because some resources of contiguous frequency resources including a REG bundle are mapped to TCI state 1 and the remaining are mapped to TCI state 2, so a channel that a DMRS is transmitted is different.

Accordingly, in this case, when an wideband DMRS is configured, an operation of UE should be modified as follows. When estimating a channel for one PDCCH candidate, UE figures out a REG bundle configuring that PDCCH candidate. And, UE may assume that a DMRS to which the same precoder is applied is transmitted to contiguous frequency resources including that REG bundle "among frequency resources mapped to the same TCI state and that REG bundle" in that CORESET. Even when a plurality of TRPs partitively transmit a time resource configuring one PDCCH candidate as in FIG. 15 described later, the above-proposed UE operation may be applied in configuring an wideband DMRS. In addition, such a method may be also extended and applied to a case of the above-described embodiment 1-2. For a case of embodiment 2-4 described later, one PDCCH candidate is transmitted through two CORESETs, so UE may figure out a REG bundle configuring that PDCCH candidate and assume that a DMRS to which the same precoder is applied is transmitted to contiguous frequency resources including that REG bundle in a CORESET to which that REG bundle belongs. For example, if a PDCCH candidate is configured with 3 REG bundles, UE may assume that a DMRS to which the same precoder is applied is transmitted to contiguous frequency resources including that bundle in a CORESET to which bundle i belongs when estimating a channel of bundle i (i=1,2,3).

Figure 15:
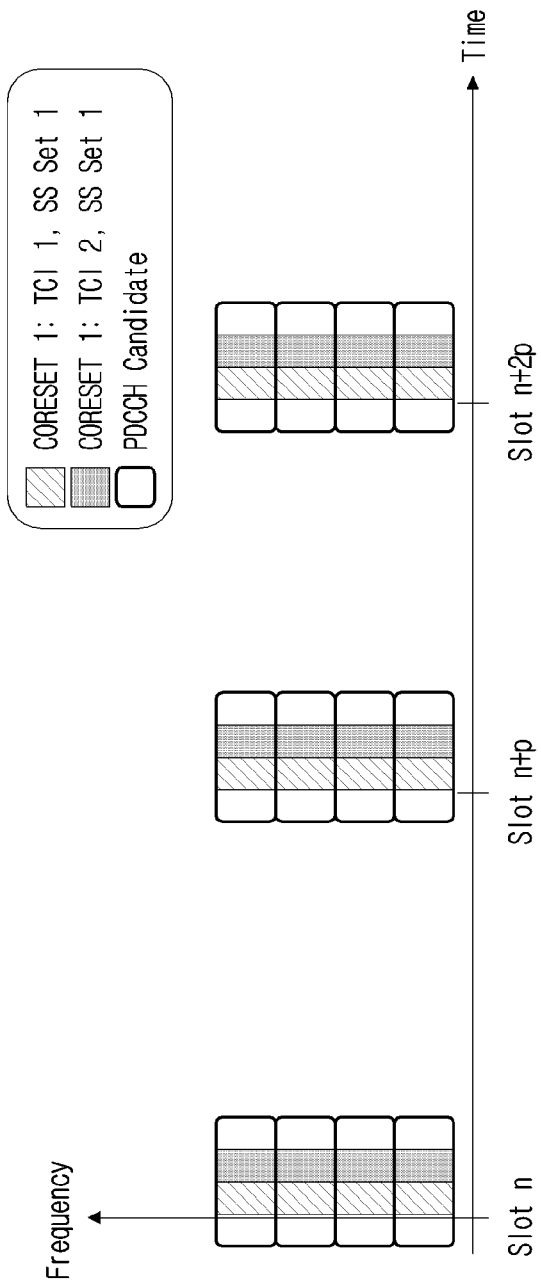
FIG. 15 is a diagram which illustrates a method of transmitting and receiving downlink control information according to an embodiment of the present disclosure.

FIG. 15 is a diagram which illustrates a method of transmitting and receiving downlink control information according to an embodiment of the present disclosure.

FIG. 15 shows a case in which a different TCI state is mapped by dividing a time resource configuring one PDCCH candidate. All PDCCH candidates may be (repetitively) transmitted at a specific period (P) interval in a time domain.

FIG. 15 is an example that one CORESET is defined as a CORESET duration of two symbols. And, two symbols configuring one PDCCH candidate may be mapped to a different TCI state. In this case, mapping between a TCI and a symbol may be defined/configured similarly to the above-described TCI and CCE mapping method.

For mapping between a REG and a REG bundle and between a REG bundle and a CCE, a resource of a PDCCH candidate may be configured by applying the existing method as it is. However, when estimating a channel through an actual DMRS, the existing REG bundle may not be used as it is. It is because a symbol configuring a REG bundle is mapped to a different TCI. Accordingly, when estimating a channel through an actual DMRS, UE may reconfigure a REG bundle only with a symbol mapped to the same TCI state among symbols configuring the existing REG bundle and perform channel estimation in a unit of a reconfigured REG bundle.

In addition, in this method, a window that the same PDCCH is partitively transmitted is determined as every TO (transmission occasion) that a PDCCH is transmitted/received. In other words, some resources of resources configuring one PDCCH candidate are transmitted/received by using TCI state 1 per PDCCH TO shown in slot n, n+P, n+2P and the remaining resources are transmitted/received by using TCI state 2. In other words, two TRPs are partitively transmitted.

In addition, embodiment 2-2 may be configured as a special case of embodiment 2-3. In other words, for a method of configuring CORESET 1 and 2 and SS set 1 and 2 as in embodiment 2-3, a case in which CORESET 1 and 2 are configured to be the same (but, a TCI state defined in a CORESET is different) and SS set 1 and 2 may be configured to be the same is not different from embodiment 2-2 that 1 CORESET, 1 SS set and 2 TCI states are configured. Accordingly, in this case, the same PDCCH may be partitively transmitted by the same method as a method of embodiment 2-2. Similarly, embodiment 2-2 may be configured as a special case of embodiment 2-4. For a method of configuring CORESET 1 and 2 and SS set 1 as in proposal 2-4, a case in which CORESET 1 and 2 are configured to be the same (but, a TCI state defined in a CORESET is different) is not different from embodiment 2-2. In addition, embodiment 2-2 may be configured as a special case of embodiment 2-1. In other words, for a method of configuring CORESET 1 and SS set 1 and 2 as in embodiment 2-1, a case in which SS set 1 and 2 are configured to be the same (but, a CORESET ID and a TCI state of a CORESET used in each SS are different) is not different from embodiment 2-2 that 1 CORESET, 1 SS set and 2 TCIs are configured. Accordingly, in this case, the same PDCCH may be repetitively transmitted by the same method as a method of embodiment 2-2.

Figure 16:
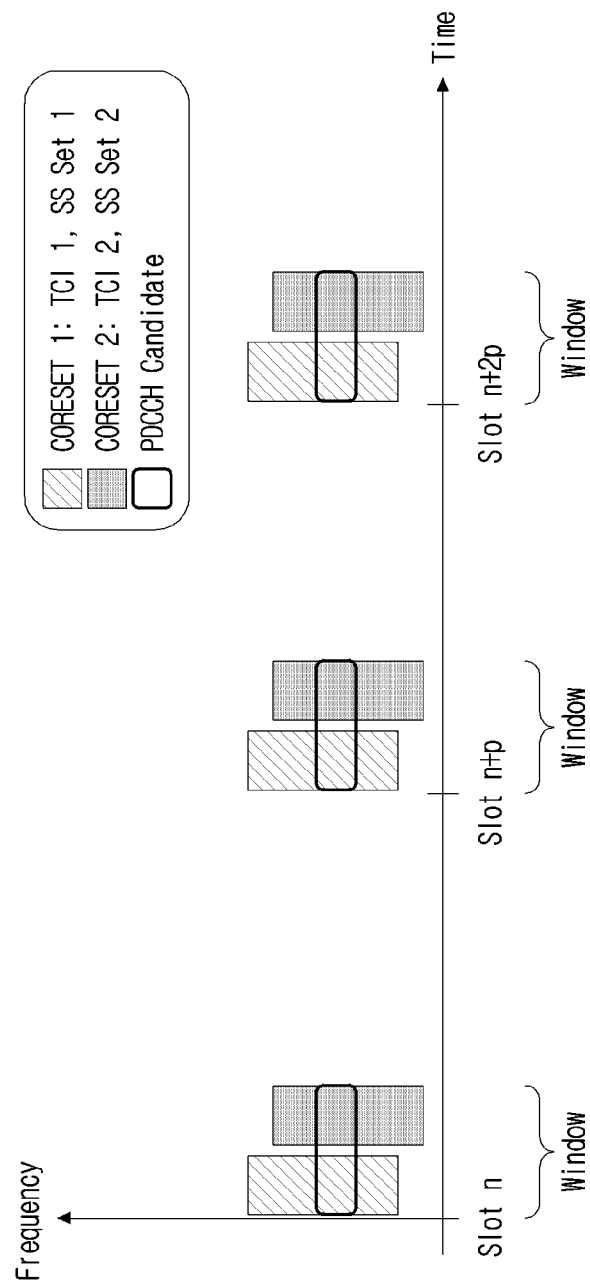
FIG. 16 is a diagram which illustrates a method of transmitting and receiving downlink control information according to an embodiment of the present disclosure.

Embodiment 2-3) One PDCCH Candidate Partitively Transmitted by a Plurality of Base Stations (i.e., MTRPs) May be Defined/Configured in a Plurality of CORESETs and May be Defined/Configured in a Plurality of SS Sets FIG. 16 is a diagram which illustrates a method of transmitting and receiving downlink control information according to an embodiment of the present disclosure.

In reference to FIG. 16, CORESET 1 may be mapped to SS set 1 and CORESET 2 may be mapped to SS set 2. And, one PDCCH candidate may be transmitted/received through a different SS set existing in the same window.

For example, UE may try decoding by assuming a PDCCH candidate of aggregation level=A1 of SS set 1 and a PDCCH candidate of aggregation level=A2 of SS set 2 in the same window as one PDCCH candidate of aggregation level=A1+A2 without treating them as a different PDCCH candidate. As embodiment 2-3 differs only in mapping between a CORESET and a SS set in comparison with the above-described embodiment 2-1, a detailed proposal of proposal 2-1 may be applied as it is.

Here, a base station may indicate to UE that multiple SS sets (e.g., SS set 1 and 2) are the same group and UE may recognize/assume that SS sets belonging to the same group are configured to partitively transmit the same DCI (and/or the same PDCCH candidate).

Figure 17:
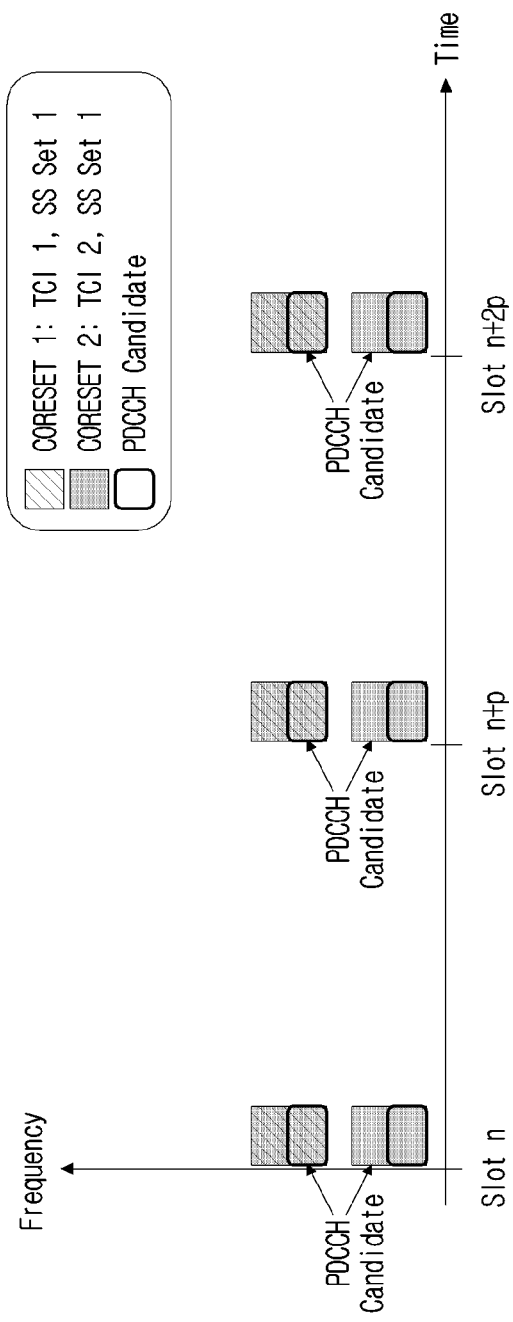
FIG. 17 is a diagram which illustrates a method of transmitting and receiving downlink control information according to an embodiment of the present disclosure.

Embodiment 2-4) One PDCCH Candidate Partitively Transmitted by a Plurality of Base Stations (i.e., MTRPs) is Defined/Configured in a Plurality of CORESETs, but May be Defined/Configured in One SS Sets FIG. 17 is a diagram which illustrates a method of transmitting and receiving downlink control information according to an embodiment of the present disclosure.

In reference to FIG. 17, two CORESETS having a different RB resource may be mapped to one SS set. And, one PDCCH candidate may be generated by combining a PDCCH candidate of CORESET 1 and a PDCCH candidate of CORESET 2. For example, TRP 1 and 2 may transmit a PDCCH through CORESET 1 and 2 respectively and UE may combine a PDCCH candidate of Aggregation level=A1 in CORESET 1 and a PDCCH candidate of Aggregation level=A2 in CORESET 2 to assume it as one PDCCH candidate of aggregation level=A1+A2 and try decoding.

But, because there are various aggregation levels or PDCCH candidates in each CORESET, a method of generating one candidate with a candidate of two CORESETs without any constraints increases terminal implementation complexity. To solve it, a PDCCH candidate combination of two CORESETs generating one PDCCH candidate may be limited. Such a limit may be applied similarly to a method of limiting a PDCCH candidate combination of two SS sets in the above-described embodiment 2-1 method. In other words, embodiment 2-4 is similar to the embodiment 2-1, so detailed proposals of embodiment 2-1 may be applied. But, embodiment 2-4 generates one PDCCH candidate by aggregating a plurality of multiplexed PDCCH candidates to a frequency resource instead of a time resource, so it may be modified and applied accordingly.

In addition, in this method, a window that the same PDCCH is partitively transmitted is determined as every TO (transmission occasion) that a PDCCH is transmitted/received. In other words, PDCCH candidate 1 may be transmitted/received by using TCI state 1 (through CORESET 1) in some resources of resources configuring one PDCCH candidate per PDCCH TO shown in slot n, n+P, n+2P and PDCCH candidate 2 may be transmitted/received by using TCI state 2 (through CORESET 2) in the remaining resources. In other words, two TRPs divide a PDCCH candidate into PDCCH candidate 1 and PDCCH candidate 2 and transmit it.

In addition, embodiment 2-4 may be configured as a special case of embodiment 2-3. In other words, for a method of configuring CORESET 1 and 2 and SS set 1 and 2 as in embodiment 2-3, a case in which SS set 1 and 2 are configured to be the same is not different from embodiment 2-4 that 2 CORESETs, 1 SS set and 2 TCIs are configured. Accordingly, in this case, a PDCCH may be partitively transmitted by the same method as a method of embodiment 2-4.

In addition, for SS set(s) that a plurality of base stations (i.e., MTRPs) partitively transmit the same PDCCH (i.e., for the above-described embodiment 2-1 to 2-4), it may be indicated to UE that the same PDCCH is partitively transmitted only for some DCI formats/SS types/RNTIs defined in a SS set and it is transmitted for the remaining from one TRP as in the existing method. For example, partitive transmission may be indicated only for format 1-0 (or 1-1) for a SS set that both DCI format 1-0 and 1-1 are defined. Alternatively, partitive transmission may be indicated only for a common SS (or an UE specific SS) among an UE specific SS and a common SS. Alternatively, the same PDCCH may be partitively transmitted only for DCI CRC masked with a specific RNTI (e.g., RNTIs excluding a C-RNTI, a MCS-C-RNTI, a CS-RNTI).

A base station may inform UE of whether a plurality of base stations will partitively transmit the same PDCCH (a case for the above-described embodiment 2) or repetitively transmit the same PDCCH (a case for the above-described embodiment 1) through higher layer signaling.

Hereinafter, a method proposed in the present disclosure may be applied to both a case in which a plurality of base stations (i.e., MTRPs) repetitively transmit the same PDCCH (a case for the above-described embodiment 1) and a case in which a plurality of base stations (i.e., MTRPs) partitively transmit the same PDCCH (a case for the above-described embodiment 2).

In the present disclosure, a TO (or a PDCCH TO) may mean each channel transmitted at a different time when multiple channels (i.e., i) for repeat transmission, multiple PDCCH candidates, ii) for partitive transmission, multiple combined PDCCH candidates or multiple PDCCH candidates before combination) are TDM-ed, may mean each channel transmitted to a different frequency/RB when multiple channels are FDM-ed or may mean each channel transmitted to a different layer/beam/DMRS port when multiple channels are SDM-ed. One TCI state may be mapped to each TO.

When the same channel is repetitively transmitted (e.g., a case of embodiment 1), complete DCI/data/uplink control information (UCI) may be transmitted to one TO and a receiving end may increase a reception success rate by receiving multiple TOs. When one channel is partitively transmitted to multiple TOs (e.g., a case of embodiment 2), part of DCI/data/UCI is transmitted to one TO and only when a reception end should receive all multiple TOs, it may receive complete DCI/data/UCI by collecting partitioned DCI/data/UCI.

Embodiment 3

This embodiment is about a case in which one same DCI is repetitively transmitted through a downlink control channel (e.g., a PDCCH) from multiple TRPs (MTRPs) and TCI information is not included in the one same DCI.

When a TCI field is not included in one DCI transmitted from a single TRP (STRP) not by repeat transmission of same DCI/PDCCH from MTRPs, a TCI state of a PDSCH scheduled by the DCI may follow a TCI state associated with a CORESET that the DCI is received.

When TCI information is included in DCI repetitively transmitted from MTRPs, a TCI state associated with a downlink data channel (e.g., a PDSCH) scheduled by the DCI may be clearly determined based on TCI information included in the DCI.

Meanwhile, when TCI information is not included in DCI repetitively transmitted from MTRPs, a method of determining a TCI state associated with a downlink data channel scheduled by the DCI is not clearly defined.

Hereinafter, various examples for solving a problem of the ambiguity are described. In particular, when a TCI is not included in DCI repetitively transmitted from MTRPs, a method of determining TCI information which will be applied to a downlink data channel (e.g., a PDSCH) transmitted from multiple TRPs (MTRP) or a single TRP (STRP) is described.

The following examples assume a case in which there are a plurality of CORESETs associated with one same DCI (or downlink control channel) transmitted from MTRPs and each TCI information is associated with each CORESET, or a case in which there is 1 CORESET associated with the one same DCI (or downlink control channel) and a plurality of TCI information is associated with 1 CORESET. In other words, they assume a case in which when one same DCI is transmitted through a downlink control channel from MTRPs, a plurality of TCI information is preconfigured or predefined based on a CORESET associated with the downlink control channel transmission.

For example, a higher layer parameter ControlResourceSet IE (information element) may be used to configure a time/frequency control resource set (CORESET). For example, the control resource set (CORESET) may be related to detection and reception of downlink control information. The ControlResourceSet IE may include one or more of a CORESET-related ID (e.g., controlResourceSetID), an index of a CORESET pool for a CORESET (e.g., CORESETPoolIndex), a time/frequency resource configuration of a CORESET, or CORESET-related TCI information, etc. For example, an index of a CORESET pool (e.g., CORESETPoolIndex) may be configured as 0 or 1. In the above-described examples of the present disclosure, a CORESET group may correspond to a CORESET pool and a CORESET group ID may correspond to a CORESET pool index (e.g., CORESETPoolIndex). ControlResourceSet (i.e., CORESET) may be configured through higher layer signaling (e.g., RRC signaling).

In addition, in the following examples, a CORESET identifier or a CORESET ID may include a search space set (SS set) identifier or a SS set ID. In other words, one CORESET may include one or more SSs and may define one or more SSs as a SS set.

In addition, in the following examples, when one same DCI (or downlink control channel (e.g., PDCCH)) is transmitted from MTRPs, a SFN (single frequency network) method includes an operation that MTRPs transmit the same DCI (or PDCCH) at the same time and a non-SFN method includes an operation that MTRPs repetitively transmit the same DCI (or PDCCH) (in predetermined order) in a different time resource. For example, in a SFN method, a plurality of TCI information may be associated with 1 CORESET and in a non-SFN method, each TCI information may be associated with each of a plurality of CORESETs. It is assumed that the following examples may be applied to both a SFN method and a non-SFN method and a terminal may obtain a plurality of TCI information associated with CORESET(s) associated with one DCI (or PDCCH) transmitted from MTRPs.

In the following description, a term of repeat transmission of one same DCI (or PDCCH) from MTRPs is mainly used for clarity and repeat transmission of the same DCI/PDCCH from MTRPs may include both a SFN method and a non-SFN method. Furthermore, it should be understood that repeat transmission of the same DCI/PDCCH from MTRPs also includes a method that MTRPs transmit the same DCI/PDCCH respectively or partitively transmit one DCI/PDCCH.

In addition, repeat transmission of the same DCI/PDCCH, unless specifically limited, may include repeat transmission from MTRPs and repeat transmission from a single TRP (STRP).

In addition, when the same DCI/PDCCH is repetitively transmitted, a terminal may increase a DCI/PDCCH reception/decoding success rate through two methods (e.g., a soft combining method, and a multi-change method).

First, in a soft combining method, UE may increase a decoding success rate through soft combining for a plurality of the same PDCCHs received (i.e., stored in a memory/a buffer). It is a method similar to that of increasing a decoding success rate by performing soft combining for a retransmitted PDSCH and an initial PDSCH received by UE when retransmitting a PDSCH. For such UE, a base station may inform UE of a PDCCH TO (or a window) that the same PDCCH is repetitively transmitted and UE may perform soft combining for an indicated PDCCH TO.

Second, in a multi-chance method, UE may independently decode each of multiple PDCCHs without performing soft combining. In this case, it may not obtain benefits by soft combining, but UE implementation is simplified and only success in decoding at least one PDCCH of multiple received PDCCHs is needed, so a reception success rate may be increased. A base station does not need to inform UE of a repetitive PDCCH TO (or window) that the same PDCCH is transmitted and UE may independently decode each PDCCH TO. For example, a base station transmits the same PDCCH to PDCCH TO 1 and TO 2, but UE may individually decode TO 1 and TO 2 without knowing that the same PDCCH is transmitted to TO 1 and TO 2. If UE succeeds in PDCCH decoding both at TO 1 and TO 2, UE may know that scheduling information included in DCI of TO 1 overlaps with scheduling information included in DCI of TO 2. In this case, UE may know that the same DCI is repetitively transmitted at TO 1 and TO 2 after DCI decoding success. UE may ignore or discard remaining DCI excluding one DCI. If UE succeeds in DCI decoding only at TO 1, it may not know that DCI is transmitted at TO 2 and conversely, if UE succeeds in DCI decoding only at TO 2, it may not know that DCI is transmitted at TO 1.

In other words, in the following examples, a method in which the same DCI/PDCCH is repetitively transmitted from MTRPs is not limited to a SFN method or a non-SFN method and a method in which reception/decoding for one or more DCI/PDCCHs is performed in a terminal is not limited to a soft combining method or a multi-chance method.

Embodiment 3-1

The same PDSCH may be repetitively transmitted in a different time resource (i.e., by a TDM method) from MTRPs. Here, a TCI state applied to each PDSCH TO may be indicated through a TCI field of DCI and two TCI states (e.g., TCI state #1 and #2) may be simultaneously indicated to a TCI field.

As such, mapping between a PDSCH TO and two TCI states indicated/configured through DCI may be configured by one of cyclical mapping or sequential mapping.

For example, for cyclical mapping, when 2 TCI states (e.g., TCI state #1 and #2) are indicated, TCI state #1, #2, #1, #2 may be mapped to 4 PDSCH TOs.

For example, for sequential mapping, when 2 TCI states (e.g., TCI state #1 and #2) are indicated, TCI state #1, #1, #2, #2 may be mapped to 4 PDSCH TOs.

Figure 18:
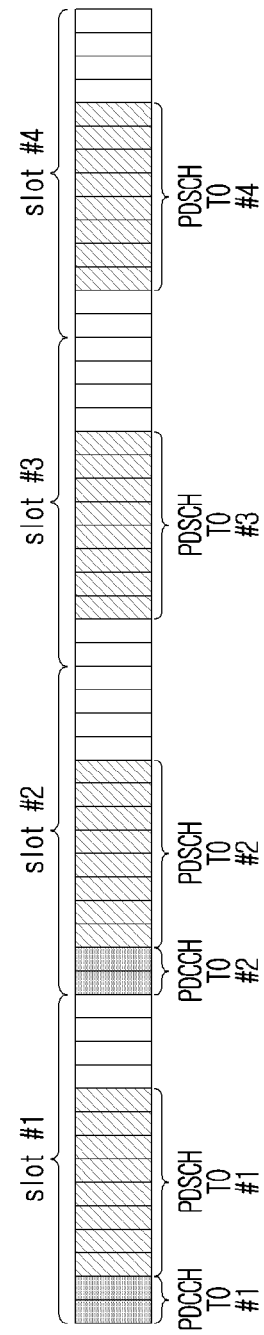
FIG. 18 is a diagram which represents an example of downlink channel transmission to which the present disclosure may be applied.

FIG. 18 is a diagram which represents an example of downlink channel transmission to which the present disclosure may be applied.

DCI scheduling MTRP PDSCH repeat transmission may be repetitively transmitted by MTRPs. In this case, a PDCCH TO which repetitively transmits the same DCI may be TDM-ed. Here, some of PDCCH TOs may be received before a first PDSCH TO, but the others may be received after a first PDSCH TO.

For example, PDSCH TO #1, #2, #3, and #4 may be transmitted in slot #1, #2, #3, and #4 respectively and in each slot, a PDSCH TO may be transmitted in OFDM symbol #3 to #10 (i.e., for a 8 symbol duration). PDCCH TO #1 and #2 may be transmitted in slot #1 and #2, respectively and in each slot, a PDCCH TO may be transmitted in OFDM symbol #1 and #2 (i.e., for a 2 symbol duration). In this case, PDCCH TO #2 is transmitted after PDSCH TO #1 and before PDSCH TO #2.

According to the existing DCI format, a TDRA (time domain resource assignment) field of DCI may indicate the number of slots (e.g., a DCI to PDSCH offset) before a PDSCH is received based on a DCI reception occasion, a symbol position of a PDSCH in a corresponding slot (e.g., a start symbol (s) and a symbol length (L)) and the number of consecutive slots (e.g., RepNum) that the same PDSCH is repetitively transmitted.

As a DCI reception occasion is slot #1 in PDCCH TO #1, a DCI to PDSCH offset value is 0 and RepNum is 4. As a DCI reception occasion is slot #2 in PDCCH TO #2, a DCI to PDSCH offset value should be −1, but a scope of a DCI to PDSCH offset value indicated in the existing TDRA field may not include a negative value (or may have only a value equal to or greater than 0). Accordingly, a DCI to PDSCH offset is configured as 0 and RepNum is configured as 3 in PDCCH TO #2.

Here, when UE fails in receiving DCI of PDCCH TO #1 and succeeds in receiving DCI of PDCCH TO #2, there is a problem that the total number of repetitions (i.e., total RepNum) may not be known. In other words, the number of repeat transmission of a PDSCH which is actually transmitted by a base station is 4, but a value of RepNum is configured as 3 in a TDRA field of DCI of PDCCH TO #2, so UE recognizes that there are 3 repeat transmission of PDCCH TO #2, #3, #4. Accordingly, a base station and UE apply mapping between a different PDSCH and a TCI.

For example, for a cyclical mapping method, a base station applies TCI state #1, #2, #1, and #2 to PDSCH TO #1, #2, #3, and #4, respectively by assuming that UE successfully receives PDCCH TO #1. But, when UE fails in receiving DCI of PDCCH TO #1 and succeeds in receiving DCI in PDCCH TO #2, UE may not know existence of PDCCH TO #1 and applies TCI state #1, #2, #1 to PDSCH TO #2, #3, and #4, respectively. As a result, UE may fail in PDSCH decoding.

Accordingly, when the same DCI/PDCCH is repetitively transmitted, according to whether UE succeeds or fails in DCI decoding, there is ambiguity that a TCI state applied to a repetitively transmitted PDSCH is determined differently. To solve this ambiguity, a base station and a terminal may clearly configure/define a relationship between a TCI state associated with a PDCCH/DCI and a TCI state applied to a PDSCH according to a predefined rule or by signaling predetermined information in advance.

Embodiment 3-1-1

According to this embodiment, a DCI to PDSCH offset value indicated by TDRA included in DCI may be configured to have a negative value. Accordingly, a base station may indicate to UE a DCI to PDSCH offset having a predetermined value within a scope of a negative number, 0 and a positive number through DCI.

For example, a TDRA field included in DCI may indicate one combination (or row) of a plurality of combinations (or rows) configured with one or more elements of a PDSCH mapping type, a DCI to PDSCH offset (slot offset $K_0$), a start symbol position (S) and a symbol length (or the number of symbols) (L), or the number or repetitions (RepNum). Such combination(s) may be preconfigured for a terminal by higher layer signaling. One or more combinations of a plurality of combinations may include a negative DCI to PDSCH offset value. Accordingly, at least a TDRA field may indicate a DCI to PDSCH offset having a predetermined value within a scope of a negative number, 0 and a positive number.

For example, in an example of FIG. 18, a value of a DCI to PDSCH offset may be configured as −1 and RepNum may be configured as 4 (i.e., a DCI to PDSCH offset and RepNum for PDSCH TO #1) through a TDRA field in DCI transmitted in PDCCH TO #2. Although UE fails in decoding PDCCH TO #1, the same scheduling information as PDCCH TO #1 (i.e., DCI) may be obtained by succeeding in decoding PDCCH TO #2.

In this case, if UE was storing/buffering a signal received in PDSCH TO #1 in a memory, data may be received by applying TCI state #1, #2, #1, and #2 to PDSCH TO #1, #2, #3, and #4. If UE did not store/buffer a signal received in PDSCH TO #1, PDSCH TO #1 is not decoded (i.e., is missed), but data may be received by applying TCI state #2, #1, and #2 to PDSCH TO #2, #3, and #4.

In the above-described examples, it was described by using a cyclical mapping method between a PDSCH TO and a TCI state as an example, but the same principle may be also applied to other mapping method (e.g., a sequential mapping method). For example, although a base station performs transmission by applying TCI state #1, #1, #2, and #2 to PDSCH TO #1, #2, #3, and #4 and UE does not succeed in decoding DCI in PDCCH TO #1, UE may receive a PDSCH on the assumption that TCI state #1, #1, #2, and #2 are applied to PDSCH TO #1, #2, #3, and #4 by indicating that a DCI to PDSCH offset value is −1 and a value of RepNum is 4 by a TDRA field of DCI transmitted in PDCCH TO #2.

In addition, in the above-described examples, it was described based on an example that a PDSCH is repeated at a slot level, but the same principle may be also applied to a case in which a PDSCH is repeated at a symbol level.

For example, a case is assumed in which each of PDCCH TO #1 and #2 are transmitted in OFDM symbol (#1,#2) and (#5,#6) within one slot and each of PDSCH TO #1, #2, #3 and #4 are transmitted in OFDM symbol (#3,#4), (#7,#8), (#9,#10) and (#11,#12) within a corresponding slot. In other words, a symbol duration of each of a PDCCH TO and a PDSCH TO is 2 and may be transmitted in one slot (e.g., slot 1). Here, through a TDRA field of DCI of PDCCH TO #2 transmitted in OFDM symbol #5 and #6, a PDSCH TO may start at OFDM symbol #3, a duration may be indicated as 2 and the number of repetitions may be indicated as 4. In other words, a starting symbol of a PDSCH TO may be indicated through a DCI TDRA field also for a PDSCH scheduled at an occasion before DCI reception.

Similarly for PDSCH transmission with 1 PDSCH TO (i.e., repetition-free transmission), if PDCCH TO #1 is transmitted before a PDSCH TO and PDCCH TO #2 is transmitted after a PDSCH TO, it may be indicated that a PDSCH TO starts before a DCI reception occasion through a TDRA field of DCI in PDCCH TO #2.

Embodiment 3-1-2

According to this embodiment, a base station may indicate a value of total RepNum to UE in addition to RepNum. For example, total RepNum related information may be configured/indicated to UE through higher layer (e.g., RRC and/or a MAC-CE) signaling and/or DCI, etc.

As described above, RepNum is defined as a value indicating the number of PDSCHs which are repetitively transmitted after a DCI reception occasion based on DCI transmitting RepNum. Contrary to it, total RepNum may mean the largest value among RepNum of DCI which is repetitively transmitted. For example, in an example of FIG. 18, a value of total RepNum is 4.

Accordingly, although UE fails in DCI reception in PDCCH TO #1, UE which received DCI in PDCCH TO #2 may know that one of a total of 4 PDSCH repetitions was transmitted before DCI reception and the remaining 3 PDSCHs are transmitted after DCI reception.

In this case, if UE was storing/buffering a signal received in PDSCH TO #1 in a memory, data may be received by applying TCI state #1, #2, #1, and #2 to PDSCH TO #1, #2, #3, and #4. If UE did not store/buffer a signal received in PDSCH TO #1, PDSCH TO #1 is not decoded (i.e., is missed), but data may be received by applying TCI state #2, #1, and #2 to PDSCH TO #2, #3, and #4.

In the above-described examples, it was described by using a cyclical mapping method between a PDSCH TO and a TCI state as an example, but the same principle may be also applied to other mapping method (e.g., a sequential mapping method). For example, although a base station performs transmission by applying TCI state #1, #1, #2, and #2 to PDSCH TO #1, #2, #3, and #4 and UE does not succeed in decoding DCI in PDCCH TO #1, UE may know that DCI which succeeded in decoding was transmitted in PDCCH TO #2 by indicating that a value of total RepNum is 4 and a value of RepNum is 3 by a TDRA field of DCI transmitted in PDCCH TO #2. Accordingly, UE may receive a PDSCH by assuming that TCI state #1, #1, #2, and #2 are applied to PDSCH TO #1, #2, #3, and #4.

In addition, an example that a base station indicates total RepNum information to UE may be also applied to symbol level PDSCH repeat transmission as well as slot level PDSCH repeat transmission.

Embodiment 3-1-3

According to this embodiment, a base station may indicate a TCI mapping offset to UE. A TCI mapping offset may be a value indicating order of a TCI state which is applied (or order of a TCI state which starts) in order of TCI states mapped to all repetitively transmitted PDSCH TOs. In other words, a TCI mapping offset may be configured by corresponding to order (or an index) of a PDCCH TO. Such a TCI mapping offset value may be included in DCI.

For example, PDSCH to TCI mapping may be mapped in original order (i.e., from a first TCI state of TCI state #1, #2, #1, #2) by configuring a TCI mapping offset value as 0 in DCI transmitted in PDCCH TO #1. In other words, TCI state #1, #2, #1, and #2 may be mapped to PDSCH TO #1, #2, #3, and #4, respectively. TCI state #2, #1, #2 may be mapped to PDSCH TO #2, #3, and #4 respectively by configuring a TCI mapping offset value as 1 in DCI transmitted in PDCCH TO #2 (i.e., by being mapped from a second TCI state of TCI state #1, #2, #1, #2).

In the above-described examples, it was described by using a cyclical mapping method between a PDSCH TO and a TCI state as an example, but the same principle may be also applied to other mapping method (e.g., a sequential mapping method). For example, TCI state #1, #1, #2, #2 may be mapped to PDSCH TO #1, #2, #3, and #4 respectively by configuring a TCI mapping offset value as 0 in DCI transmitted in PDCCH TO #1 (i.e., by being mapped from a first TCI state of TCI state #1, #1, #2, #2). TCI state #1, #2, #2 may be mapped to PDSCH TO #2, #3, and #4 respectively by configuring a TCI mapping offset value as 1 in DCI transmitted in PDCCH TO #2 (i.e., by being mapped from a second TCI state of TCI state #1, #1, #2, #2).

Embodiment 3-2

When there is no TCI field in DCI, TCI states used to transmit the same DCI, i.e., TCI states of CORESET(s) that the same DCI is transmitted, may be used for PDSCH reception. For example, when the same DCI was received through two CORESETs (e.g., CORESET #1, and #2) and TCI state #1, and #2 are configured/used for CORESET #1, and #2, respectively, TCI state #1, and #2 may be used for PDSCH reception. Alternatively, when the same DCI was received through one CORESET (e.g., CORESET #1) and TCI state #1, and #2 are configured/used for CORESET #1, TCI state #1, and #2 may be used for PDSCH reception.

Examples of the above-described embodiment 3-1 include methods for resolving ambiguity of PDSCH to TCI state mapping for a case in which a TCI field in DCI is included and a TCI field indicates TCI state #1, and #2.

In this embodiment 3-2, a TCI field in DCI is not included, but although a TCI state mapped to a PDSCH is configured based on TCI states configured for a CORESET associated with corresponding DCI (e.g., TCI state #1 and #2 configured for one CORESET or TCI state #1 configured for CORESET #1 and TCI state #2 configured for CORESET #2), ambiguity similar to embodiment 3-1 may exist.

To resolve such ambiguity, examples of the above-described 3-1-1, 3-1-2 and/or 3-1-3 may be applied. For example, based on one or more of configuring a DCI to PDSCH offset as a negative number, indicating total RepNum related information or indicating a TCI mapping offset, a PDSCH TO and TCI states configured for CORESET(s) may be clearly mapped.

Embodiment 3-2-1

When a TCI field in DCI is not included, TCI states used to transmit the same DCI, i.e., TCI states configured for CORESET(s) that the same DCI is transmitted, may be used for PDSCH transmission or reception.

For MTRP PDCCH transmission, Nc (Nc>=2), the number of TCI states configured for CORESET(s), may be equal to or greater than Nd, the number of TCI states which will be applied to PDSCH transmission. In this case, UE and a base station may have a problem that which TCI state(s) among Nc TCI states configured for CORESET(s) will be applied/mapped to a PDSCH is unclear.

For STRP PDSCH transmission that one TRP (repetitively) transmits a PDSCH, specific one of Nc TCI states configured for CORESET(s) may be applied to a PDSCH. For example, one specific TCI state may be a TCI state of a first, lowest, last or highest index among a plurality of TCI states.

For MTRP PDSCH transmission that a plurality of TRPs (repetitively) transmit a PDSCH, all or part (i.e., Nd (Nd=<Nc)) of Nc TCI states configured for CORESET(s) may be applied to a PDSCH.

For it, according to whether PDSCH transmission is STRP PDSCH transmission or MTRP PDSCH transmission, a base station may indicate to UE whether specific one of Nc TCI states configured for CORESET(s) will be applied to a PDSCH or Nd TCI states will be applied to a PDSCH.

For example, a base station may configure/indicate to UE information related to distinction of STRP transmission or MTRP transmission. Accordingly, additionally or alternatively, a base station may configure/indicate to UE information related to a TCI state which will be applied to a PDSCH (e.g., one specific TCI state which will be applied to STRP PDSCH transmission and/or Nd TCI states which will be applied to MTRP PDSCH transmission). Such configuration/indication information may be provided to UE through higher layer (e.g., RRC and/or a MAC-CE) signaling and/or DCI, etc.

Embodiment 3-2-2

As described above, a TCI state for receiving a PDSCH may be configured by two methods.

A first method may use a beam of a CORESET which scheduled a PDSCH. For example, a beam of a CORESET may be determined based on a TCI state related to each CORESET configured based on a ControlResourceSet parameter.

A second method may use a TCI state indicated by a TCI field included in DCI scheduling a PDSCH. For example, a value of a TCI field may indicate one of TCI codepoints. For example, indexes of a TCI codepoint may be indicated through information related to TCI activation (e.g., a MAC-CE) and a TCI state corresponding to each TCI codepoint may be preconfigured through higher layer (e.g., RRC) signaling.

Here, a plurality of TCI states may be configured or one TCI state may be configured for one TCI codepoint.

For example, when a time duration between a DCI reception occasion and a PDSCH reception occasion is smaller than a predetermined threshold based on UE capability (e.g., time necessary for DCI decoding and beam change), a terminal may try PDSCH reception based on a default beam. A default beam (or a default TCI state) may be a TCI state associated with a CORESET (or a SS set) which has the lowest identifier in the latest slot monitored by a terminal.

For such default beam application duration, DCI decoding is not completed, so UE may not clearly determine whether one TCI state or a plurality of TCI states are configured for PDSCH reception.

Accordingly, UE may assume that it is STRP PDSCH transmission only when all TCI codepoints are configured as one TCI state. For example, STRP PDSCH reception may be performed based on one TCI state (i.e., one default beam/TCI state) configured for a CORESET (or a SS set) which has the lowest identifier in the latest slot monitored by a terminal. If a plurality of TCI states are configured for a CORESET (or a SS set) which has the lowest identifier in the latest slot monitored by a terminal, a STRP PDSCH may be received based on a TCI state of specific one of them (e.g., a first, lowest, last or highest index).

Otherwise (i.e., when at least one of TCI codepoints is configured as a plurality of TCI states), UE may assume a MTRP PDSCH (i.e., PDSCH NCJT transmission). For example, MTRP PDSCH reception may be performed based on a plurality of TCI states (i.e., a plurality of default beams/TCI states) configured for a CORESET (or a SS set) which has the lowest identifier in the latest slot monitored by a terminal. If one TCI state is configured for a CORESET (or a SS set) which has the lowest identifier in the latest slot monitored by a terminal, a terminal may assume a STRP PDSCH.

Alternatively, a base station may configure/indicate to UE information directly indicating whether of a STRP PDSCH or a MTRP PDSCH.

Table 6 illustrates a CORESET configuration (i.e., a ControlResourceSet information element (IE)) provided by a base station to UE through higher layer signaling (e.g., RRC signaling).

A ControlResourceSet IE is used to configure a time/frequency control resource set (CORESET) for searching downlink control information.

TABLE 6

```
-- ASN1START
-- TAG-CONTROLRESOURCESET-START
ControlResourceSet ::=          SEQUENCE {
    controlResourceSetId            ControlResourceSetId,
    frequencyDomainResources        BIT STRING (SIZE (45)),
    duration                        INTEGER
(1..maxCoReSetDuration),
    cce-REG-MappingType             CHOICE {
        interleaved                     SEQUENCE {
            reg-BundleSize                  ENUMERATED {n2, n3, n6},
            interleaverSize                 ENUMERATED {n2, n3, n6},
            shiftIndex
INTEGER(0..maxNrofPhysicalResourceBlocks-1)     OPTIONAL -- Need S
        },
        nonInterleaved                  NULL
    },
    precoderGranularity             ENUMERATED {sameAsREG-bundle, allContiguousRBs},
    tci-StatesPDCCH-ToAddList       SEQUENCE(SIZE
(1..maxNrofTCI-StatesPDCCH)) OF TCI-StateId OPTIONAL, -- Cond NotSIB1-initialBWP
    tci-StatesPDCCH-ToReleaseList   SEQUENCE (SIZE
(1..maxNrofTCI-StatesPDCCH)) OF TCI-StateId OPTIONAL, -- Cond NotSIB1-initialBWP
    tci-PresentInDCI                ENUMERATED {enabled}
OPTIONAL, -- Need S
    pdcch-DMRS-ScramblingID         INTEGER (0..65535)
OPTIONAL, -- Need S
    ...,
    [[
    rb-Offset-r16                   INTEGER (0..5)
OPTIONAL, -- Need N
    tci-PresentInDCI-ForDCI-Format1-2-r16   INTEGER (1..3)
OPTIONAL, -- Need S
    coresetPoolIndex-r16            INTEGER (0..1)
OPTIONAL, -- Need R
    controlResourceSetId-r16        ControlResourceSetId-r16
OPTIONAL -- Need S
    ]]
}
-- TAG-CONTROLRESOURCESET-STOP
-- ASN1STOP
```

Table 7 represents a description on each parameter of Table 6.

TABLE 7

Description on ControlResourceSet Field cce-REG-MappingType
Mapping to Resource Element Groups (REG) of Control Channel Element (CCE)
controlResourceSetId
Identifiers of an instance of a ControlResourceSet IE.
A value of 0
identifies a common CORESET configured in ServingCellConfigCommon (controlResourceSetZero) and MIB and accordingly, it is not used in a ControlResourceSet IE. Other values identify CORESETs configured in SIB1 or by dedicated signaling. controlResourceSetId is unique among BWPs of one serving cell.
If a controlResourceSetId-r16 field exists, UE ignores a controlResourceSetId field (without a suffix).
coresetPoolIndex
An index of a CORESET pool for this CORESET If no, UE uses index 0.
duration
A consecutive time duration of a CORESET represented by the number of symbols (duration)
frequencyDomainResources
Frequency domain resources for a CORESET. For grouping starting from a first RB group in a BWP, each bit corresponds to one group of 6RBs. A first (leftmost/most significant) bit corresponds to a first RB group in a BWP and it is the same as below. A bit set as 1 indicates that this RB group belongs to a frequency domain resource of this CORESET. Bits corresponding to a group of RBs which are not entirely included in a BWP where a CORESET is configured are set as 0.
interleaverSize
Interleaver-size
pdcch-DMRS-ScramblingID
Initialize PDCCH DMRS scrambling. Without this field, UE applies a value of physCellId configured for this serving cell.
precoderGranularity
Precoder granularity in a frequency domain
rb-Offset
A RB level offset is indicated in a RB unit from a first RB of a first 6RB group to a first RB of a BWP. Without this field, UE applies a value of 0.
reg-BundleSize
Resource element groups (REG) may be bundled to generate REG bundles. This parameter defines a size of bundles.
shiftIndex
Without this field, UE applies a value of physCellIdconfigured for this serving cell.
tci-PresentInDCI
This field indicates whether a TCI field exists in DCI format 1_1. Without this field, UE considers a TCI to be absent/deactivated. For cross carrier scheduling, a network may set this field to be activated for ControlResourceSet used for cross carrier scheduling in a scheduling cell.

TABLE 7-continued

Description on ControlResourceSet Field tci-PresentInDCI-ForDCI-Format1-2
The number of bits for "Transmission configuration indicator" in DCI format 1_2 is configured. Without this field, UE applies a value of 0-bit for "Transmission configuration indicator" in DCI format 1_2.
tci-StatesPDCCH-ToAddList
A subset of TCI states defined in pdsch-Config included in BWP-DownlinkDedicated corresponding to a serving cell and corresponding to a DL BWP to which ControlResourceSet belongs. They are used to provide a QCL relation between PDCCH DMRS ports and DL RS(s) in a single RS set (TCI-State). A network configures an maxNrofTCI-StatesPDCCH entry to the maximum.

Table 8 illustrates information signaled for ControlResourceSet.

TABLE 8

For each CORESET, UE is provided by ControlResourceSet with:
 - by controlResourceSetId, CORESET index p,
 - If 0 < p < 12 CORESETPoolIndex is not provided or if a value of CORESETPoolIndex for all CORESETs is the same when CORESETPoolIndex is provided;
 - If CORESETPoolIndex for a 0 < p < 16 first CORESET is not provided, or if it is provided and a value for a first CORESET is 0, or if it is provided and a value for a second CORESET is 1;
 - A DM-RS scrambling sequence initialization value by pdcch-DMRS-ScramblingID;
 - Precoder granularity on the number of REGs in a frequency domain that UE may assume use of the same DM-RS precoder by precoderGranularity;
 - The number of consecutive symbols provided by a duration;
 - A set of resource blocks provided by frequencyDomainResources;
 - Mapping parameters between CCE and REG provided by cce-REG-MappingType;
 - An antenna port QCL, from a set of antenna port QCLs provided by a TCI state, indicating QCL information of a DM-RS antenna port for PDCCH reception in an individual CORESET;
 - IF UE is provided with the number of lists of cells for simultaneous TCI state activation by simultaneousTCI-CellList, UE applies an antenna port QCL provided by TCI-States having the same activated tciStateID value for CORESETs having an index RR in all configured DL BWPs of all configured cells in one list determined from a serving cell index provided by a MAC control element (CE) command.
 - Indication on presence or absence of a TCI field for a DCI format, other than DCI format 1_0, indicating SPS PDSCH release or scheduling PDSCH reception, by tci-PresentInDCI or tci-PresentInDCI-ForDCIFormat1_2.

Table 9 includes part of physical layer procedures for PDSCH reception.

TABLE 9

(If a UE is configured by higher layer parameter PDCCH-Config that contains two different values of CORESETPoolIndex in ControlResourceSet, the UE may expect to receive multiple PDCCHs scheduling fully/partially/non-overlapped PDSCHs in time and frequency domain. The UE may expect the reception of full/partially-overlapped PDSCHs in time only when PDCCHs that schedule two PDSCHs are associated to different ControlResourceSets having different values of CORESETPoolIndex. For a ControlResourceSet without CORESETPoolIndex, the UE may assume that the ControlResourceSet is assigned with CORESETPoolIndex as 0.
When a UE is configured by higher layer parameter RepSchemeEnabler set to one of 'FDMSchemeA', 'FDMSchemeB', 'TDMSchemeA', if the UE is indicated with two TCI states in a codepoint of the DCI field 'Transmission Configuration Indication' and DM-RS port(s) within one CDM group in the DCI field "Antenna Port(s)".
- When two TCI states are indicated in a DCI and the UE is set to 'FDMSchemeA', the UE shall receive a single PDSCH transmission occasion of the TB with each TCI state associated to a non-overlapping frequency domain resource allocation.

TABLE 9-continued

- When two TCI states are indicated in a DCI and the UE is set to 'FDMSchemeB', the UE shall receive two PDSCH transmission occasions of the same TB with each TCI state associated to a PDSCH transmission occasion which has non-overlapping frequency domain resource allocation with respect to the other PDSCH transmission occasion.
- When two TCI states are indicated in a DCI and the UE is set to 'TDMSchemeA', the UE shall receive two PDSCH transmission occasions of the same TB with each TCI state associated to a PDSCH transmission occasion which has non-overlapping time domain resource allocation with respect to the other PDSCH transmission occasion and both PDSCH transmission occasions shall be received within a given slot.
When a UE is configured by the higher layer parameter PDSCH-config that indicates at least one entry in pdschTimeDomainAllocationList containing RepNumR16 in PDSCH-TimeDomainResourceAllocation, the UE may expect to be indicated with one or two TCI states in a codepoint of the DCI field 'Transmission Configuration Indication' together with the DCI field "Time domain resource assignment' indicating an entry in pdsch-TimeDomainAllocationList which contain RepNum16 in PDSCH-TimeDomainResourceAllocation and DM-RS port(s) within one CDM group in the DCI field "Antenna Port(s)".
- When two TCI states are indicated in a DCI with 'Transmission Configuration Indication' field, the UE may expect to receive multiple slot level PDSCH transmission occasions of the same TB with two TCI states used across multiple PDSCH transmission occasions.
- When one TCI state is indicated in a DCI with 'Transmission Configuration Indication' field, the UE may expect to receive multiple slot level PDSCH transmission occasions of the same TB with one TCI state used across multiple PDSCH transmission occasions.)

Embodiment 3-2-3

According to this embodiment, when TCI information is not included in DCI, UE may determine whether MTRP PDSCH transmission or STRP PDSCM transmission is performed based on one or more information configured/indicated from a base station. One or more information may include one or more of the number of TCI states associated with CORESET(s) associated with DCI, the number of CDM groups indicated through DCI, or the number of repetitions (RepNum).

A base station may indicate to UE whether PDSCH transmission/reception is a MTRP based method using multiple TCI states or a STRP based method using a single TCI state. A MTRP PDSCH transmission/reception method may correspond to a transmission method like FDMSchemeA, FDMSchemeB, TDMSchemeA for URLLC or an inter-slot PDSCH repeat transmission method that a value of RepNum is configured to be equal to or greater than 2. A MTRP PDSCH transmission/reception method may mean a method (i.e., a NCJT transmission method) of using a different TCI states per layer (layer group corresponding to the same DMRS CDM group) for multiple layers (or DMRS antenna ports) transmitting one PDSCH for eMBB.

A RRC parameter (RepetitionScheme-r16) associated with a repetition scheme, a value indicated by DCI (e.g., the number of DMRS CDM groups, the number of TCI states, repetitionNumber-r16 (or RepNumR16 or RepNum)), etc. configured/indicated by a base station for such a MTRP PDSCH transmission method may be different.

If such configuration values satisfy a specific condition, UE may assume a MTRP PDSCH transmission method corresponding to that condition and receive data. For example, when the number of CDM groups is indicated as 1, a TCI state is indicated as 2 and a value of repetition-Number-r16 is configured as 2 through DCI, UE may receive data by assuming a MTRP inter slot PDSCH repeat transmission method.

If the number of TCI states indicated through a TCI field included in DCI is 1 or a TCI field does not exist in DCI, a MTRP PDSCH transmission condition is not satisfied, so a STRP PDSCH transmission method may be applied.

When a PDCCH scheduling data by MTRP PDCCH transmission uses multiple TCI states, whether MTRP PDSCH transmission is performed may be determined by using multiple TCI states used for PDCCH reception (e.g., configured for CORESET(s)) although a TCI field is not included in DCI.

In other words, among conditions for determining a MTRP PDSCH transmission method, 'the number of TCI states indicated through DCI' may be replaced with 'the number of TCI states (i.e., configured for CORESET(s) associated with the same DCI) used to transmit/receive the same DCI scheduling a corresponding PDSCH'. In this case, a TCI state used for MTRP PDSCH reception may be determined based on TCI states of CORESET(s) that the same DCI is transmitted.

When the same DCI is transmitted by using multiple TCI states and a TCI field does not exist in corresponding DCI, whether of a MTRP PDSCH transmission method (further, what kind of MTRP PDSCH transmission method) or a STRP PDSCH transmission method may be determined by using the remaining conditions except for a TCI state among information indicated through DCI and/or a RRC parameter configured/indicated by a base station for MTRP PDSCH transmission.

For a MTRP PDSCH transmission method, a PDSCH may be received by using all TCI states used to transmit the same DCI which scheduled a corresponding PDSCH (i.e., TCI states configured for CORESET(s) that the same DCI is transmitted). For a STRP PDSCH transmission method, a PDSCH may be received by using one specific TCI state of TCI states configured for CORESET(s).

For example, when 2 (DMRS) CDM groups are indicated through an antenna port field included in DCI and a value of repetitionNumber-r16 (or RepNum) is not indicated through a TDRA field included in DCI, UE may receive a NCJT PDSCH (or a MTRP PDSCH) by using 2 TCI states configured for CORESET(s).

For example, when 1 (DMRS) CDM group is indicated through an antenna port field included in DCI and a value of repetitionNumber-r16 (or RepNum) is not indicated through a TDRA field included in DCI, UE may receive a STRP PDSCH by using one specific TCI state of TCI states configured for CORESET(s). Accordingly, a problem may occur in which a STRP PDSCH may not be received by using 2 (DMRS) CDM groups.

Even when 2 (DMRS) CDM groups are indicated through DCI to resolve it, UE may be defined to assume STRP PDSCH transmission/reception.

Alternatively, although a base station indicates to UE 2 (DMRS) CDM groups through separate signaling, UE may be configured/indicated to assume a STRP PDSCH or a MTRP PDSCH.

In the present disclosure, examples are described by dividing a multi-chance operation and a soft combining operation, but it is just an example, and examples in the present disclosure may be applied to both a multi-chance operation and a soft combining operation.

In the present disclosure, for convenience of a description, it was described by assuming an example in which the same DCI/PDCCH is transmitted through 2 TCI states, but a scope of the present disclosure is not limited thereto, and even when the same DCI/PDCCH is transmitted through 2 or more TCI states in one or more serving cells from one or more TRPs, examples of the present disclosure may be applied.

In addition, in the present disclosure, for convenience of a description, it was described by mainly assuming an example in which a PDCCH/a PDSCH is repetitively transmitted at a slot level, but a scope of the present disclosure is not limited thereto, and even when a PDCCH/a PDSCH is repetitively transmitted at a sub-slot/symbol/symbol group level, examples of the present disclosure may be applied.

Figure 19:
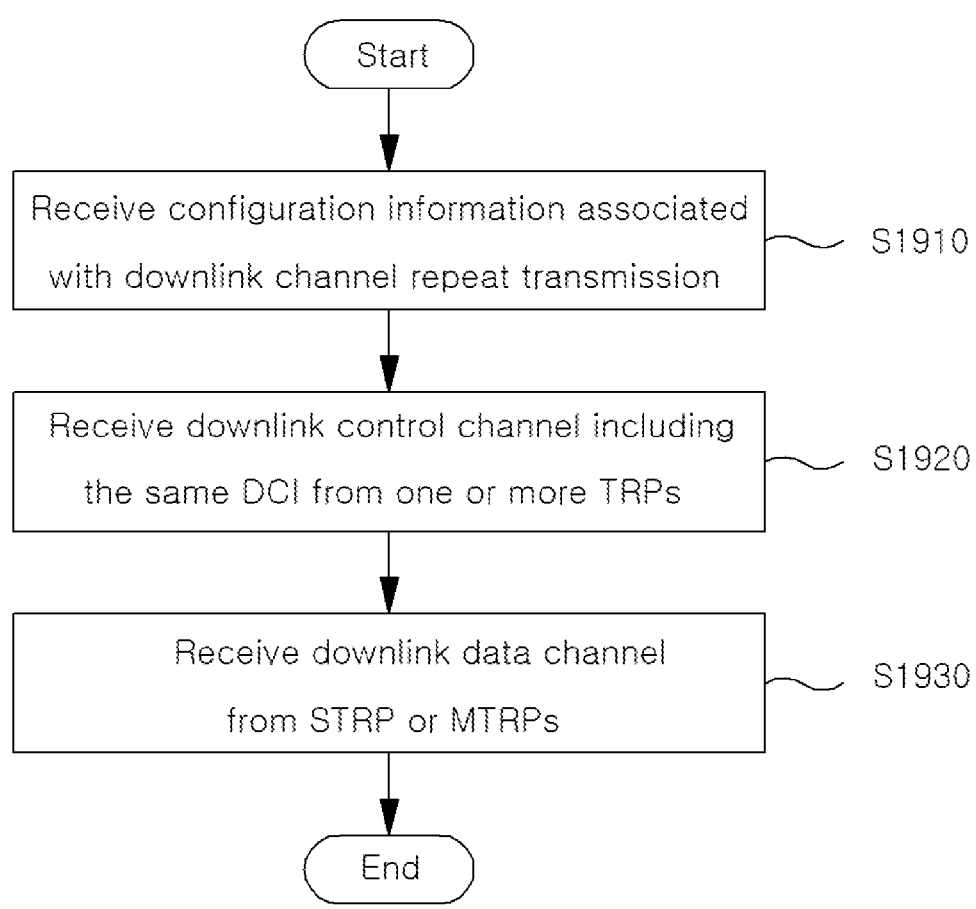
FIG. 19 is a flow chart for describing a method that a terminal receives STRP or MTRP downlink transmission according to the present disclosure.

FIG. 19 is a flow chart for describing a method that a terminal receives STRP or MTRP downlink transmission according to the present disclosure.

In S1910, a terminal may receive configuration information associated with downlink channel repeat transmission.

Here, a downlink channel may be a downlink data channel (e.g., a PDSCH). Configuration information associated with downlink channel repeat transmission may include one or more of a downlink channel repetition scheme parameter or a downlink channel time domain resource allocation parameter. A downlink channel time domain resource allocation parameter may include one or more combinations configured with one or more elements of a PDSCH mapping type, a DCI to PDSCH offset (slot offset $K_0$), a start symbol position (S) and a symbol length (or the number of symbols) (L), or the number or repetitions (RepNum).

In S1920, a terminal may receive a downlink control channel including the same DCI from one or more TRPs.

Here, DCI transmitted in a downlink control channel (e.g., a PDCCH) may include information indicating one or more of the number of CDM groups or the number of repetitions for a downlink data channel (e.g., a PDSCH). For example, the number of CDM groups may be indicated through an antenna port field of DCI. For example, the number of PDSCH repetitions may be indicated through a TDRA field of DCI.

In S1930, a terminal may receive a downlink data channel from a STRP or MTRPs.

For example, a terminal may determine whether a downlink data channel is transmitted from a STRP or from MTRPs based on one or more of configuration information or control information provided from a base station (refer to embodiment 3-2-1).

Here, when DCI does not include TCI information, based on one or more of configuration information received in S1910, information on the number of CDM groups received in S1920 or information on the number of repetitions, a terminal may determine whether a downlink data channel is transmitted from a STRP or from MTRPs (refer to embodiment 3-2-3).

For example, a downlink data channel transmitted from a STRP may be received based on one specific TCI of a plurality of TCIs configured for one or more CORESETs associated with DCI. In addition, the downlink data channel transmitted from MTRPs may be received based on a plurality of TCIs configured for one or more CORESETs associated with DCI.

In addition, when a terminal receives a downlink data channel based on a default TCI state (e.g., when a time interval between a reception occasion of DCI and a reception occasion of the downlink data channel is smaller than a predetermined threshold), a terminal may determine whether a downlink data channel is transmitted from a STRP or from MTRPs based on a TCI codepoint (refer to embodiment 3-2-2).

For example, when one TCI state is configured for each of all TCI codepoints, a terminal may assume that a downlink data channel is transmitted from a STRP and receive a downlink data channel based on one default TCI state. In addition, when a plurality of TCI states are configured for at least one of TCI codepoints, a terminal may assume that a downlink data channel is transmitted from MTRPs and receive a downlink data channel based on a plurality of default TCI states.

DCI received in S1920 may be transmitted at one or more downlink control channel transmission TOs and a downlink data channel received in S1930 may be transmitted at one or more downlink data channel TOs.

In this case, DCI received in S1920 may indicate one or more of first offset information having a predetermined value within a scope of negative numbers, 0 and positive numbers, information on the total number of repetitions, or second offset information on TCI mapping (refer to embodiment 3-1).

First offset information may indicate a time offset between DCI and a downlink data channel. For example, first offset information included in DCI transmitted at a downlink control channel TO after a downlink data channel TO may have a negative value in a time domain (refer to embodiment 3-1-1).

Information on the total number of repetitions may indicate the total number of one or more downlink data channel TOs. Accordingly, in addition, a parameter of the number of repetitions (RepNum) indicating consecutive slots that a downlink data channel is transmitted may be indicated by DCI (refer to embodiment 3-1-2).

Second offset information on TCI mapping may indicate what a numberth TCI state is applied in order of TCI states applied to one or more downlink data channel TOs (refer to embodiment 3-1-3).

Figure 20:
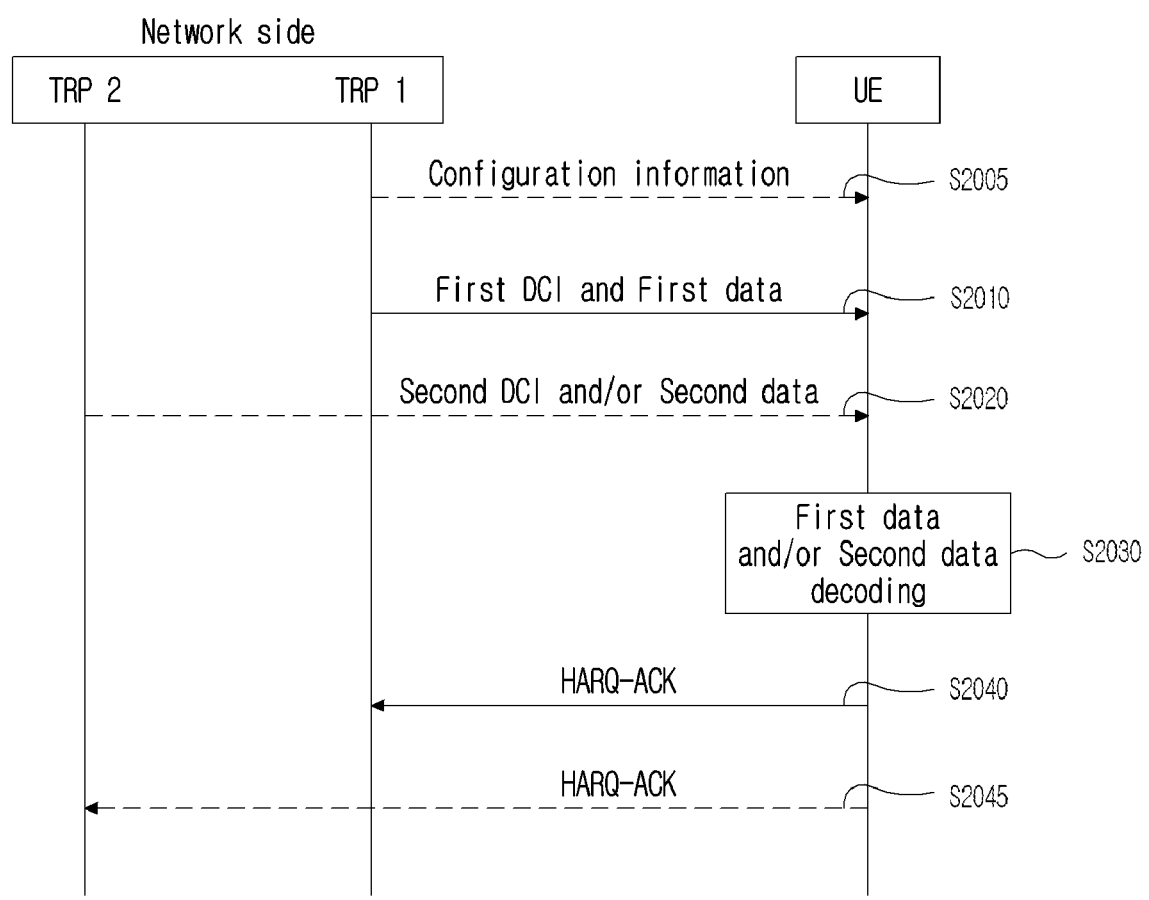
FIG. 20 is a diagram for describing a signaling procedure of a network side and a terminal according to the present disclosure.

FIG. 20 is a diagram for describing a signaling procedure of a network side and a terminal according to the present disclosure.

FIG. 20 represents signaling between a network side (e.g., a first TRP and a second TRP) and a terminal (UE) under a situation of a plurality of TRPs to which various embodiments of the present disclosure (embodiment 1, 2 and/or 3) may be applied (in the following description, a TRP may be replaced with a base station and a cell). Here, an UE/Network side is just an example and may be applied by being replaced with a variety of devices as described in relation to the above-described description or FIG. 21. FIG. 20 is just for convenience of a description, and does not limit a scope of the present disclosure. In addition, some step(s) shown in FIG. 20 may be omitted according to a situation and/or a configuration, etc.

In reference to FIG. 20, signaling between 2 TRPs and UE is considered for convenience of a description, but it goes without saying that a corresponding signaling method may be extended and applied to signaling between multiple TRPs and multiple UE. In the following description, a Network side may be one base station including a plurality of TRPs and may be one cell including a plurality of TRPs. In an example, an ideal/non-ideal backhaul may be configured between a first TRP and a second TRP configuring a network side. In addition, the following description is described based on multiple TRPs, but it may be equally extended and applied to transmission through multiple panels. In addition, in the present disclosure, an operation that a terminal receives a signal from a first TRP and/or a second TRP may include an operation that a terminal receives a signal from a network side (through/with a first TRP and/or a second TRP) and an operation that a terminal transmits a signal to a first TRP and/or a second TRP may include an operation that a terminal transmits a signal to a network side (through/with a first TRP and/or a second TRP).

An example of FIG. 20 represents signaling when a terminal receives multiple DCI under a situation of M-TRPs (or a case in which a plurality of CORESETs or CORESET groups are configured from one TRP may be also assumed as M-TRPs) (e.g., when each TRP repetitively transmits the same DCI (or partitively the same DCI) to UE).

UE may receive configuration information on multiple TRP based transmission and reception through/with TRP 1 (and/or TRP 2) from a Network side S2005. The configuration information may include information related to a configuration of a network side (i.e., a TRP configuration), resource information related to multiple TRP based transmission and reception (resource allocation), etc. In this case, the configuration information may be transmitted through higher layer signaling (e.g., RRC signaling, MAC-CE, etc.). In addition, when the configuration information is predefined or preconfigured, a corresponding step may be omitted. For example, the configuration information may include a configuration related to a TCI state mapping method/way described in the above-described embodiment 1, 2, and/or 3 and so on. In addition, for example, the configuration information may include information related to a configuration of a transmission occasion described in embodiment 1, 2, and/or 3, information related to TCI mapping, information related to repeat transmission of a control channel (e.g., a PDCCH) (e.g., whether repeat transmission is performed, the number of times of repeat transmission, etc.), etc.

For example, as described in detailed examples of the above-described embodiment 3, information related to a configuration of a TO, configuration information related to a TCI state mapping method or scheme, information related to division of STRP transmission and MTRP transmission, information related to repeat transmission, etc. may be also included.

For example, the configuration information may include CORESET related configuration information (e.g., ControlResourceSet IE) described in embodiment 1, 2, and/or 3. The CORESET related configuration information may include a CORESET related ID (e.g., controlResourceSetID), an index of a CORESET pool for a CORESET (e.g., CORESETPoolIndex), a time/frequency resource configuration of a CORESET, CORESET related TCI information, etc.

For example, the above-described operation that UE in S2005 (100/200 in FIG. 21) receives configuration information related to the multiple TRP-based transmission and reception from a network side (100/200 in FIG. 21) may be implemented by a device in FIG. 21 which will be described below. For example, in reference to FIG. 21, one or more processors 102 may control one or more transceivers 106 and/or one or more memories 104, etc. to receive configuration information related to the multiple TRP-based transmission and reception and one or more transceivers 106 may receive configuration information related to the multiple TRP-based transmission and reception from a network side.

UE may receive first DCI and first data scheduled by first DCI through/with TRP 1 from a network side S2010. In addition, UE may receive second DCI and second data scheduled by second DCI through/with TRP 2 from a network side or may receive second data scheduled by first DCI without second DCI or may receive only second DCI scheduling first data S2020. For example, data of a single TRP (e.g., first date of TRP 1, or second data of TRP 2) may be scheduled by first DCI and second DCI repetitively transmitted from TRP 1 and TRP 2.

For example, first DCI (and second DCI) may include (indication) information on a TCI state, resource allocation information on a DMRS and/or data (i.e., a space/frequency/time resource), etc. described in the above-described embodiment 1, 2, and/or 3. For example, first DCI (and second DCI) may include information related to repeat transmission of a control channel (e.g., a PDCCH) (e.g., a specific DCI format/SS/RNTI, etc.), indication information related to configuration of a transmission occasion (TO), information related to mapping between a PDCCH/PDSCH TO and a TCI state (e.g., mapping order), etc.

For example, DCI may include PDSCH related configuration information (e.g., a DCI to PDSCH offset, a resource position of a PDSCH (e.g., a symbol position), information related to PDSCH repeat transmission (e.g., RepNum, total RepNum, etc.)), TCI state related information which will be applied to a PDSCH (e.g., a specific TCI state which will be applied in a STRP and so on), etc.

In this case, first data and/or second data may be transmitted and received based on a TCI state mapping method according to the present disclosure. For example, first data and/or second data may be repetitively transmitted/received after TCI state mapping is applied based on the PDSCH related configuration information, etc.

DCI (e.g., first DCI and second DCI) and data (e.g., first data and second data) may be transmitted through a control channel (e.g., a PDCCH, etc.) and a data channel (e.g., a PDSCH, etc.), respectively. For example, the control channel (e.g., a PDCCH) may be repetitively transmitted and the same control channel may be partitively transmitted. In addition, the data channel (e.g., a PDSCH) may be repetitively transmitted and the same control channel may be partitively transmitted. For example, repeat transmission of the control channel (e.g., a PDCCH, etc.)/data channel (e.g., a PDSCH) may be performed in a slot/sub-slot/symbol unit.

In addition, S2010 and S2020 may be performed simultaneously or any one may be performed earlier than the other.

For example, first data and/or second data may be received through a PDSCH and a TCI state for receiving each PDSCH i) may be determined based on a beam of a CORESET which scheduled a PDSCH or ii) may be determined based on a TCI state indicated by a TCI field of DCI (e.g., first DCI and/or second DCI2) which scheduled a PDSCH.

For example, an operation that UE in S2010 and S2020 (100/200 of FIG. 21) receives DCI (e.g., first DCI and/or second DCI) and/or data (e.g., first data and/or second data) from a network side (100/200 of FIG. 21) may be implemented by a device in FIG. 21 which will be described below. For example, in reference to FIG. 2, one or more processors 102 may control one or more transceivers 106 and/or one or more memories 104, etc. to receive DCI (e.g., first DCI and/or second DCI) and/or data (e.g., first data and/or second data) and one or more transceivers 106 may receive DCI (e.g., first DCI and/or second DCI) and/or data (e.g., first data and/or second data) from a network side.

UE may decode received data (e.g., first data and/or second data) through/with TRP 1 (and/or TRP 2) from a network side S2030. For example, UE may perform decoding for data and/or channel estimation based on the above-described embodiment 1, 2, and/or 3. For example, decoding for data and/or channel estimation may be performed by applying TCI state mapping, etc. based on one or more of information received in the previous step.

For example, an operation that UE in step S2030 (100/200 of FIG. 21) decodes first data and/or second data may be implemented by a device in FIG. 21 which will be described below. For example, in reference to FIG. 21, one or more processors 102 may control one or more memories 104, etc. to perform an operation of decoding first data and/or second data.

UE may transmit HARQ-ACK information on first data and/or second data (e.g., ACK information, NACK information, etc.) to a network side through/with TRP 1 and/or TRP 2 S2040 and S2045. In this case, HARQ-ACK information on each of first data or second data may be transmitted to each TRP. In addition, HARQ-ACK information on first data and second data may be combined into one. In addition, UE may be configured to transmit only HARQ-ACK information to a representative TRP (e.g., TRP 1) and HARQ-ACK information transmission to other TRP (e.g., TRP 2) may be omitted.

For example, an operation that UE in Step S2040/S2045 (100/200 of FIG. 21) transmits HARQ-ACK information on first data and/or second data from a network side (100/200 of FIG. 21) may be implemented by a device in FIG. 21 which will be described below. For example, in reference to FIG. 21, one or more processors 102 may control one or more transceivers 106 and/or one or more memories 104, etc. to transmit HARQ-ACK information on first data and/or second data and one or more transceivers 106 may transmit HARQ-ACK information on first data and/or second data to a network side.

The above-described network side/UE signaling and operation may be implemented by a device which will be described below (e.g., a device in FIG. 21). For example, a network side (e.g., TRP 1/TRP 2) may correspond to a first wireless device and UE may correspond to a second wireless device and in some cases, the opposite may be considered.

Figure 21:
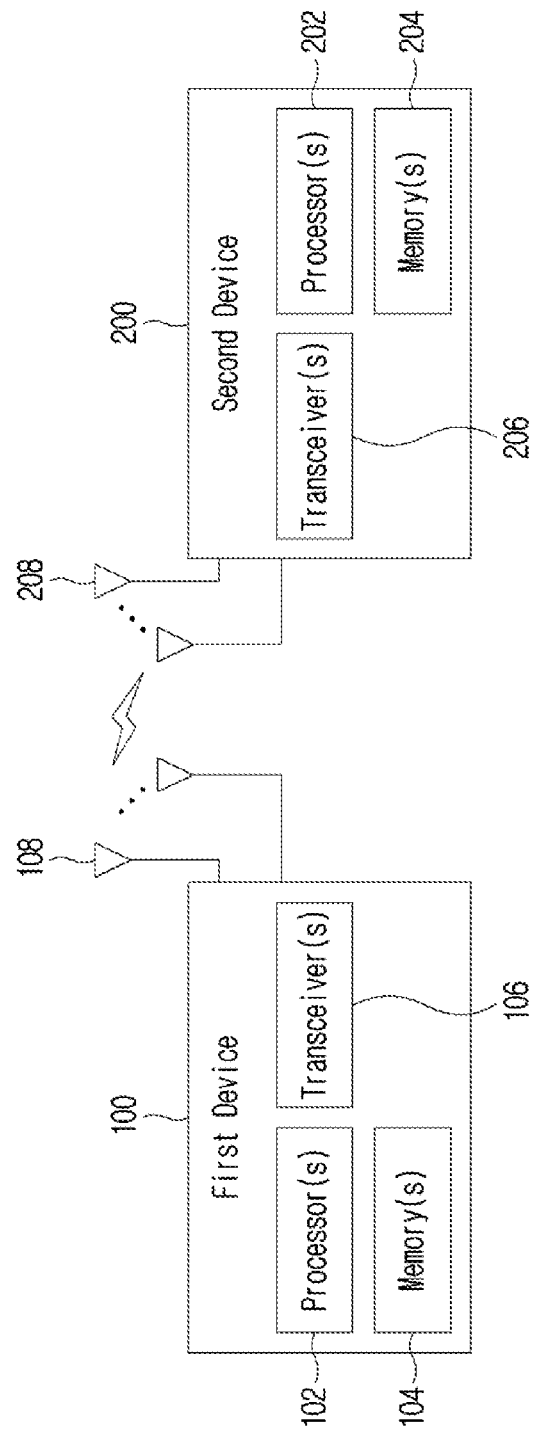
FIG. 21 illustrates a block diagram of a wireless communication system according to an embodiment of the present disclosure.

For example, the above-described network side/UE signaling and operation may be processed by one or more processors (e.g., 102, 202) in FIG. 21 and the above-described network side/UE signaling and operation may be stored in a memory (e.g., one or more memories in FIG. 21 (e.g., 104, 204)) in a form of a command/a program (e.g., an instruction, an executable code) for operating at least one processor in FIG. 22 (e.g., 102, 202).

General Device to which the Present Disclosure May be Applied

FIG. 21 is a diagram which illustrates a block diagram of a wireless communication system according to an embodiment of the present disclosure.

In reference to FIG. 21, a first wireless device 100 and a second wireless device 200 may transmit and receive a wireless signal through a variety of radio access technologies (e.g., LTE, NR).

A first wireless device 100 may include one or more processors 102 and one or more memories 104 and may additionally include one or more transceivers 106 and/or one or more antennas 108. A processor 102 may control a memory 104 and/or a transceiver 106 and may be configured to implement description, functions, procedures, proposals, methods and/or operation flow charts included in the present disclosure. For example, a processor 102 may transmit a wireless signal including first information/signal through a transceiver 106 after generating first information/signal by processing information in a memory 104. In addition, a processor 102 may receive a wireless signal including second information/signal through a transceiver 106 and then store information obtained by signal processing of second information/signal in a memory 104. A memory 104 may be connected to a processor 102 and may store a variety of information related to an operation of a processor 102. For example, a memory 104 may store a software code including commands for performing all or part of processes controlled by a processor 102 or for performing description, functions, procedures, proposals, methods and/or operation flow charts included in the present disclosure. Here, a processor 102 and a memory 104 may be part of a communication modem/circuit/chip designed to implement a wireless communication technology (e.g., LTE, NR). A transceiver 106 may be connected to a processor 102 and may transmit and/or receive a wireless signal through one or more antennas 108. A transceiver 106 may include a transmitter and/or a receiver. A transceiver 106 may be used together with a RF (Radio Frequency) unit. In the present disclosure, a wireless device may mean a communication modem/circuit/chip.

A second wireless device 200 may include one or more processors 202 and one or more memories 204 and may additionally include one or more transceivers 206 and/or one or more antennas 208. A processor 202 may control a memory 204 and/or a transceiver 206 and may be configured to implement description, functions, procedures, proposals, methods and/or operation flows charts included in the present disclosure. For example, a processor 202 may generate third information/signal by processing information in a memory 204, and then transmit a wireless signal including third information/signal through a transceiver 206. In addition, a processor 202 may receive a wireless signal including fourth information/signal through a transceiver 206, and then store information obtained by signal processing of fourth information/signal in a memory 204. A memory 204 may be connected to a processor 202 and may store a variety of information related to an operation of a processor 202. For example, a memory 204 may store a software code including commands for performing all or part of processes controlled by a processor 202 or for performing description, functions, procedures, proposals, methods and/or operation flow charts included in the present disclosure. Here, a processor 202 and a memory 204 may be part of a communication modem/circuit/chip designed to implement a wireless communication technology (e.g., LTE, NR). A transceiver 206 may be connected to a processor 202 and may transmit and/or receive a wireless signal through one or more antennas 208. A transceiver 206 may include a transmitter and/or a receiver. A transceiver 206 may be used together with a RF unit. In the present disclosure, a wireless device may mean a communication modem/circuit/chip.

Hereinafter, a hardware element of a wireless device 100, 200 will be described in more detail. It is not limited thereto, but one or more protocol layers may be implemented by one or more processors 102, 202. For example, one or more processors 102, 202 may implement one or more layers (e.g., a functional layer such as PHY, MAC, RLC, PDCP, RRC, SDAP). One or more processors 102, 202 may generate one or more PDUs (Protocol Data Unit) and/or one or more SDUs (Service Data Unit) according to description, functions, procedures, proposals, methods and/or operation flow charts included in the present disclosure. One or more processors 102, 202 may generate a message, control information, data or information according to description, functions, procedures, proposals, methods and/or operation flow charts included in the present disclosure. One or more processors 102, 202 may generate a signal (e.g., a baseband signal) including a PDU, a SDU, a message, control information, data or information according to functions, procedures, proposals and/or methods disclosed in the present disclosure to provide it to one or more transceivers 106, 206. One or more processors 102, 202 may receive a signal (e.g., a baseband signal) from one or more transceivers 106, 206 and obtain a PDU, a SDU, a message, control information, data or information according to description, functions, procedures, proposals, methods and/or operation flow charts included in the present disclosure.

One or more processors 102, 202 may be referred to as a controller, a micro controller, a micro processor or a micro computer. One or more processors 102, 202 may be implemented by a hardware, a firmware, a software, or their combination. In an example, one or more ASICs (Application Specific Integrated Circuit), one or more DSPs (Digital Signal Processor), one or more DSPDs (Digital Signal Processing Device), one or more PLDs (Programmable Logic Device) or one or more FPGAs (Field Programmable Gate Arrays) may be included in one or more processors 102, 202. Description, functions, procedures, proposals, methods and/or operation flow charts included in the present disclosure may be implemented by using a firmware or a software and a firmware or a software may be implemented to include a module, a procedure, a function, etc. A firmware or a software configured to perform description, functions, procedures, proposals, methods and/or operation flow charts included in the present disclosure may be included in one or more processors 102, 202 or may be stored in one or more memories 104, 204 and driven by one or more processors 102, 202. Description, functions, procedures, proposals, methods and/or operation flow charts included in the present disclosure may be implemented by using a firmware or a software in a form of a code, a command and/or a set of commands.

One or more memories 104, 204 may be connected to one or more processors 102, 202 and may store data, a signal, a message, information, a program, a code, an instruction and/or a command in various forms. One or more memories 104, 204 may be configured with ROM, RAM, EPROM, a flash memory, a hard drive, a register, a cash memory, a computer readable storage medium and/or their combination. One or more memories 104, 204 may be positioned inside and/or outside one or more processors 102, 202. In addition, one or more memories 104, 204 may be connected to one or more processors 102, 202 through a variety of technologies such as a wire or wireless connection.

One or more transceivers 106, 206 may transmit user data, control information, a wireless signal/channel, etc. mentioned in methods and/or operation flow charts, etc. of the present disclosure to one or more other devices. One or more transceivers 106, 206 may receiver user data, control information, a wireless signal/channel, etc. mentioned in description, functions, procedures, proposals, methods and/or operation flow charts, etc. included in the present disclosure from one or more other devices. For example, one or more transceivers 106, 206 may be connected to one or more processors 102, 202 and may transmit and receive a wireless signal. For example, one or more processors 102, 202 may control one or more transceivers 106, 206 to transmit user data, control information or a wireless signal to one or more other devices. In addition, one or more processors 102, 202 may control one or more transceivers 106, 206 to receive user data, control information or a wireless signal from one or more other devices. In addition, one or more transceivers 106, 206 may be connected to one or more antennas 108, 208 and one or more transceivers 106, 206 may be configured to transmit and receive user data, control information, a wireless signal/channel, etc. mentioned in description, functions, procedures, proposals, methods and/or operation flow charts, etc. included in the present disclosure through one or more antennas 108, 208. In the present disclosure, one or more antennas may be a plurality of physical antennas or a plurality of logical antennas (e.g., an antenna port). One or more transceivers 106, 206 may convert a received wireless signal/channel, etc. into a baseband signal from a RF band signal to process received user data, control information, wireless signal/channel, etc. by using one or more processors 102, 202. One or more transceivers 106, 206 may convert user data, control information, a wireless signal/channel, etc. which are processed by using one or more processors 102, 202 from a baseband signal to a RF band signal. Therefore, one or more transceivers 106, 206 may include an (analogue) oscillator and/or a filter.

Embodiments described above are that elements and features of the present disclosure are combined in a predetermined form. Each element or feature should be considered to be optional unless otherwise explicitly mentioned. Each element or feature may be implemented in a form that it is not combined with other element or feature. In addition, an embodiment of the present disclosure may include combining a part of elements and/or features. An order of operations described in embodiments of the present disclosure may be changed. Some elements or features of one embodiment may be included in other embodiment or may be substituted with a corresponding element or a feature of other embodiment. It is clear that an embodiment may include combining claims without an explicit dependency relationship in claims or may be included as a new claim by amendment after application.

It is clear to a person skilled in the pertinent art that the present disclosure may be implemented in other specific form in a scope not going beyond an essential feature of the present disclosure. Accordingly, the above-described detailed description should not be restrictively construed in every aspect and should be considered to be illustrative. A scope of the present disclosure should be determined by reasonable construction of an attached claim and all changes within an equivalent scope of the present disclosure are included in a scope of the present disclosure.

A scope of the present disclosure includes software or machine-executable commands (e.g., an operating system, an application, a firmware, a program, etc.) which execute an operation according to a method of various embodiments in a device or a computer and a non-transitory computer-readable medium that such a software or a command, etc. are stored and are executable in a device or a computer. A command which may be used to program a processing system performing a feature described in the present disclosure may be stored in a storage medium or a computer-readable storage medium and a feature described in the present disclosure may be implemented by using a computer program product including such a storage medium. A storage medium may include a high-speed random-access memory such as DRAM, SRAM, DDR RAM or other random-access solid state memory device, but it is not limited thereto, and it may include a nonvolatile memory such as one or more magnetic disk storage devices, optical disk storage devices, flash memory devices or other nonvolatile solid state storage devices. A memory optionally includes one or more storage devices positioned remotely from processor(s). A memory or alternatively, nonvolatile memory device(s) in a memory include a non-transitory computer-readable storage medium. A feature described in the present disclosure may be stored in any one of machine-readable mediums to control a hardware of a processing system and may be integrated into a software and/or a firmware which allows a processing system to interact with other mechanism utilizing a result from an embodiment of the present disclosure. Such a software or a firmware may include an application code, a device driver, an operating system and an execution environment/container, but it is not limited thereto.

Here, a wireless communication technology implemented in a wireless device 100, 200 of the present disclosure may include Narrowband Internet of Things for a low-power communication as well as LTE, NR and 6G. Here, for example, an NB-IoT technology may be an example of a LPWAN (Low Power Wide Area Network) technology, may be implemented in a standard of LTE Cat NB1 and/or LTE Cat NB2, etc. and is not limited to the above-described name. Additionally or alternatively, a wireless communication technology implemented in a wireless device 100, 200 of the present disclosure may perform a communication based on a LTE-M technology. Here, in an example, a LTE-M technology may be an example of a LPWAN technology and may be referred to a variety of names such as an eMTC (enhanced Machine Type Communication), etc. For example, an LTE-M technology may be implemented in at least any one of various standards including 1) LTE CAT 0, 2) LTE Cat M1, 3) LTE Cat M2, 4) LTE non-BL (non-Bandwidth Limited), 5) LTE-MTC, 6) LTE Machine Type Communication, and/or 7) LTE M and so on and it is not limited to the above-described name. Additionally or alternatively, a wireless communication technology implemented in a wireless device 100, 200 of the present disclosure may include at least any one of a ZigBee, a Bluetooth and a low power wide area network (LPWAN) considering a low-power communication and it is not limited to the above-described name. In an example, a ZigBee technology may generate PAN (personal area networks) related to a small/low-power digital communication based on a variety of standards such as IEEE 802.15.4, etc. and may be referred to as a variety of names.

INDUSTRIAL APPLICABILITY

A method proposed by the present disclosure is mainly described based on an example applied to 3GPP LTE/LTE-A, 5G system, but may be applied to various wireless communication systems other than the 3GPP LTE/LTE-A, 5G system.

The invention claimed is:

1. A method of receiving a downlink channel by a terminal in a wireless communication system, the method comprising:
    receiving configuration information associated with downlink channel repeat transmission; and
    repetitively receiving a downlink control channel including same downlink control information (DCI) from one or more TRPs (transmission reception point), wherein the DCI indicates one or more of a number of CDM groups or the number of repetitions for a downlink data channel; and
    based on the DCI not including TCI (Transmission Configuration Indicator) information, based on one or more of the configuration information, the number of CDM groups, or the number of repetitions for the downlink data channel, receiving the downlink data channel from a single TRP (STRP) or multiple TRPs (MTRPs) of the one or more TRPs.

2. The method of claim 1, wherein:
    the downlink data channel transmitted from the STRP is received based on one specific TCI of a plurality of TCIs configured for one or more CORESETs associated with the DCI.

3. The method of claim 1, wherein:
    the downlink data channel transmitted from the MTRPs is received based on a plurality of TCIs configured for one or more CORESETs associated with the DCI.

4. The method of claim 1, wherein:
    based on a time interval between a reception occasion of the DCI and the reception occasion of the downlink data channel being smaller than a predetermined threshold and one TCI state being configured for each of all TCI codepoints configured by a higher layer, the downlink data channel is received based on one default TCI state from the STRP.

5. The method of claim 1, wherein:
    based on a time interval between a reception occasion of the DCI and the reception occasion of the downlink data channel being smaller than a predetermined threshold and a plurality of TCI states being configured for at least one of TCI codepoints configured by a higher layer, the downlink data channel is received based on a plurality of default TCI states from the MTRPs.

6. The method of claim 1, wherein:
    the DCI is transmitted at one or more downlink control channel transmission occasions (TO),
    the downlink data channel is transmitted at one or more downlink data channel transmission occasions (TO).

7. The method of claim 6, wherein the DCI indicates one or more of:
    first offset information having a predetermined value within a scope of negative numbers, 0 and positive numbers;
    information on a total number of repetitions; or
    second offset information for TCI mapping.

8. The method of claim 7, wherein:
    the first offset information indicates a time offset between the DCI and the downlink data channel, the first offset information included in the DCI transmitted at the downlink control channel TO after the downlink data channel TO has a negative value.

9. The method of claim 7, wherein:
the information on the total number of repetitions indicates the total number of the one or more downlink data channel TOs,
a parameter of the number of repetitions indicating consecutive slots that the downlink data channel is transmitted is additionally indicated by the DCI.

10. The method of claim 7, wherein:
second offset information for the TCI mapping indicates whether a numberth TCI state is applied in order of TCI states applied to the one or more downlink data channel TOs.

11. The method of claim 1, wherein:
the configuration information includes a higher layer parameter for a repetition scheme.

12. The method of claim 1, wherein:
the downlink control channel is a PDCCH (Physical Downlink Control Channel),
the downlink data channel is a PDSCH (Physical Downlink Shared Channel).

13. A terminal of receiving a downlink channel in a wireless communication system, the terminal comprising:
one or more transceivers; and
one or more processors connected to the one or more transceivers,
wherein the one or more processors are configured to:
receive configuration information associated with downlink channel repeat transmission through the transceiver,
repetitively receive a downlink control channel including same downlink control information (DCI) from one or more TRPs (transmission reception point) through the transceiver, wherein the DCI indicates one or more of a number of CDM groups or the number of repetitions for a downlink data channel; and
based on the DCI not including TCI (Transmission Configuration Indicator) information, based on one or more of the configuration information, the number of CDM groups, or the number of repetitions for the downlink data channel, receive the downlink data channel from a single TRP (STRP) or multiple TRPs (MTRPs) of the one or more TRPs through the transceiver.

14. A method of transmitting a downlink channel by a base station including a first TRP (transmission reception point) in a wireless communication system, the method comprising:
transmitting configuration information associated with downlink channel repeat transmission to a terminal;
repetitively transmitting, by the first TRP or by the first TRP with one or more other TRPs, a downlink control channel including same downlink control information (DCI), wherein the DCI indicates one or more of a number of CDM groups, or the number of repetitions for a downlink data channel; and
based on the DCI not including TCI (Transmission Configuration Indicator) information, based on one or more of the configuration information, the number of CDM groups, or the number of repetitions for the downlink data channel, transmitting the downlink data channel from a single TRP (STRP) or multiple TRPs (MTRPs) of the one or more TRPs.

15. A base station including a first TRP (transmission reception point) transmitting a downlink channel in a wireless communication system, the base station comprising:
one or more processors; and
one or more processors connected to the one or more transceivers,
wherein the one or more processors are configured to:
transmit configuration information associated with downlink channel repeat transmission to a terminal through the transceiver;
repetitively transmit, by the first TRP or by the first TRP with one or more other TRPs, a downlink control channel including same downlink control information (DCI) through the transceiver, wherein the DCI indicates one or more of a number of CDM groups, or the number of repetitions for a downlink data channel; and
based on the DCI not including TCI (Transmission Configuration Indicator) information, based on one or more of the configuration information, the number of CDM groups, or the number of repetitions for the downlink data channel, transmit the downlink data channel from a single TRP (STRP) or multiple TRPs (MTRPs) of the one or more TRPs through the transceiver.

* * * * *